(12) United States Patent
Minakata

(10) Patent No.: US 7,385,767 B2
(45) Date of Patent: Jun. 10, 2008

(54) ZOOM OPTICAL SYSTEM, AND ELECTRONIC EQUIPMENT INCORPORATING THE SAME

(75) Inventor: Hiroyuki Minakata, Hachioji (JP)

(73) Assignee: Olympus Corporation, Tokyo (JP)

( * ) Notice: Subject to any disclaimer, the term of this patent is extended or adjusted under 35 U.S.C. 154(b) by 227 days.

(21) Appl. No.: 11/072,412

(22) Filed: Mar. 7, 2005

(65) Prior Publication Data

US 2005/0225873 A1  Oct. 13, 2005

(30) Foreign Application Priority Data

| Mar. 9, 2004 | (JP) | ............................. 2004-065128 |
| Mar. 29, 2004 | (JP) | ............................. 2004-094284 |
| Mar. 29, 2004 | (JP) | ............................. 2004-094285 |
| Apr. 6, 2004 | (JP) | ............................. 2004-112031 |

(51) Int. Cl.
*G02B 15/14* (2006.01)

(52) U.S. Cl. ...................... 359/678; 359/676

(58) Field of Classification Search .............. 359/676, 359/683, 692
See application file for complete search history.

(56) References Cited

U.S. PATENT DOCUMENTS 6,278,558 B1 * 8/2001 Chang ......................... 359/676
6,738,199 B2   5/2004 Nishioka
6,775,073 B2 * 8/2004 Kamo ......................... 359/691
2002/0149854 A1  10/2002 Tanaka et al.

FOREIGN PATENT DOCUMENTS

JP  2002-139670   5/2002
JP  2002-328302   11/2002

* cited by examiner

*Primary Examiner*—Scott J Sugarman
(74) *Attorney, Agent, or Firm*—Kenyon & Kenyon LLP

(57) ABSTRACT

The invention concerns a zoom optical system in which, for zooming, an optical function surface is rotated about a point away from it to change the position of a light beam that passes through the optical function surface. The zoom optical system comprises a stop 2 and one or more optical elements 10 located on an object side with respect to the stop 2, each having at least one optical function surface 11, 12, 13, and is adapted to form an image of a distant object O at varying magnifications. At least one optical function surface 12 comprises a continuous surface, and is constructed such that there is a continuous change in at least the radius of curvature in a sectional direction from one end to another end. Upon zooming, at least one optical element 10 having optical function surfaces 11, 12, 13 is rotated about a point S that is not contiguous to one optical function surface.

22 Claims, 25 Drawing Sheets

Y-direction

X-direction (0.00°, 20.6°)

(26.6°, 20.6°)

(26.6°, 0.00°)

(26.6°, -20.6°)

(0.00°, -20.6°)

(0.00°, 0.00°)

Y-direction (0.00°, 12.2°)

X-direction (16.1°, 12.2°)

(16.1°, 0.00°)

(16.1°, -12.2°)

(0.00°, -12.2°)

(0.00°, 0.00°)

Y-direction (0.00°, 7.13°)

X-direction (9.46°, 7.13°)

(9.46°, 0.00°)

(9.46°, -7.13°)

(0.00°, -7.13°)

(0.00°, 0.00°)

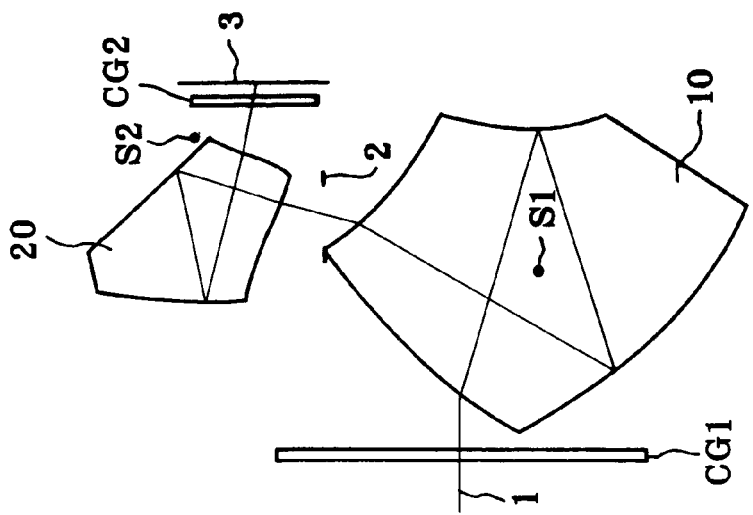
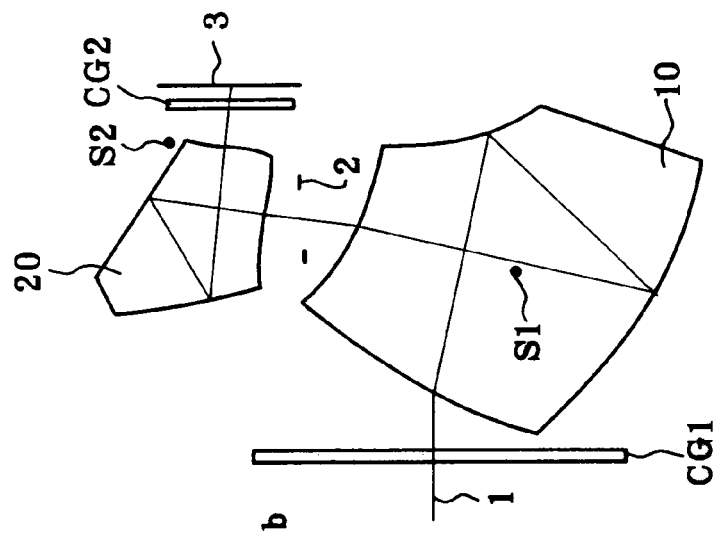
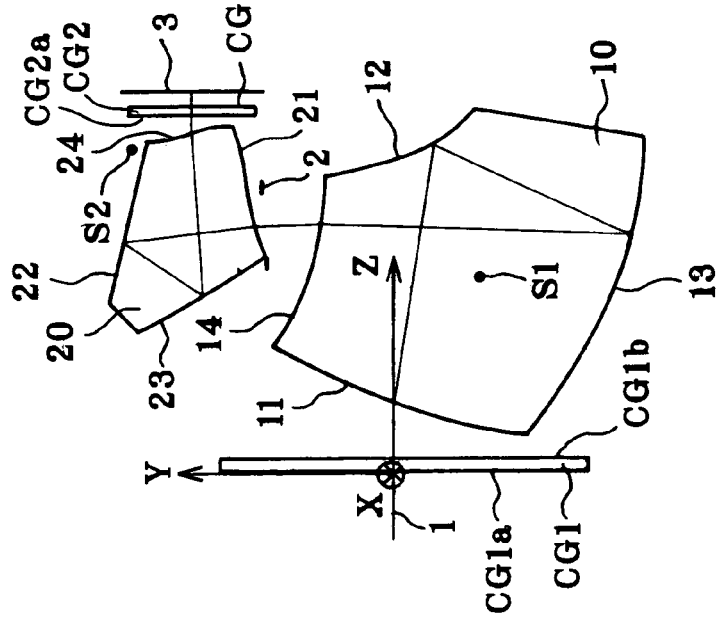

FIG. 10(k) Y-direction
(0.00°, 20.6°)
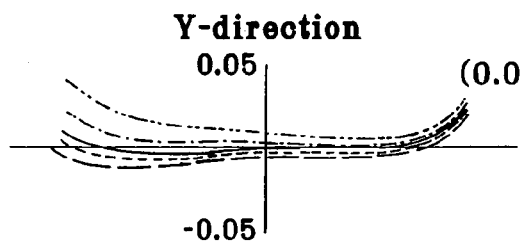
FIG. 10(l) X-direction
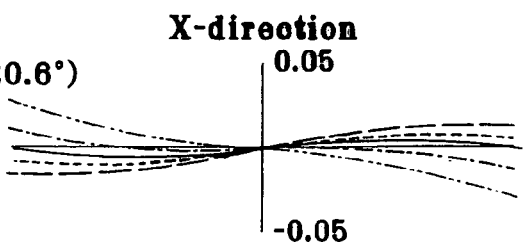
FIG. 10(i)
(26.6°, 20.6°)
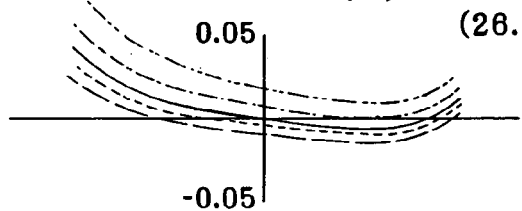
FIG. 10(j)
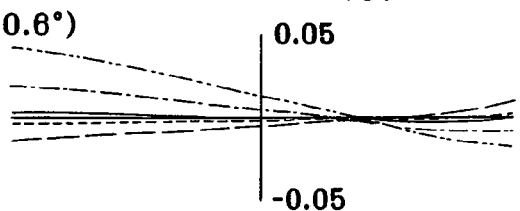
FIG. 10(g)
(26.6°, 0.00°)
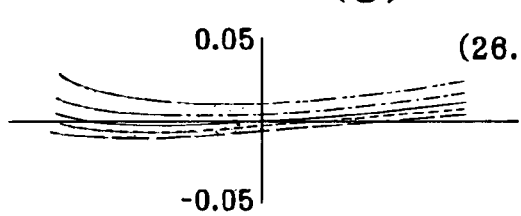
FIG. 10(h)
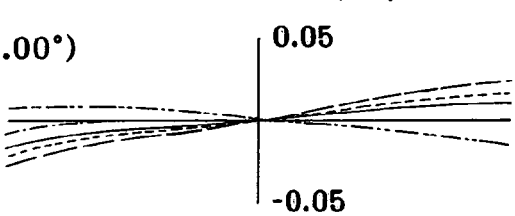
FIG. 10(e)
(26.6°, -20.6°)
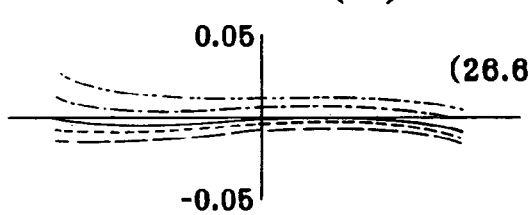
FIG. 10(f)
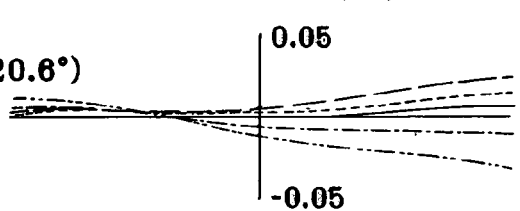
FIG. 10(c)
(0.00°, -20.6°)
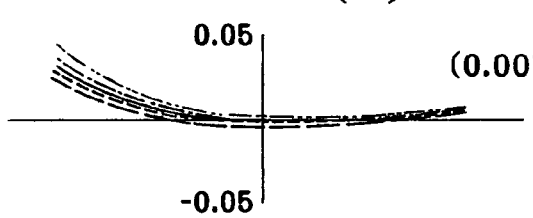
FIG. 10(d)
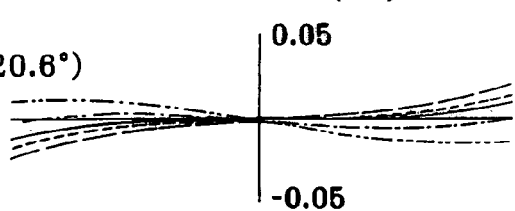
FIG. 10(a)
(0.00°, 0.00°)
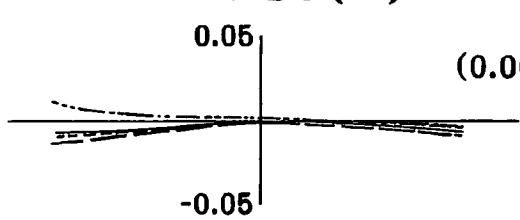
FIG. 10(b)
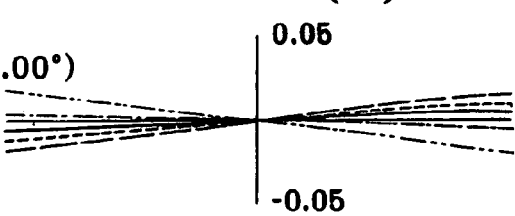

FIG. 11(k)
Y-direction
FIG. 11(l)
X-direction
(0.00°, 12.2°)
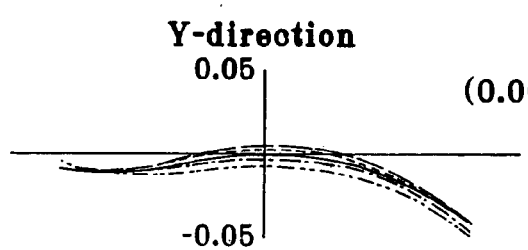
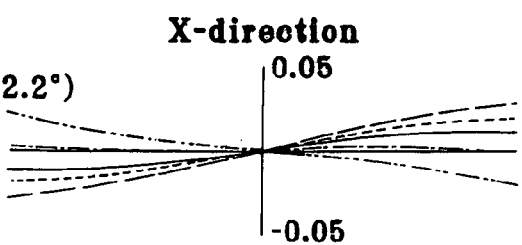
FIG. 11(i)
FIG. 11(j)
(16.1°, 12.2°)
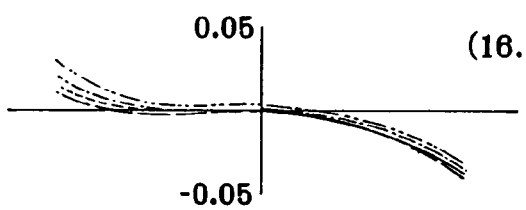
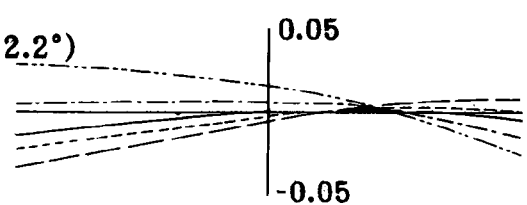
FIG. 11(g)
FIG. 11(h)
(16.1°, 0.00°)
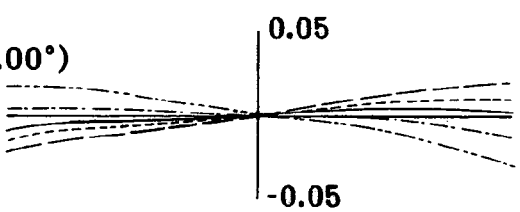
FIG. 11(e)
FIG. 11(f)
(16.1°, -12.2°)
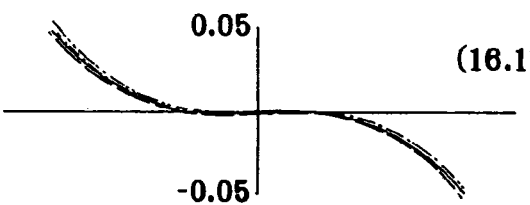
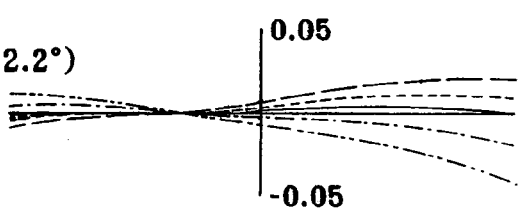
FIG. 11(c)
FIG. 11(d)
(0.00°, -12.2°)
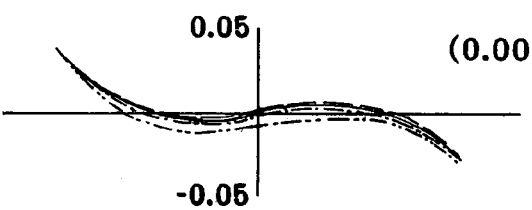
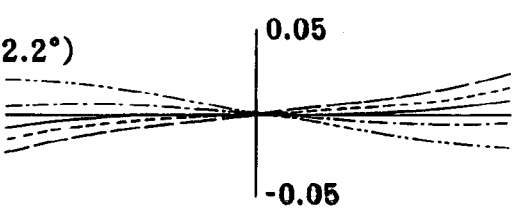
FIG. 11(a)
FIG. 11(b)
(0.00°, 0.00°)
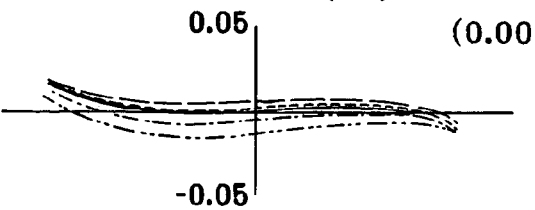
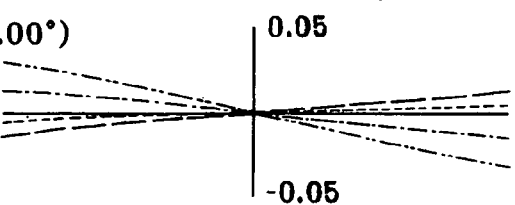

Y-direction
(0.00°, 7.13°)

X-direction (9.46°, 7.13°)

(9.46°, 0.00°)

(9.46°, -7.13°)

(0.00°, -7.13°)

(0.00°, 0.00°)

ZOOM OPTICAL SYSTEM, AND ELECTRONIC EQUIPMENT INCORPORATING THE SAME

This application claims benefit of Japanese Application No. 2004-65128 filed in Japan on Mar. 3, 2004 as well as Japanese Application Nos. 2004-94284 and 2004-94285 filed in Japan on Apr. 6, 2004, the contents of which are incorporated by this reference.

BACKGROUND OF THE INVENTION

The present invention relates generally to a zoom optical system and electronic equipment incorporating the same, and more particularly to a compact zoom optical system and electronic equipment incorporating the same. The electronic equipment contemplated herein, for instance, includes digital cameras, video cameras, digital video units, personal computers, mobile computers, cellular phones and personal digital assistants.

Some optical systems have been proposed for zoom image pickup optical systems made up of free-form surface prisms.

One of those optical systems is designed to move a plurality of prisms for zooming. This arrangement has to previously have a prism movement space therein.

Another optical system is designed to move an aperture with respect to a prism to vary the position of incidence of light rays for zooming. However, this optical system, because of being adapted to from a primary image, becomes bulky. In addition, not only a movement mechanism but also a mechanism for varying an aperture diameter is needed to allow the aperture to have a brightness control function.

Yet another optical system, too, becomes bulky because of being adapted to form a primary image. For zooming, an image-side prism is rotated with the center of rotation on the position of the primary image, resulting in an increase in the amount of movement in association with the rotation of the image-side prism.

SUMMARY OF THE INVENTION

According to the first aspect of the invention, there is provided a zoom optical system, comprising:
a stop, and
an optical element located on an object side of the zoom optical system with respect to said stop, wherein:
said optical element has at least one optical function surface, wherein said at least one optical function surface comprises a continuous surface and is constructed such that a line of intersection of a given reference plane with said optical function surface is configured such that there is a continuous change in at least a radius of curvature from one end toward another end, and
said optical element is rotated about a given axis of rotation, wherein:
said given reference plane is defined by a direction vector in a direction toward a distant object and a vector that passes through a center of said stop and is vertical to a stop plane, and said given axis of rotation is an axis that passes through a point that is not contiguous to said optical function surface within said given reference plane and is vertical to said given reference plane.

According to the second aspect of the invention, there is provided a zoom optical system, comprising:
a stop, and
an optical element located on an object side of the zoom optical system with respect to said stop, wherein:
said optical element has at least one optical function surface, wherein said at least one optical function surface comprises a continuous surface and is constructed such that a line of intersection of a given reference plane with said optical function surface is configured such that there is a continuous change in at least a radius of curvature from one end toward another end,
said optical element is rotated about a given axis of rotation, and
an image plane is fixed with respect to said stop or movable in a fixed plane, wherein:
said given reference plane is defined by a direction vector in a direction toward a distant object and a vector that passes through a center of said stop and is vertical to a stop plane, and said given axis of rotation is an axis that passes through a point that is not contiguous to said optical function surface within said given reference plane and is vertical to said given reference plane.

According to the third aspect of the invention, there is provided a zoom optical system, comprising:
a stop,
a first optical element located on an object side of the zoom optical system with respect to said stop, and
a second optical element located on an image side of the zoom optical system with respect to said stop, wherein:
said first optical element comprises at least one optical function surface, and
said second optical element comprises at least one optical function surface, wherein:
said at least one optical function surface of said first optical element comprises a continuous surface and is constructed such that a line of intersection of a given first reference plane with said optical function surface of said first optical element is configured such that there is a continuous change in at least a radius of curvature from one end toward another end, and
said at least one optical function surface of said second optical element comprises a continuous surface and is constructed such that a line of intersection of a given second reference plane with said optical function surface of said second optical element is configured such that there is a continuous change in at least a radius of curvature from one end toward another end,
said first optical element is rotated about a given first axis of rotation, and
said second optical element is rotated about a given second axis of rotation, wherein:
said given first reference plane for said first optical element is defined by a direction vector in a direction toward a distant object and a vector that passes through a center of said stop and is vertical to a stop plane, and said given first axis of rotation is an axis that passes through a point that is not contiguous to said optical function surface within said given first reference plane and is vertical to said given first reference plane, and
said given second reference plane for said second optical element is defined by a direction vector in a direction toward a distant object and a vector that passes through a center of said stop and is vertical to a stop plane, and said given second axis of rotation is an axis that passes through a point that is not contiguous to said optical function surface within said given second reference plane and is vertical to said given second reference plane.

According to the fourth aspect of the invention, there is provided a zoom optical system, comprising:

a stop, a first optical element located on an object side of the zoom optical system with respect to said stop, and a second optical element located on an image side of the zoom optical system with respect to said stop, wherein:

said first optical element comprises at least one optical function surface, and said second optical element comprises at least one optical function surface, wherein:

said at least one optical function surface of said first optical element comprises a continuous surface and is constructed such that a line of intersection of a given first reference plane with said optical function surface of said first optical element is configured such that there is a continuous change in at least a radius of curvature from one end toward another end, and said at least one optical function surface of said second optical element comprises a continuous surface and is constructed such that a line of intersection of a given second reference plane with said optical function surface of said second optical element is configured such that there is a continuous change in at least a radius of curvature from one end toward another end, said first optical element is rotated about a given first axis of rotation while, at the same time, said second optical element is rotated about a given second axis of rotation in the same direction as that of rotation of said first optical element, wherein:

said given first reference plane for said first optical element is defined by a direction vector in a direction toward a distant object and a vector that passes through a center of said stop and is vertical to a stop plane, and said given first axis of rotation is an axis that passes through a point that is not contiguous to said optical function surface within said given first reference plane and is vertical to said given first reference plane, and said given second reference plane for said second optical element is defined by a direction vector in a direction toward a distant object and a vector that passes through a center of said stop and is vertical to a stop plane, and said given second axis of rotation is an axis that passes through a point that is not contiguous to said optical function surface within said given second reference plane and is vertical to said given second reference plane.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 9(a), 9(b) and 9(c) are illustrative in section of the arrangements and optical paths at a wide-angle end (a), an intermediate setting (b) and a telephoto end (c) of the zoom optical system according to Example 2 of the invention.

FIG. 10 is a diagram for transverse aberrations at the wide-angle end of the optical system according to Example 2.

FIG. 11 is a diagram for transverse aberrations at the intermediate setting of the optical system according to Example 2.

DESCRIPTION OF THE PREFERRED EMBODIMENTS

The advantages of, and the requirements for, the above arrangements according to the invention are now explained.

In one preferable embodiment of the invention, at least one optical function surface comprising a reflecting or refracting surface (an optical element having an optical function surface) is located on an object side of the zoom optical system with respect to a stop, and that optical function surface is rotated about a point spaced away from that optical function surface. With such an arrangement, the position of light rays (light beam) that passes through the optical function surface (subjected to reflection or refraction) is varied for zooming. As a consequence, fewer optical elements can be used to achieve a zoom optical system at lower costs, and the stop remains so fixed in position that the associated stop mechanism can be more simplified.

Figure 1:
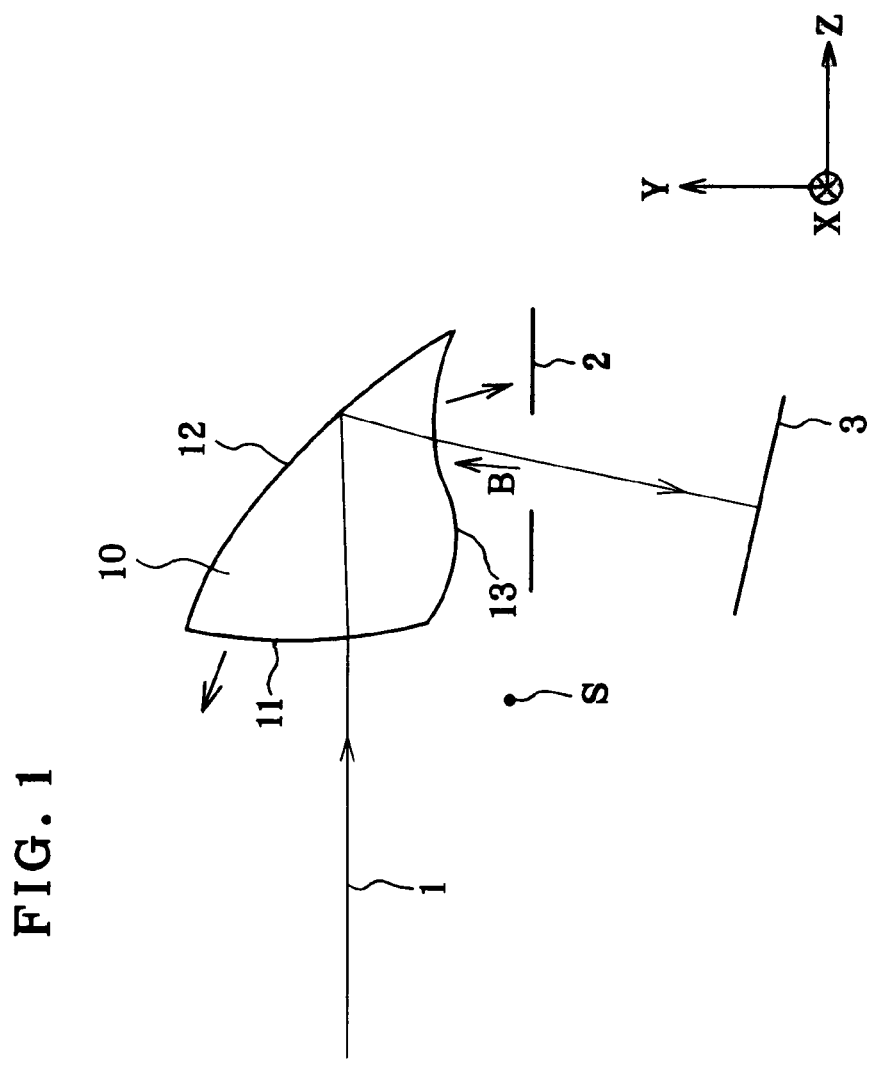
FIG. 1 is illustrative in schematic of the fundamental arrangement of the zoom optical system according to the invention.

More specifically, FIG. 1 is illustrative in schematic of the construction of the zoom optical system. With this zoom optical system, an image of a distant object O is formed on an image plane 3 with no formation of any intermediate image. Here let a vector A represent a direction vector in a direction from the zoom optical system toward the distant object (subject) O, and a vector B represent a direction vector that passes through the center of an aperture stop 2 in the optical system and is vertical to a stop plane. Then, a reference plane (Y-Z plane) is given by one plane defined by vectors A and B. The reference plane is found in the paper plane of FIG. 1, and the zoom optical system is symmetric with respect to that reference plane.

The zoom optical system comprises one or more optical elements 10 on its object side with respect to the stop 2. Each optical element 10 has at least one optical function surface. In the embodiment of FIG. 1, the optical element 10 comprises three optical function surfaces 11, 12 and 13 that form together one reflecting prism. However, it is noted that one or at least four optical function surfaces could be used. Although the optical function surface 12 is shown as a reflecting surface in FIG. 1, it is not necessarily limited thereto, and so a refracting surface could be used instead. The optical function surfaces 11 and 13 in FIG. 1 are refracting surfaces.

In this zoom optical system, the optical element 10 is rotated about the axis S of rotation (center axis) vertical to the reference plane. It follows that the zoom optical system is designed to perform zooming by rotation.

The optical function surface 12 is preferably configured as follows. First, the optical function surface 12 is preferably given by a continuous surface. The term "continuous surface", for instance, refers to a surface whose shape varies smoothly. Second, the optical function surface 12 is preferably given by a surface including zones with different radii of curvature. Referring here to this point, a line of intersection is created by the intersection of the reference plane with the optical function surface. As a matter of course, that line of intersection is included in the optical function surface 12. That line of intersection should then preferably be configured such that at least the radius of curvature (the radius of curvature in the paper plane of FIG. 1) changes continuously from one end to another end. In other words, the optical function surface must be given by the plane including such a line of intersection. For allowing the focal length of the optical system to change continuously, it is required that (1) the position of an axial chief ray 1 that crosses the optical function surface 12 be variable in association with rotation, and (2) the radius of curvature of the optical function surface 12 change continuously in a direction along the line of intersection. It is also desired that the radius of curvature in a direction vertical to the reference plane, too, changes continuously. It is here noted that the axial chief ray means a light ray that passes through the center of the stop 2 and arrives at the center of the image plane 3.

Here the axis S of rotation must be positioned at a point off the line of intersection (i.e., at a position that is not contiguous to the optical function surface 12 within the reference plane). This ensures that the point of the axial chief ray 1 crossing the optical function surface 12 changes in association with the rotation of the optical element 10. Especially with the axis S of rotation positioned away from that line of intersection, it is possible to largely change the position of the axial chief ray 1 crossing the optical function surface 12 and, hence, obtain a high zoom ratio.

Another line of intersection is created by the intersection of the reference plane with the optical function surface 11, and yet another line of intersection is created by the intersection of the reference plane with the optical function surface 13 as well. Of course, the axis S of rotation could be positioned on those lines of intersection (or, in another parlance, contiguous to the optical function surfaces 11 and 13 except the optical function surface 12). With the axis S of rotation positioned within or near the prism, the amount of movement of the prism could be reduced upon rotation.

Among possible surfaces configured such that their radii of curvature change continuously within one section as described above, there is a rotationally asymmetric surface represented by a free-form surface that is defined by the following formula (a). The Z-axis in this defining formula provides the axis of the free-form surface.

$$Z = cr^2 / \left[1 + \sqrt{\{1 - (1+k)c^2 r^2\}}\right] + \sum_{j=2}^{66} C_j X^m Y^n \quad (a)$$

Here the first term of formula (a) is a spherical term and the second term is a free-form surface term.

In the spherical term:

c is the curvature of the vertex, and k is the conic (conical) coefficient, $r = \sqrt{(X^2 + Y^2)}$ r.

The free-form surface term is $$\sum_{j=2}^{66} C_j X^m Y^n = C_2 X + C_3 Y + C_4 X^2 + C_5 XY + C_6 Y^2 + C_7 X^3 +$$
$$C_8 X^2 Y + C_9 XY^2 + C_{10} Y^3 + C_{11} X^4 + C_{12} X^3 Y + C_{13} X^2 Y^2 +$$
$$C_{14} XY^3 + C_{15} Y^4 + C_{16} X^5 + C_{17} X^4 Y + C_{18} X^3 Y^2 + C_{19} X^2 Y^3 +$$
$$C_{20} XY^4 + C_{21} Y^5 + C_{22} X^6 + C_{23} X^5 Y + C_{24} X^4 Y^2 + C_{25} X^3 Y^3 +$$
$$C_{26} X^2 Y^4 + C_{27} XY^5 + C_{28} Y^6 + C_{29} X^7 + C_{30} X^6 Y + C_{31} X^5 Y^2 +$$
$$C_{32} X^4 Y^3 + C_{33} X^3 Y^4 + C_{34} X^2 Y^5 + C_{35} XY^6 + C_{36} Y^7 + \cdots$$

Here $C_j$ (j is an integer of 2 or greater) is a coefficient.

In general, the aforesaid free-form surface has no symmetric surface at both the X-Z plane and the Y-Z plane. However, by reducing all the odd-numbered terms for X to zero, that free-form surface can have only one symmetric surface parallel with the Y-Z plane. Likewise, by reducing all the odd-numbered terms for Y to zero, the free-form surface can have only one symmetric surface parallel with the X-Z plane.

Among other free-form surface defining formulae, there is Zernike polynomial given by the following formula (b) that defines the shape of this surface. The axis for Zernike polynomial is given by the Z-axis of the defining formula (b). The rotationally asymmetric surface is defined by polar coordinates for the height of the Z-axis with respect to the X-Y plane provided that R is the distance from the Z-axis within the X-Y plane and A is the azimuth angle around the Z axis, as expressed by the angle of rotation measured from the X-axis.

$$x = R \times \cos(A) \tag{b}$$
$$y = R \times \sin(A)$$
$$Z = D_2 + D_3 R\cos(A) + D_4 R\sin(A) + D_5 R^2 \cos(2A) +$$
$$D_6(R^2 - 1) + D_7 R^2 \sin(2A) + D_8 R^3 \cos(3A) +$$
$$D_9(3R^3 - 2R)\cos(A) + D_{10}(3R^3 - 2R)\sin(A) +$$
$$D_{11} R^3 \sin(3A) + D_{12} R^4 \cos(4A) +$$
$$D_{13}(4R^4 - 3R^2)\cos(2A) + D_{14}(6R^4 - 6R^2 + 1) +$$
$$D_{15}(4R^4 - 3R^2)\sin(2A) + D_{16} R^4 \sin(4A) +$$
$$D_{17} R^5 \cos(5A) + D_{18}(5R^5 - 4R^3)\cos(3A) +$$
$$D_{19}(10R^5 - 12R^3 + 3R)\cos(A) +$$
$$D_{20}(10R^5 - 12R^3 + 3R)\sin(A) +$$
$$D_{21}(5R^5 - 4R^3)\sin(3A) + D_{22} R^5 \sin(5A) +$$
$$D_{23} R^6 \cos(6A) + D_{24}(6R^6 - 5R^4)\cos(4A) +$$
$$D_{25}(15R^6 - 20R^4 + 6R^2)\cos(2A) +$$
$$D_{26}(20R^6 - 30R^4 + 12R^2 - 1) +$$
$$D_{27}(15R^6 - 20R^4 + 6R^2)\sin(2A) +$$
$$D_{28}(6R^6 - 5R^4)\sin(4A) + D_{29} R^6 \sin(6A) + \cdots$$

Here $D_m$ (m is an integer of 2 or greater) is a coefficient. It is noted that when this free-form surface is designed in the form of an optical system symmetric in the X-axis direction, $D_4$, $D_5$, $D_6$, $D_{10}$, $D_{11}$, $D_{12}$, $D_{13}$, $D_{14}$, $D_{20}$, $D_{21}$, $D_{22}$ . . . are used.

The aforesaid defining formulae are given for the purpose of illustrating surfaces of rotationally asymmetric curved shape, and so it is understood that the same effects are obtainable even with any other defining formula.

Given below is yet another free-form surface defining formula (c).

$$Z = \Sigma\Sigma C_{nm} XY$$

Considering k=7 (the seventh term) as an example, the free-form surface upon expanded is represented as below.

$$Z = C_2 + C_3 Y + C_4 |X| + C_5 Y^2 + C_6 Y|X| + C_7 X^2 + C_8 Y^3 + C_9 Y^2 |X| + \tag{c}$$
$$C_{10} YX^2 + C_{11} |X^3| + C_{12} Y^4 + C_{13} Y^3 |X| + C_{14} Y^2 X^2 + C_{15} Y|X^3| +$$
$$C_{16} X^4 + C_{17} Y^5 + C_{18} Y^4 |X| + C_{19} Y^3 X^2 + C_{20} Y^2 |X^3| + C_{21} YX^4 +$$
$$C_{22} |X^5| + C_{23} Y^6 + C_{24} Y^5 |X| + C_{25} Y^4 X^2 + C_{26} Y^3 |X^3| +$$
$$C_{27} Y^2 X^4 + C_{28} Y|X^5| + C_{29} X^6 + C_{30} Y^7 + C_{31} Y^6 |X| + C_{32} Y^5 X^2 +$$
$$C_{33} Y^4 |X^3| + C_{34} Y^3 X^4 + C_{35} Y^2 |X^5| + C_{36} YX^6 + C_{37} |X^7|$$

An anamorphic surface, and a toric surface could also be used for the rotationally asymmetric surface.

Although not shown in FIG. 1, another optical element(s) having at least one optical function surface could be located on an image side of the zoom optical system with respect to the stop 2. At least one optical function surface (hereinafter called the optical function surface X) of that another optical element should preferably comprise a continuous surface. The optical function surface X should then preferably be constructed such that the line of intersection of the reference plane with the optical function surface X (hereinafter called the line X of intersection) is configured such that at least the radius of curvature changes continuously from one end to another end. It is also desired that the radius of curvature in a direction vertical to the reference plane changes continuously.

For that another optical element, it is desired to use an optical element having three or more optical function surfaces as is the case with the optical element 10 located on the object side of the zoom optical system with respect to the stop 2. It is then particularly preferable to use an optical element set up as a reflecting prism that may have four or more optical function surfaces given by either reflecting or refracting surfaces.

For zooming, another optical element is preferably rotated about an axis S' of rotation. In this case, if that another optical element is rotated in cooperation with the optical element 10, it is then possible to obtain much higher zoom ratios. It is noted that the axis S' of rotation is vertical to the reference plane, and positioned off the line X of intersection.

In an alternative embodiment of the invention, the image plane 3 is not fixed with respect to the stop 2. In other words, when the optical element on the object side with respect to the stop 2 (hereinafter referred to as the optical element F) and another optical element located on the image side with respect to the stop 2 (hereinafter referred to as the optical element R) are rotated, the image plane 3 is preferably moved in cooperation with that rotation.

In a further embodiment of the invention, the axial chief ray 1 incident on the first surface facing the object O (the optical function surface 11 in FIG. 1) could remain unfixed. For instance, the zoom optical system could be designed such that the axial chief ray 1 moves parallel in response to magnification changes.

Preferably, the image-formation optical system is also constructed such that upon zooming, the optical function surface positioned just before the stop (hereinafter called the optical function surface F) and the optical function surface positioned just after the stop (hereinafter called the optical function surface R) are rotated in mutually different directions with respect to the stop. Such being the arrangement, the axial chief ray passes through the center of the stop. Accordingly, there are obtained large changes in the position of the optical function surface R relative to the optical function surface F and, hence, large magnification changes.

For the optical element F, it is desired to have at least one reflecting surface. The rotation of the optical element takes space. If the optical element F has at least one reflecting surface, it is then possible to turn back an optical path; that is, it is possible for light rays to pass through the same space plural times. Accordingly, the efficiency of utilization of that space is improved, leading to size reductions of the optical system. The inclusion of at least one reflecting surface also reduces chromatic and other aberrations.

For the optical element F, it is also desired to have three or more surfaces. The inclusion of three or more surfaces makes the length of the optical path in the optical element so longer that there can be obtained a large change in the length of the optical path therein in association with rotation and, hence, more striking zoom effects can be obtained with fewer optical elements and more compact volumes.

The inclusion of three or more surfaces also ensures that some surfaces of the optical element F can be used as refracting surfaces. Allowing those surfaces to have refracting power ensures a large change in the power profile in the optical element in association with rotation. Accordingly, more striking zoom effects can be obtained with fewer optical elements and more compact volumes.

For the optical element F, it is further desired to have at least one rotationally asymmetric surface. Upon rotation of the optical element F, there are decentration aberrations. The decentration aberrations can be well minimized within the optical element F if it has at least one rotationally asymmetric surface.

Moreover for the optical element F, it is desired to satisfy the following condition (1) in terms of the angle of rotation upon zooming.

$$0° < \theta < 120° \tag{1}$$

Here $\theta$ is the angle of rotation of the optical element.

As the optical element is rotated at the angle of rotation that satisfies condition (1), it allows the length of the optical path in the optical element F and power profile to change largely. Accordingly, more striking zoom effects can be obtained with fewer optical elements and more compact volumes. As the upper limit of 120° to condition (1) is exceeded, it causes light rays leaving the optical element F to fluctuate too largely. To avoid this, there is no choice but to increase the area of the optical function surface positioned on the exit side of the optical element F. This in turn causes the whole optical system to become unpreferably large. As the lower limit of 0° is not reached, it renders optical path selection itself impossible; that is, it is impossible to change optical parameters.

More preferably, the following condition (1-1) should be satisfied.

$$5° < \theta < 90° \tag{1-1}$$

At greater than the upper limit of 90° to condition (1-1), much the same results as is the case with condition (1) are only obtained. At less than the lower limit of 5°, there is little zoom effect in association with rotation, or else there is no choice but to increase the amount of deformation of the optical function surface for the purpose of achieving zoom effects with the result that it is difficult to obtain performance by keeping back aberrations.

Even more preferably, the following condition (1-2) should be satisfied.

$$10° < \theta < 60° \tag{1-2}$$

For the zoom ratio, it is preferable to satisfy the following condition (2).

$$1.01 < \beta < 20 \tag{2}$$

Here $\beta$ is the zoom ratio.

As zooming takes place at the zoom ratio that satisfies condition (2), some significant zoom effects are achievable with performance kept intact. At greater than the upper limit of 20 to condition (2), the necessary angle of rotation becomes large, in turn causing light rays leaving the optical element F to fluctuate too largely. To avoid this, there is no option but to increase the area of the optical function surface positioned on the exit side of the optical element F. However, this renders the whole optical system un-preferably bulky. Otherwise, there is no option but to increase the amount of deformation of the shape of the optical function surface to obtain the desired zoom ratio. This is not preferable because it is difficult to obtain performance while aberrations are kept back. Falling short of the lower limit of 1.01 is not preferable because the zoom ratio becomes low.

More preferably, the following condition (2-1) should be satisfied.

$$1.5 < \beta < 18 \tag{2-1}$$

Even more preferably, the following condition (2-2) should be satisfied.

$$1.8 < \beta < 16 \tag{2-2}$$

It is further preferable to satisfy the following condition.

$$0 < \nu_{max} - \nu_{min} < 100 \tag{3}$$

Here $\nu_{max}$ is the maximum Abbe constant of an optical element included in the optical system, and $\nu_{min}$ is the minimum Abbe constant of an optical element included in the optical system.

The use of the optical elements (optical elements F and R) that satisfy condition (3) ensures that chromatic aberrations produced at the optical system are well reduced with fewer optical elements and compact volumes. There is no material that exceeds the upper limit of 100 to condition (3). As the lower limit of 0 is not reached, it means that the optical system is made up of only one material, or materials having quite the same Abbe constant. This is not preferable because of a failure in satisfactory reductions of chromatic aberrations.

More preferably, the following condition (3-1) should be satisfied.

$$5 < \nu_{max} - \nu_{min} < 100 \tag{3-1}$$

There is no material that exceeds the upper limit of 100 to condition (3-1). Falling short of the lower limit of 5 is not preferable because there is too small a difference in the Abbe constant of the optical materials used, failing to satisfactorily hold back chromatic aberrations.

Even more preferably, the following condition (3-2) should be satisfied.

$$10 < \nu_{max} - \nu_{min} < 100 \quad (3\text{-}2)$$

As described above, it is not always necessary to fix the image plane 3 with respect to the stop 2. In this respect, further reference is now made.

In another embodiment of the zoom optical system of the invention, the image plane 3 could be fixed with respect to the fixed stop 3 or movable within a fixed plane. As the image plane 3 remains fixed or is movable in the fixed plane, it makes unnecessary to move a light-receiving portion of an image pickup device or the like located at the image plane. Accordingly, that light-receiving portion can be simplified in construction with the consequence that the zoom optical system can be made compact.

As described above, one or more separate optical elements could be located on the image side with respect to the stop 2. In this respect, further reference is now made.

In yet another embodiment of the zoom optical system of the invention, optical elements could be located on the object and image sides with respect to the stop, at least one on each side. Each optical element has optical function surfaces comprising reflecting or refracting surfaces. Those optical function surfaces are rotated about a point off them, so that the positions of light rays (light beam) passing through them (subjected to reflection or refraction) can be changed for zooming. Consequently, a more compact zoom optical system is achievable with fewer optical elements and at lower costs. In addition, since the stop remains fixed in position, the stop mechanism can be more simplified.

Even with one optical element adapted to rotate with respect to the image plane, zoom effects may be obtainable. However, the image point position is displaced in association with rotation. Rotation of the optical element is somehow achievable with no displacement of the image point position. However, attempts to have high zoom ratios render surface shape complicated, resulting in difficulty with which satisfactory optical performance is obtainable. Otherwise, it is required to increase optical element size to obtain satisfactory optical performance or to use some mechanisms for non-rotational movements. However, allowing two or more optical elements to rotate prevents displacement of the image point position, and makes it possible to obtain more striking zoom effects with fewer optical elements and compact volumes.

Figure 2:
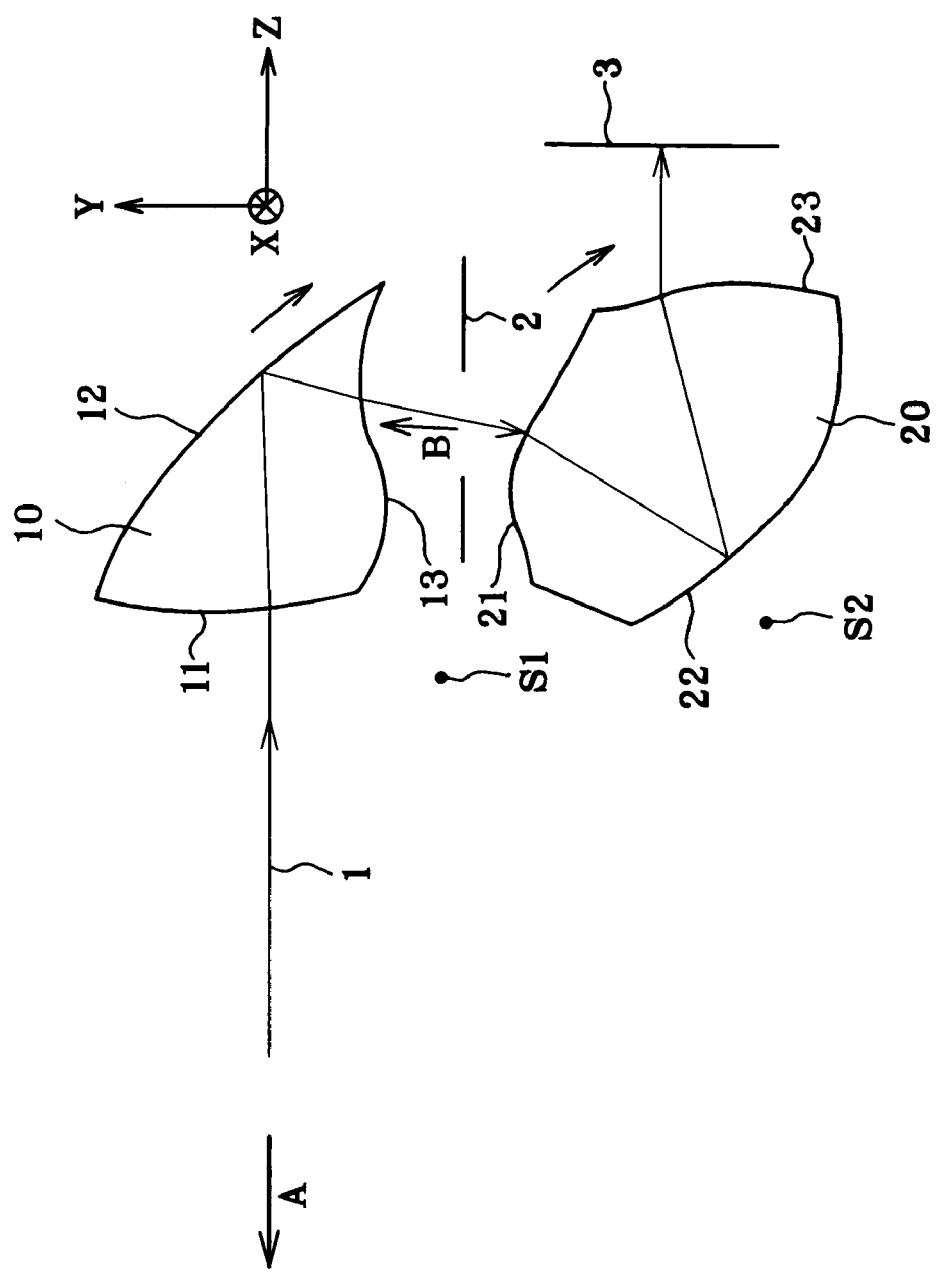
FIG. 2 is illustrative in schematic of the fundamental arrangement of the zoom optical system according to the invention, wherein two or more optical elements are rotated.

Referring more specifically to FIG. 2 that is illustrative in schematic of the construction of the zoom optical system, it is adapted to form an image of a distant object O on an image plane 3 with no formation of any intermediate image. Here let a vector A represent a direction vector in a direction from this optical system toward a distant object (subject) O, and a vector B stand for a direction vector that passes through the center of an aperture stop 2 in the optical system and is vertical to a stop plane. In the invention, one plane defined by the vectors A and B is referred to as a reference plane (Y-Z plane) that lies in the paper plane of FIG. 2. The zoom optical system is symmetric with respect to this reference plane.

In the zoom optical system, optical elements 10 and 20 having at least one optical function surface are located on the object and image sides thereof with respect to the stop 2, at least one on each side. In FIG. 2, the optical element 10 on the object side with respect to the stop 2 comprises three optical function surfaces 11, 12 and 13 that form together one reflecting prism. The optical element 20 on the image side with respect to the stop 2, too, comprises three optical function surfaces 21, 22 and 23 that form together one reflecting prism. However, each optical element 10, 20 could have one, or four or more optical function surfaces. Although the optical function surface 12 is shown as a reflecting surface in FIG. 2, it is not necessarily limited thereto, and so a refracting surface could be used instead. The optical function surfaces 11, 13, 21 and 23 in FIG. 2 are refracting surfaces.

In this zoom optical system, the optical element 10 is rotated about the axis Si of rotation (center axis) vertical to the reference plane, and in association with this, the optical element 20 is rotated about the axis S2 of rotation (center axis) vertical to the reference plane, too. It follows that the zoom optical system is designed to perform zooming by rotation of two optical elements 10 and 20.

The optical function surface 12, 22 is preferably configured as follows. First, the optical function surface 12, 22 is preferably given by a continuous surface, as already defined.

Here the axis S1, S2 of rotation must be positioned at a point off the line of intersection (i.e., at a position that is not contiguous to the optical function surface 12, 22 within the reference plane). This ensures that the point of the axial chief ray 1 crossing the optical function surface 12, 22 changes in association with the rotation of the optical element 10, 20.

Especially with the axis S1, S2 of rotation positioned away from that line of intersection, it is possible to largely change the position of the axial chief ray 1 crossing the optical function surface 12, 22 and, hence, obtain a high zoom ratio.

Thus, allowing two or more optical elements 10, 20 to rotate in operable association ensures that more striking zoom effects are achievable with fewer optical elements and more compact volumes yet with no displacement of the image plane 3.

Another line of intersection is created by the intersection of the reference plane with the optical function surface 11, 21, and yet another line of intersection is created by the intersection of the reference plane with the optical function surface 13, 23. Of course, the axis S1, S2 of rotation could be positioned on those lines of intersection (or, in another parlance, contiguous to the optical function surfaces 11, 13, 21 and 23 except the optical function surfaces 12 and 22). With the axis S1, S2 of rotation positioned within or near the prism 10, 20, the amount of movement of the prism could be reduced upon rotation of the prism.

In the instant embodiment of the invention, the optical element 10 on the object side with respect to the stop 2 and another optical element 20 on the image side with respect to the stop 2 are rotated for zooming purposes. The image-formation optical system is then preferably constructed such that the optical function surface 13 positioned right before the stop 2 and the optical function surface 21 positioned right after the stop 2 are rotated in mutually different directions relative to the stop 2. Such being the arrangement, the axial chief ray 1 passes through the center of the stop 2, so that the position of the optical function surface 21 can be largely changed relative to the optical function surface 13 with the result that there can be large magnification changes. It is here noted that the optical function surfaces 12 and 21 mean non-planar surfaces.

For the optical element 10, 20, it is desired to have at least one reflecting surface. The rotation of the optical element takes space. If the optical element 10, 20 has at least one reflecting surface, it is then possible to turn back an optical path; that is, it is possible for light rays to pass through the same space plural times. Accordingly, the efficiency of utilization of that space is improved, leading to size reductions of the optical system. The inclusion of at least one reflecting surface also holds back chromatic and other aberrations.

For the optical element 10, 20, it is also desired to have three or more surfaces. The inclusion of three or more surfaces makes the length of the optical path in the optical element so longer that there can be obtained a large change in the length of the optical path therein in association with rotation and, hence, more striking zoom effects can be obtained with fewer optical elements and more compact volumes.

The inclusion of three or more surfaces also ensures that some surfaces of the optical element 10, 20 can be used as refracting surfaces. Allowing those surfaces to have refracting power ensures a large change in the power profile in the optical element in association with rotation. Accordingly, more striking zoom effects can be obtained with fewer optical elements and more compact volumes.

For the optical element 10, 20, it is further desired to have at least one rotationally asymmetric surface. Upon rotation of the optical element 10, 20, there are decentration aberrations. The decentration aberrations can be well minimized within the optical element 10, 20 if it has at least one rotationally asymmetric surface.

The aforesaid conditions (1), (1-1), (2), (2-1), (3), (3-1) and (3-2) also hold true for the zoom optical system comprising the optical elements 10 and 20. For instance, the optical element 20, let alone the optical element 10, should preferably satisfy conditions (1) and (1-1). The optical elements F and R in the foregoing explanation of the conditions correspond to the optical elements 10 and 20, respectively.

The optical element 10 and the optical element 20 could be rotated as follows.

The zoom optical system is designed in such a way as to include two or more rotating optical elements with the stop sandwiched between them, wherein both optical elements are rotated in the same direction. Such being the arrangement, two optical function surfaces positioned with the stop interposed between them move in mutually opposite directions, so that even with lesser amounts of rotation, higher zoom ratios are achievable while aberrations are well kept back.

Referring specifically to FIG. 2, two or more optical elements 10 and 20 are rotated in cooperation, as indicated by an arrow, so that zooming can be carried out with no displacement of the position of the image plane 3. In this case, the optical function surfaces 13 and 21 opposing with the stop 2 interposed between them (refracting surfaces in FIG. 2) move in mutually opposite directions. Accordingly, zooming can take place with lesser amounts of rotation even at the same zoom ratio, because the amount of relative movement becomes larger than that of movement of either one of the optical elements. The result is that even with lesser amounts of rotation, higher zoom ratios are achievable while aberrations are well kept back. It is also possible to obtain more striking zooming effects with fewer optical elements and more compact volumes.

The electronic equipment of the invention preferably comprises each of the optical systems described so far and an electronic image pickup device located on the image side thereof. Each optical system is a compact, slimmed-down, low-cost one. Therefore, if such an optical system is incorporated in the electronic equipment as an image pickup optical system, it is then possible to reduce the size, thickness and cost of the electronic equipment. The electronic equipment, for instance, includes digital cameras, video cameras, digital video units, personal computers, mobile computers, cellular phones, personal digital assistants, and electronic endoscopes.

Preferably, the electronic equipment comprises means for electrically correcting the shape of an image formed through the zoom optical system. This zoom optical system is susceptible to produce rotationally asymmetric image distortions varying with magnifications and chromatic aberrations. When it is intended to make good correction for such aberrations by the optical system, there is an increase in the number of optical elements and, hence, an increase in the size of the optical system. Therefore, portions of the aberrations left undercorrected at the optical system are electrically corrected. This is preferable because the optical system can be made more compact.

That correction is preferably carried out using a different parameter for each wavelength area, with a table having a different correction parameter for each focal length.

Specific examples of the zoom optical system (image pickup optical system) of the invention are now explained with reference to the accompanying drawings.

The construction parameters of each example will be set forth later. For instance, as shown in the sectional views of FIG. 3, an axial chief ray 1 is defined by a light ray vertically incident on the first surface of the optical system located nearest to the object side (in FIG. 3, the first surface CG1a of a cover glass CG1), passing the center of a stop 2 in the optical system and arriving at the center of an image plane 3, as viewed in normal ray tracing. A position at which the first surface of the optical system located nearest to the object side (in FIG. 3, the first surface CG1a of the cover glass CG1) crosses the axial chief ray 1 at a wide-angle end is defined as the origin of a decentered optical element in the decentered optical system. A direction along the axial chief ray 1 is defined as the Z-axis direction, and a direction from an object toward the first surface is defined as the Z-axis positive direction. A plane at which the optical axis is bent is defined as the Y-Z plane, and a direction orthogonal to the Y-Z plane through the origin is defined as the X-axis direction. A direction coming in the paper of FIG. 3 is defined as the X-axis positive direction, and the axis forming a right hand system with the X- and Z-axes is defined as the Y-axis.

In Example 1 and Example 2, each surface (optical function surface) is decentered in the Y-Z plane, and only one symmetric plane of each rotationally asymmetric free-form surface is defined as the Y-Z plane.

Given for a decentered surface are the amount of decentration of the vertex of that surface from the center of the origin of the optical system (X, Y and Z standing for the amounts of shift in the X, Y and Z-axis directions) and the angles ($\alpha$, $\beta$, $\gamma(°)$) of tilt of the center axis (the Z axis in the following formula (a) for a free-form surface) with respect to the X-axis, the Y-axis, and the Z-axis, respectively. It is here noted that the positive $\alpha$ and $\beta$ mean counterclockwise rotation with respect to the positive directions of the respective axes, and the positive $\gamma$ means clockwise rotation with respect to the positive direction of the Z-axis. Regarding how to perform rotation $\alpha$, $\beta$ and $\gamma$ about the center axis of the surface, it is noted that the center axis of the surface and its XYZ orthogonal coordinates are rotated counterclockwise about the X-axis by $\alpha$, the center axis of the rotated surface is rotated counterclockwise about a new coordinate system by $\beta$, the once rotated coordinate system is rotated counterclockwise about the Y-axis by $\beta$, and the center axis of the twice rotated surface is rotated clockwise about the Z-axis of a new coordinate system by $\gamma$.

It is noted that when, of the optical function surfaces that form the optical system of each example, a specific surface and the subsequent surface form together a co-axial optical system, there is given a surface spacing. Besides that, the refractive index and Abbe constant of the medium are given as usual.

Figure 3C:
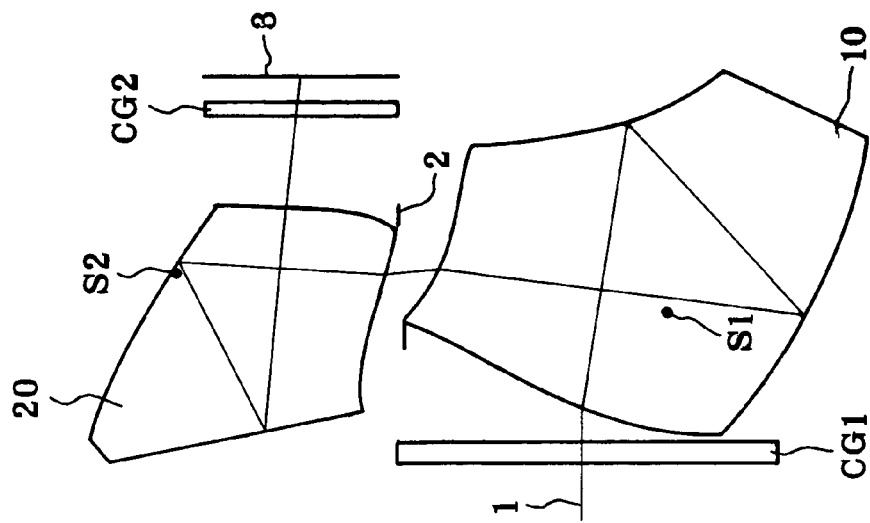
FIGS. 3(a), 3(b) and 3(c) are illustrative in section of the arrangements and optical paths at a wide-angle end (a), an intermediate setting (b) and a telephoto end (c) of the zoom optical system according to Example 1 of the invention.
Figure 3B:
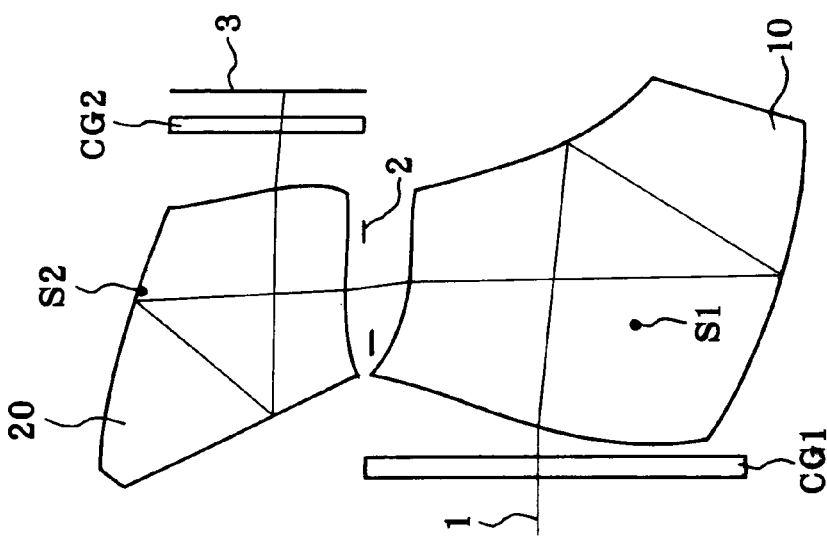
Figure 3A:
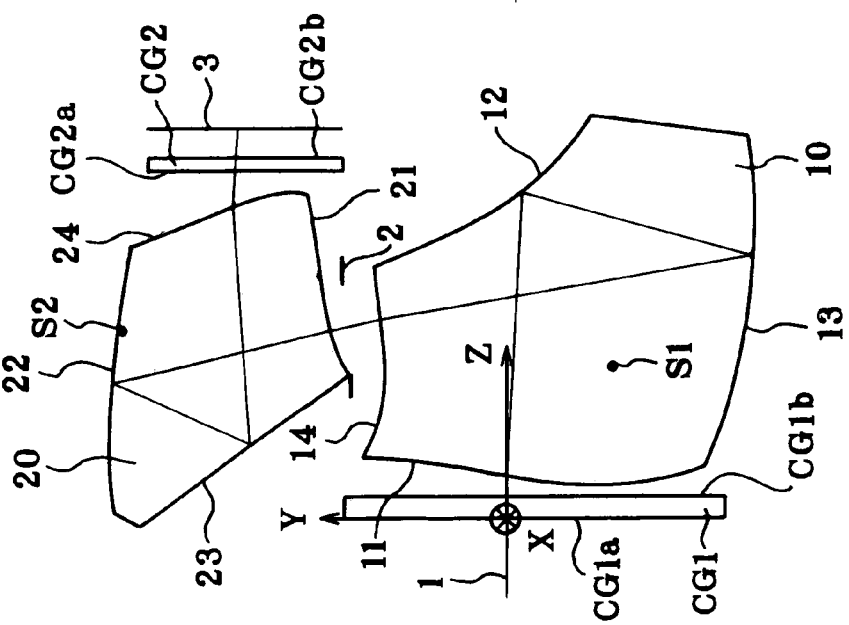
Figure 4K:
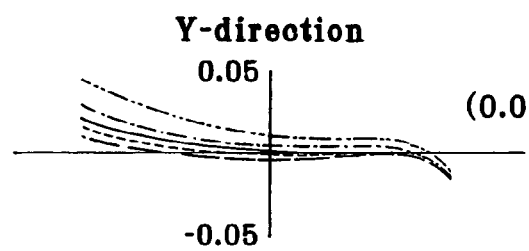
FIG. 4 is a diagram for transverse aberrations at the wide-angle end of the optical system according to Example 1.
Figure 4L:
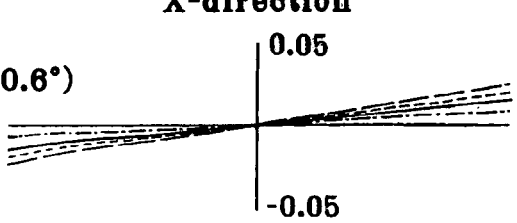
Figure 4I:
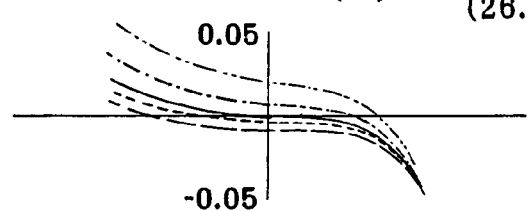
Figure 4J:
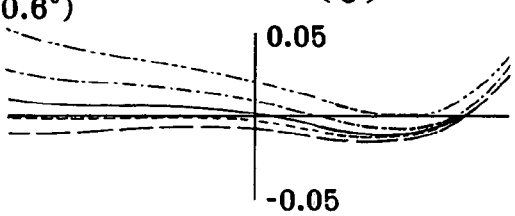
Figure 4G:
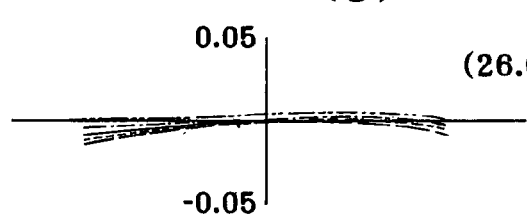
Figure 4H:
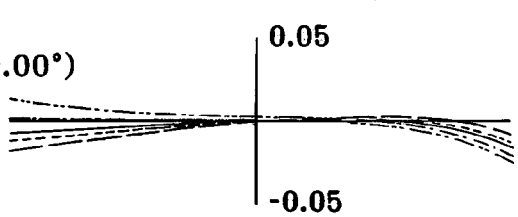
Figure 4E:
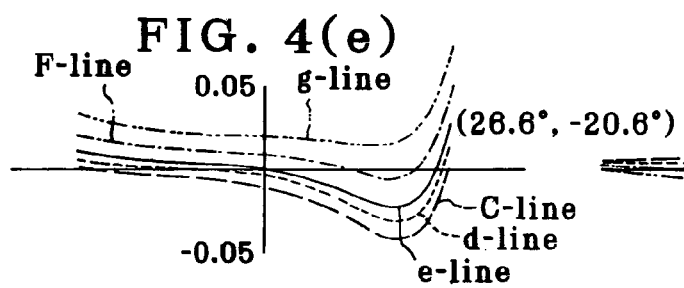
Figure 4F:
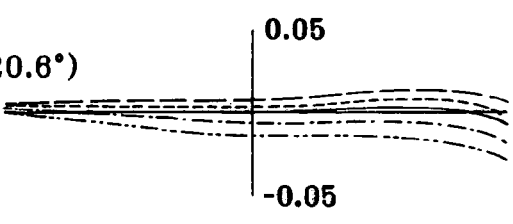
Figure 4C:
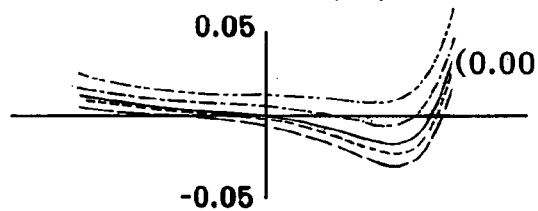
Figure 4D:
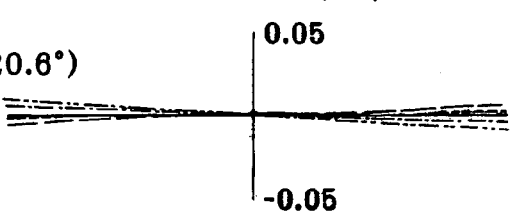
Figure 4A:
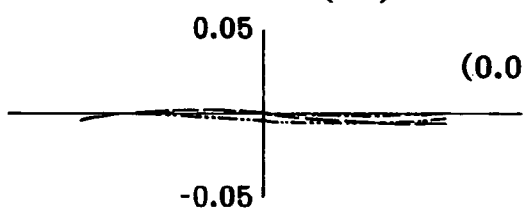
Figure 4B:
Figure 5K:
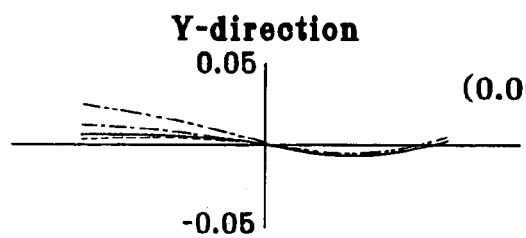
FIG. 5 is a diagram for transverse aberrations at the intermediate setting of the optical system according to Example 1.
Figure 5L:
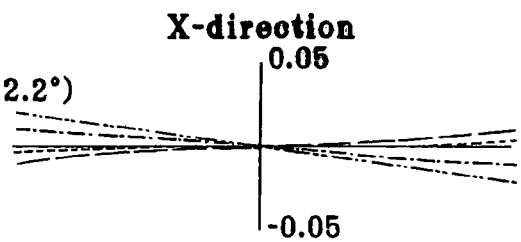
Figure 5I:
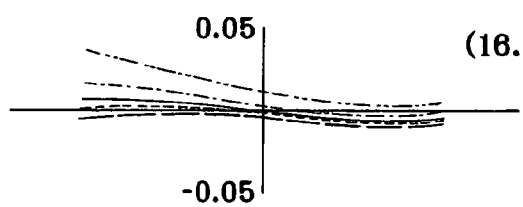
Figure 5J:
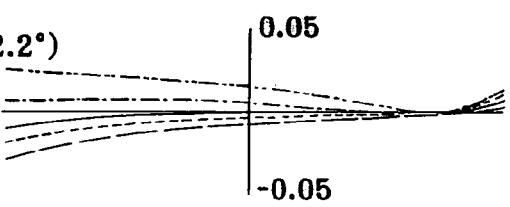
Figure 5G:
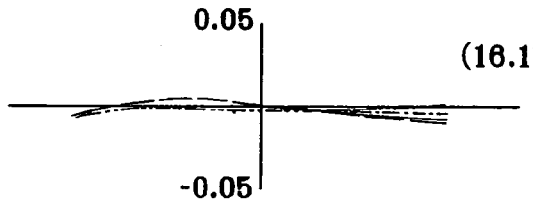
Figure 5H:
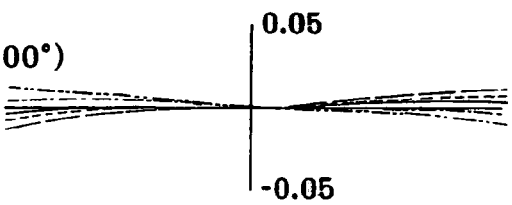
Figure 5E:
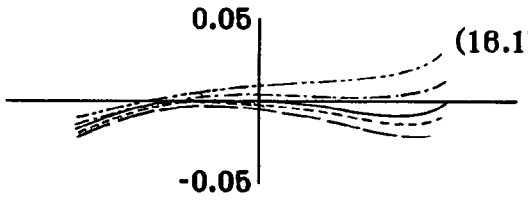
Figure 5F:
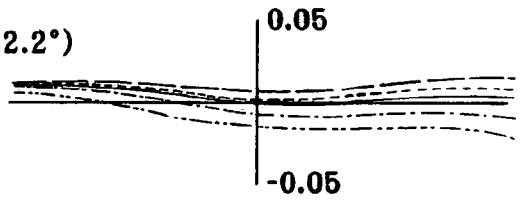
Figure 5C:
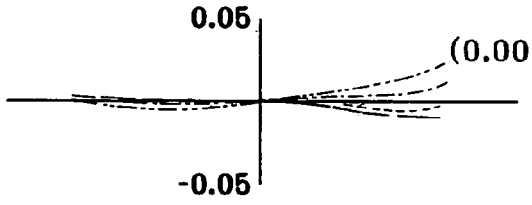
Figure 5D:
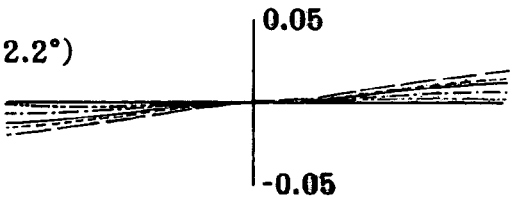
Figure 5A:
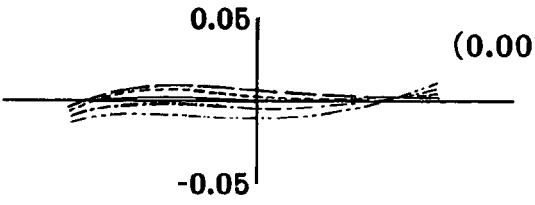
Figure 5B:
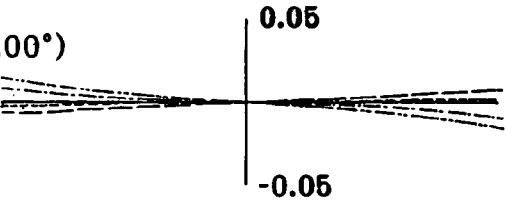
Figure 6K:
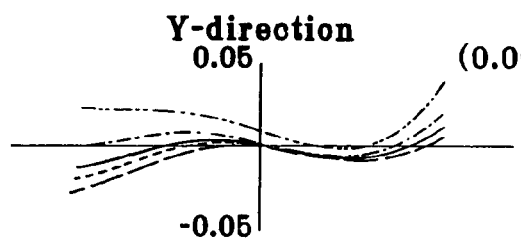
FIG. 6 is a diagram for transverse aberrations at the telephoto end of the optical system according to Example 1.
Figure 6L:
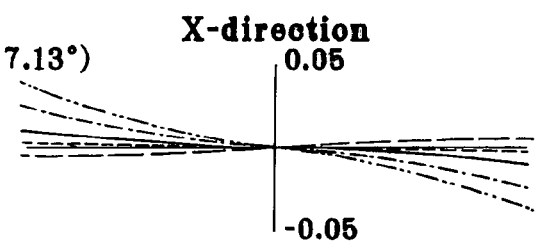
Figure 6I:
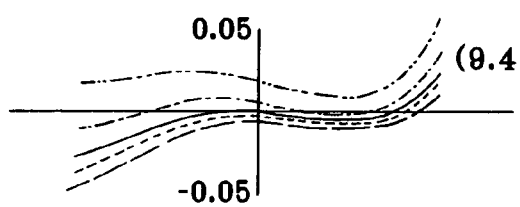
Figure 6J:
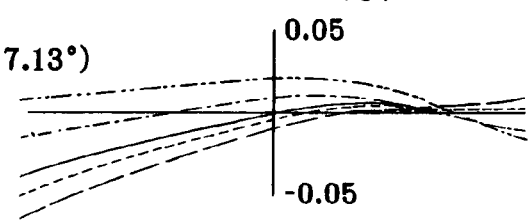
Figure 6G:
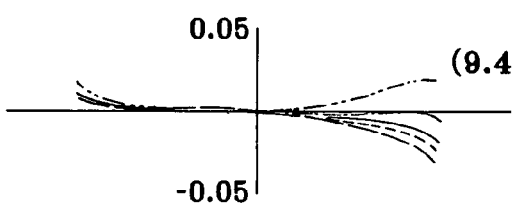
Figure 6H:
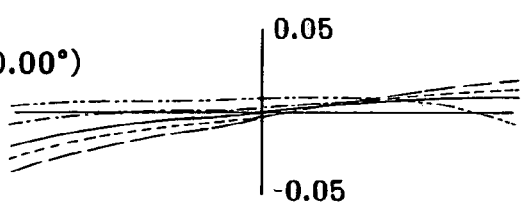
Figure 6E:
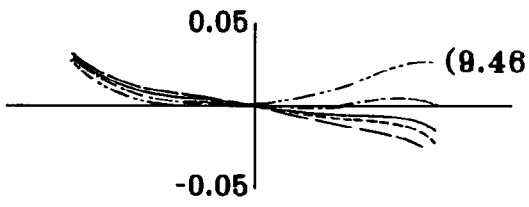
Figure 6F:
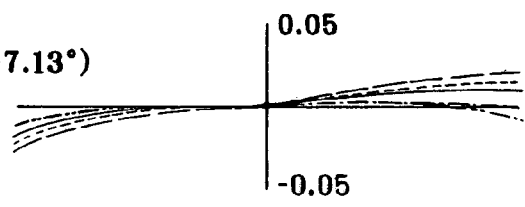
Figure 6C:
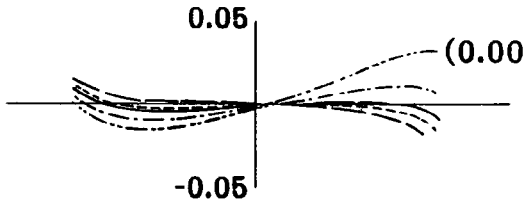
Figure 6D:
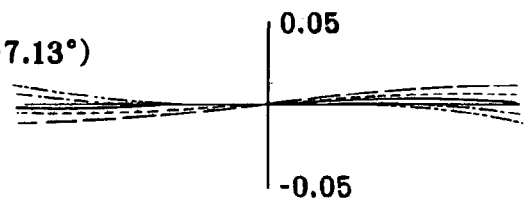
Figure 6A:
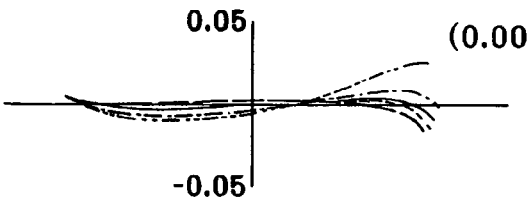
Figure 6B:
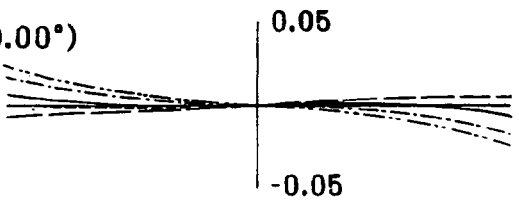

FIGS. 3(a), 3(b) and 3(c) are sectional views as taken along the optical axis (axial chief ray) 1, showing the arrangement of, and the optical path through, the optical system according to Example 1 of the invention at the wide-angle end, intermediate setting and telephoto end, respectively. Transverse aberration diagrams for the optical system according to this example at the wide-angle end, intermediate setting and telephoto end are given in FIGS. 4, 5 and 6, respectively, wherein (a) is Y-direction transverse aberration of a chief ray traveling at an X-direction angle of view of zero and a Y-direction angle of view of zero; (b) is X-direction transverse aberration of a chief ray traveling at an X-direction angle of view of zero and a Y-direction angle of view of zero; (c) is Y-direction transverse aberration of a chief ray traveling at an X-direction angle of view of zero and a Y-negative direction maximum angle of view; (d) is X-direction transverse aberration of a chief ray traveling at an X-direction angle of view of zero and a Y-negative direction maximum angle of view; (e) is Y-direction transverse aberration of a chief ray traveling at an X-positive direction maximum angle of view and a Y-negative direction maximum angle of view; (f) is X-direction transverse aberration of a chief ray traveling at an X-positive direction maximum angle of view and a Y-negative direction maximum angle of view; (g) is Y-direction transverse aberration of a chief ray traveling at an X-positive direction maximum angle of view and a Y-direction angle of view of zero; (h) is X-direction transverse aberration of a chief ray traveling at an X-positive direction maximum angle of view and a Y-direction angle of view of zero; (i) is Y-direction transverse aberration of a chief ray traveling at an X-positive direction maximum angle of view and a Y-positive direction maximum angle of view; (j) is X-direction transverse aberration of a chief ray traveling at an X-positive direction maximum angle of view and a Y-positive direction maximum angle of view; (k) is Y-direction transverse aberration of a chief ray traveling at an X-direction angle of view of zero and a Y-positive direction maximum angle of view; and (l) is X-direction transverse aberration of a chief ray traveling at an X-direction angle of view of zero and a Y-positive direction maximum angle of view.

Example 1 is directed to a zoom optical system made up of, in order from its object side, a cover glass CG1, a front optical element 10, an aperture stop 2, a rear optical element 20, and a cover glass CG2. In FIGS. 3(a), 3(b) and 3(c), reference numeral 3 indicates an image plane (image pickup plane). The cover glasses CG1 and CG2 are each in a plane-parallel plate form, and the aperture stop 2 remains fixed in position, having a fixed or variable aperture diameter.

The optical element 10 has an entrance surface 11, a reflecting surface 12, a reflecting surface 13 and an exit surface 14 as optical function surfaces. The optical element 10 is a decentered prism. Incident on the optical element 10 from the entrance surface 11, an axial chief ray 1 is internally reflected at the reflecting surface 12, then internally reflected at the reflecting surface 13, and finally refracted through the exit surface 14, leaving the optical element 10. Within the optical element 10, the axial chief ray 1 traveling from the entrance surface 11 toward the reflecting surface 12 crosses the axial chief ray 1 going from the reflecting surface 13 toward the exit surface 14. In other words, the entrance surface 11, reflecting surface 12, reflecting surface 13 and exit surface 14 are located such that the axial chief ray 1 crosses over itself. As viewed from the X-axis positive direction, the axial chief ray 1 travels through the optical element 10 in such a way as to rotate clockwise therein.

The optical element 20 has an entrance surface 21, a reflecting surface 22, a reflecting surface 23 and an exit surface 24 as optical function surfaces. The optical element 20, too, is a decentered prism. Incident on the optical element 20 from the entrance surface 21, an axial chief ray 1 is internally reflected at the reflecting surface 22 and then at the reflecting surface 23. Subsequently, the axial chief ray 1 is refracted through the exit surface 24, leaving the optical element 20. Within the optical element 20, the axial chief ray 1 traveling from the entrance surface 21 toward the reflecting surface 22 crosses the axial chief ray 1 going from the reflecting surface 23 toward the exit surface 24. In other words, the entrance surface 21, reflecting surfaces 22, 23, and exit surface 24 are located such that the axial chief ray 1 crosses over itself. As viewed from the X-axis positive direction, the axial chief ray 1 travels through the optical element 20 in such a way as to rotate counterclockwise, as opposed to the optical element 10.

The entrance surface 11, reflecting surfaces 12, 13 and exit surface 14 of the optical element 10, and the entrance surface 21, reflecting surfaces 22, 23 and exit surface 24 of the optical element 20 are all in free-form surface forms. Those surfaces have rotationally symmetric power, and are decentered in the Y-Z plane.

In the optical system of Example 1, the axial chief ray 1 emanating from the center of a distant object travels through the optical element 10, the center of the aperture stop 2, the optical element 20 and the cover glass CG2, and arrives at the center of the image plane 3 to form an object image. In the zoom optical system of this example, the image is formed at only the image plane 3 with no formation of any (intermediate) image whatsoever. That is, only one image-formation plane is provided.

In this example, the optical elements 10 and 20 are rotated for zooming purposes. Here the direction of rotation is given by the X-axis positive direction, and the axes of rotation are all vertical to the Y-Z plane. The optical element 10 is rotated clockwise about the axis S1 of rotation and, with this, the optical element 20 is rotated clockwise about the axis S2 of rotation. With the zoom optical system of the example, therefore, high zoom ratios are achievable. It is here noted that the axis S1 of rotation lies in the optical element 10 and the axis S2 of rotation in the optical element 20.

It is understood that zooming takes place from the wide-angle end in FIG. 3(a) toward the telephoto end in FIG. 3(c) by way of the intermediate setting in FIG. 3(b).

In the zoom optical system of Example 1, the axial chief ray 1 travels through the optical elements 10 and 20 in the Y-Z plane. The respective reflecting surfaces are located such that the axial chief ray travels in mutually opposite directions, as described above. For this reason, aberrations are generally well corrected because decentration aberrations are mutually compensated for even in varying zooming states. Thus, the arrangement of the respective surfaces of Example 1 is more favorable for correction of aberrations.

Each of the optical function surfaces 11-14 and 21-24 in Example 1 is a free-form surface defined by the aforesaid formula (a), where the Z axis is the axis of the free-form surface. The power and focal length of a decentered optical system, for instance, are defined in FIG. 16 of U.S. Pat. No. 6,124,989 (JP(A) 2000-66105). It is here noted that the shape of the free-form surface as well as the power and focal length of the decentered optical system, as described above, hold true for the following examples.

Numerical data on Example 1 will be enumerated later. In the data, "FFS" and "REF" stand for a free-form surface and a reflecting surface, respectively, and the refractive index and Abbe constant are given on a d-line basis. The same holds true for the following examples.

In Example 1, upon zooming, the optical elements 10 and 20 are rotated about the axes Si and S2 of rotation, respectively. The position of the image plane 3 is then decentered (shifted) in the Y-direction. It is here noted that the axes S1 and S2 of rotation pass through the plane indicated by the vertex positions of a virtual plane.

Referring to the amounts of decentration in the numerical data to be described later, the amount of decentration for a virtual surface of surface No. 3 is given for surface Nos. 4 to 7, and that for a virtual surface of surface No. 9 is given for surface Nos. 10 to 13. In this case, the coordinate system is assumed to be parallel translated from the origin. Regarding other surfaces, the amounts of dececentration are all given on the basis of the first surface (the origin set for the first surface CG1a of the cover glass CG1 in FIG. 3).

Figure 7:
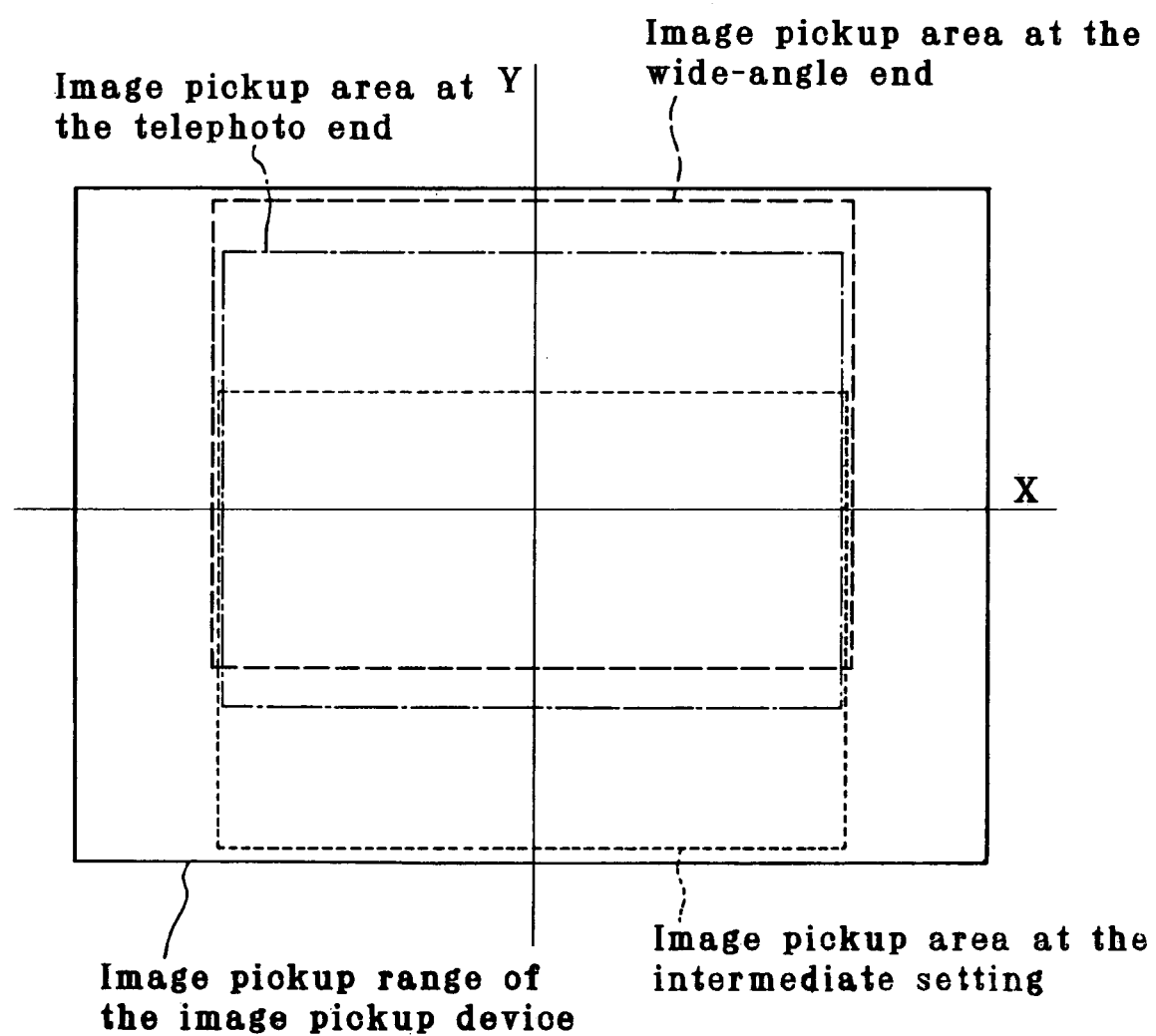
FIG. 7 is illustrative of an image pickup zone upon zooming with respect to an image pickup range of an image pickup device used in Example 1.
Figure 8:
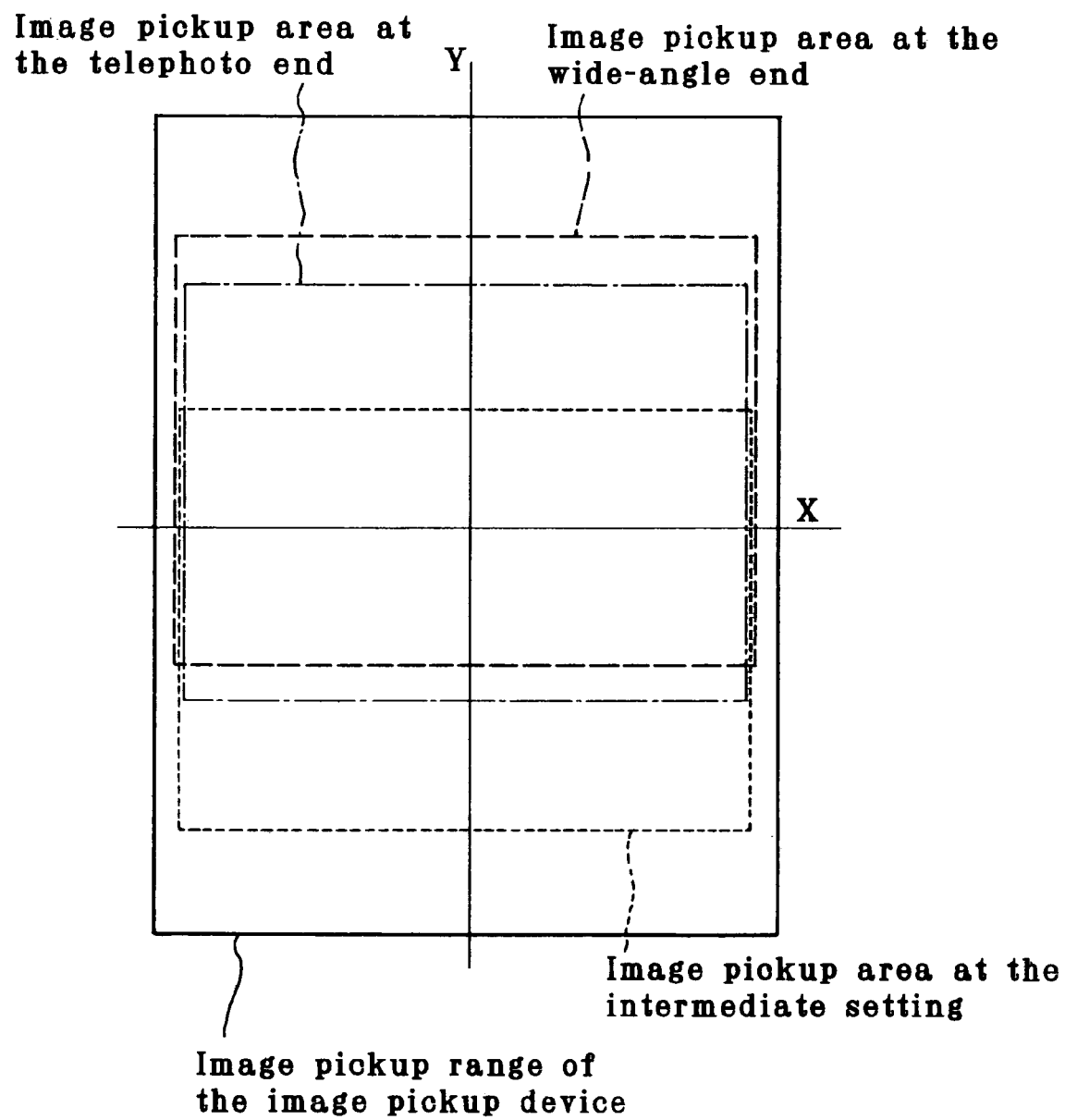
FIG. 8 is illustrative of an image pickup zone upon zooming with respect to an image pickup range of another image pickup device used in Example 1.
Figure 12K:
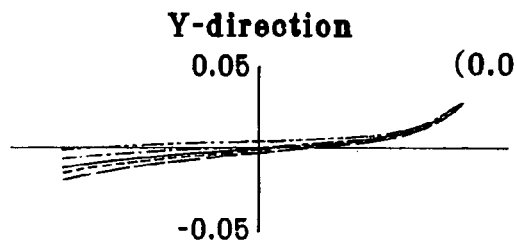
FIG. 12 is a diagram for transverse aberrations at the telephoto end of the optical system according to Example 2.
Figure 12L:
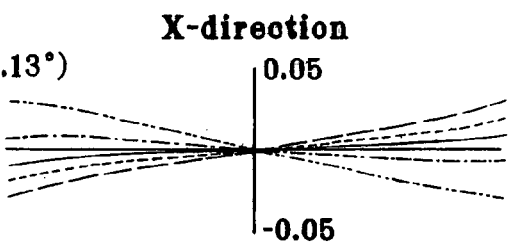
Figure 12I:
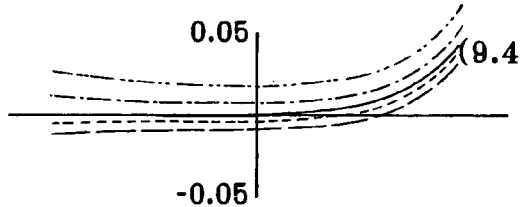
Figure 12J:
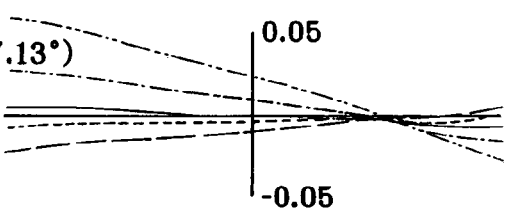
Figure 12G:
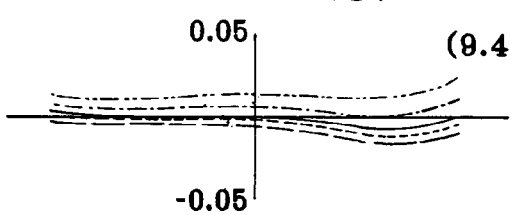
Figure 12H:
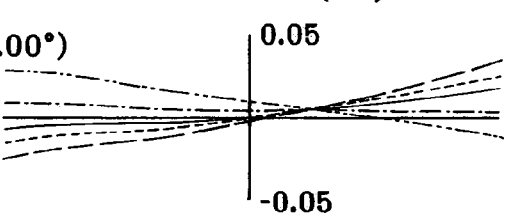
Figure 12E:
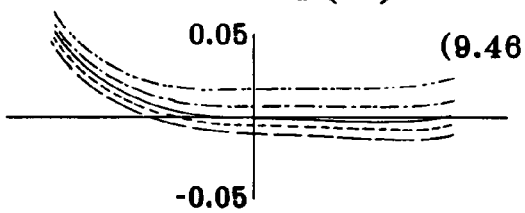
Figure 12F:
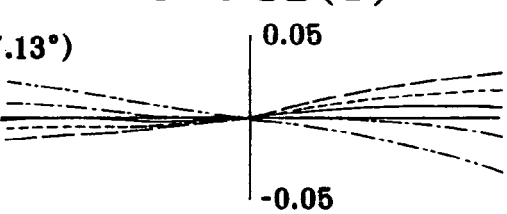
Figure 12C:
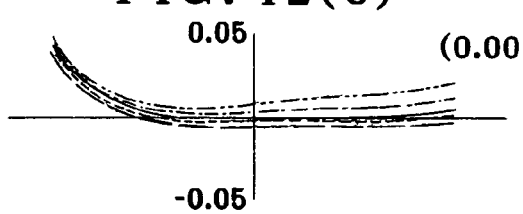
Figure 12D:
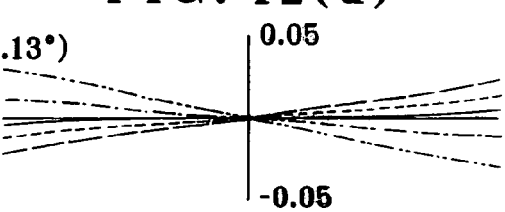
Figure 12A:
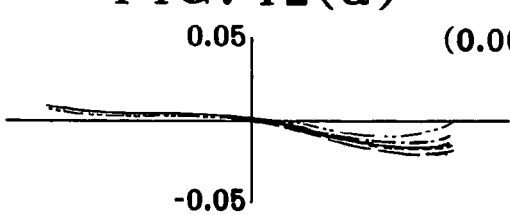
Figure 12B:
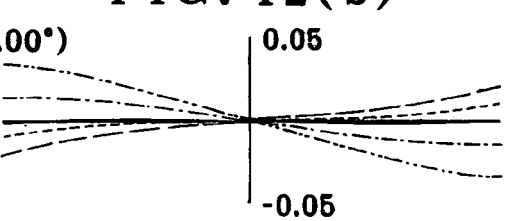

In Example 1, the image-formation position differs in the same plane in association with zooming. For this reason, an image pickup device having a wide image pickup range is used as the image pickup device. Thus, an image is formed in a different region in the range indicated by a solid line in FIG. 7. Accordingly, even at a different image-formation position, an image can be picked up while the image pickup device remains fixed in position. Although an image pickup device having an image pickup range longer in the X-direction is used in FIG. 7, it is acceptable to employ an image pickup device having an image pickup range longer in the Y-direction, as shown in FIG. 8. It is understood that the image pickup device could be moved in the Y-direction upon zooming.

In Example 1, a different correction parameter is used for each wavelength area to make electrical correction for an image. This enables asymmetric image distortion and chromatic blurring to be effectively corrected with the result that preferable image shape and image quality can be obtained.

FIGS. 9(a), 9(b) and 9(c) are sectional views as taken along the optical axis (axial chief ray) 1, showing the arrangement of, and the optical path through, the optical system according to Example 2 of the invention at the wide-angle end, intermediate setting and telephoto end, respectively. Transverse aberration diagrams for the optical system according to this example at the wide-angle end, intermediate setting and telephoto end are given in FIGS. 10, 11 and 12, respectively. In the aberration diagrams, the bracketed letters (a) to (l) mean the same as in FIGS. 4 to 6.

Example 2 is directed to a zoom optical system made up of, in order from its object side, a cover glass CG1, a front optical element 10, an aperture stop 2, a rear optical element 20, and a cover glass CG2. In FIGS. 9(a), 9(b) and 9(c), reference numeral 3 indicates an image plane (image pickup plane). The cover glasses CG1 and CG2 are each in a plane-parallel plate form, and the aperture stop 2 remains fixed in position, having a fixed or variable aperture diameter.

The optical element 10 has an entrance surface 11, a reflecting surface 12, a reflecting surface 13 and an exit surface 14 as optical function surfaces. The optical element 10 is a decentered prism. Incident on the optical element 10 from the entrance surface 11, an axial chief ray 1 is internally reflected at the reflecting surface 12, then internally reflected at the reflecting surface 13, and finally refracted through the exit surface 14, leaving the optical element 10. Within the optical element 10, the axial chief ray 1 traveling from the entrance surface 11 toward the reflecting surface 12 crosses the axial chief ray 1 going from the reflecting surface 13 toward the exit surface 14. In other words, the entrance surface 11, reflecting surface 12, reflecting surface 13 and exit surface 14 are located such that the axial chief ray 1 crosses over itself. As viewed from the X-axis positive direction, the axial chief ray 1 travels through the optical element 10 in such a way as to rotate clockwise therein.

The optical element 20 has an entrance surface 21, a reflecting surface 22, a reflecting surface 23 and an exit surface 24 as optical function surfaces. The optical element 20, too, is a decentered prism. Incident on the optical element 20 from the entrance surface 21, an axial chief ray 1 is internally reflected at the reflecting surface 22 and then at the reflecting surface 23. Subsequently, the axial chief ray 1 is refracted through the exit surface 24, leaving the optical element 20. Within the optical element 20, the axial chief ray 1 traveling from the entrance surface 21 toward the reflecting surface 22 crosses the axial chief ray 1 going from the reflecting surface 23 toward the exit surface 24. In other words, the entrance surface 21, reflecting surfaces 22, 23, and exit surface 24 are located such that the axial chief ray 1 crosses over itself. As viewed from the X-axis positive direction, the axial chief ray 1 travels through the optical element 20 in such a way as to rotate counterclockwise, as opposed to the optical element 10.

The entrance surface 11, reflecting surfaces 12, 13 and exit surface 14 of the optical element 10, and the entrance surface 21, reflecting surfaces 22, 23 and exit surface 24 of the optical element 20 are all in free-form surface forms. Those surfaces have rotationally symmetric power, and are decentered in the Y-Z plane.

In the zoom optical system of Example 2, the axial chief ray 1 emanating from the center of a distant object travels through the optical element 10, the center of the aperture stop 2, the optical element 20 and the cover glass CG2, and arrives at the image plane 3 to form an object image. In the zoom optical system of this example, the image is formed at only the image plane 3 with no formation of any (intermediate) image whatsoever. That is, only one image-formation plane is provided.

In this example, too, the optical elements 10 and 20 are rotated for zooming purposes. Here the direction of rotation is given by the X-axis positive direction, and the axes of rotation are all vertical to the Y-Z plane. The optical element 10 is rotated clockwise about the axis Si of rotation and, with this, the optical element 20 is rotated clockwise about the axis S2 of rotation. With the zoom optical system of the example, therefore, high zoom ratios are achievable. It is here noted that the axis S1 of rotation lies in the optical element 10, and the axis S2 of rotation lies externally of, but near, the optical element 20.

It is understood that zooming takes place from the wide-angle end in FIG. 9(a) toward the telephoto end in FIG. 9(c) by way of the intermediate setting in FIG. 9(b).

In the zoom optical system of Example 2, the axial chief ray 1 travels through the optical elements 10 and 20 in the Y-Z plane. The respective reflecting surfaces are located such that the axial chief ray travels in mutually opposite directions, as described above. For this reason, aberrations are generally well corrected because decentration aberrations are mutually compensated for even in varying zooming states. Thus, the arrangement of the respective surfaces of Example 2 is more favorable for correction of aberrations.

In Example 2, upon zooming, the optical elements 10 and 20 are rotated about the axes S1 and S2 of rotation, respectively. It is here noted that the axes S1 and S2 of rotation pass through the plane indicated by the vertex positions of a virtual plane.

Referring to the amounts of decentration in the numerical data to be described later, the amount of decentration for a virtual surface of surface No. 3 is given for surface Nos. 4 to 7, and that for a virtual surface of surface No. 9 is given for surface Nos. 10 to 13. In this case, the coordinate system is assumed to be parallel translated from the origin. Regarding other surfaces, the amounts of dececentration are all given on the basis of the first surface (the origin set for the first surface CG1a of the cover glass CG1 in FIG. 3).

In Example 2, the image-formation position is invariable in association with zooming.

In Example 2, a different correction parameter is used for each wavelength area to make electrical correction for an image. This enables asymmetric image distortion and chromatic blurring to be effectively corrected with the result that preferable image shape and image quality can be obtained.

Set out below are numerical data on Examples 1 and 2.

EXAMPLE 1

|  | W | I | T |
|---|---|---|---|
| Entrance pupil diameter: | 1.25 | ~1.63 | ~2.26 |
| Half view angle of incidence [X]: | 26.6° | ~16.1° | ~9.5° |
| Half view angle of incidence [Y]: | 20.6° | ~12.2° | ~7.1° |
| Focal length [X]: | 3.5 | ~6.2 | ~10.6 |
| Focal length [Y]: | 3.6 | ~6.2 | ~10.8 |

W: wide-angle end
I: intermediate setting
T: telephoto end

| Sur. No. | ROC | SS | DC | RI | AC | RS |
|---|---|---|---|---|---|---|
| OP | ∞ | ∞ |  |  |  |  |
| 1 | ∞ |  | DC(1) | 1.4950 | 65.0 |  |
| 2 | ∞ |  | DC(2) |  |  |  |
| 3 | ∞ (VS/AR SI) |  | DC(3) |  |  |  |
| 4 | FFS[1] |  | DC(4) | 1.6069 | 27.0 |  |
| 5 | FFS[2] |  | DC(5) | 1.6069 | 27.0 | REF |
| 6 | FFS[3] |  | DC(6) | 1.6069 | 27.0 | REF |
| 7 | FFS[4] |  | DC(7) |  |  |  |
| 8 | ∞ (SP) |  | DC(8) |  |  |  |
| 9 | ∞ (VS/AR S2) |  | DC(9) |  |  |  |
| 10 | FFS[5] |  | DC(10) | 1.5256 | 56.4 |  |
| 11 | FFS[6] |  | DC(11) | 1.5256 | 56.4 | REF |
| 12 | FFS[7] |  | DC(12) | 1.5256 | 56.4 | REF |
| 13 | FFS[8] |  | DC(13) |  |  |  |
| 14 | ∞ |  | DC(14) | 1.5163 | 64.1 |  |
| 15 | ∞ |  | DC(15) |  |  |  |
| IP | ∞ |  | DC(15) |  |  |  |

Sur. No.: surface number,
ROC: radius of curvature,
SS: surface spacing,
DC: decentration,
RI: refractive index,
AC: Abbe constant,
RS: reflecting surface,
OP: object plane,
VS: virtual surface,
AR: axis of rotation,
SP: stop plane, and
IP: image plane.

FFS[1]

| $C_4$ | $4.1199 \times 10^{-3}$ | $C_6$ | $1.6579 \times 10^{-2}$ | $C_8$ | $-8.3836 \times 10^{-3}$ |
| $C_{10}$ | $-6.6784 \times 10^{-3}$ | $C_{11}$ | $-9.7981 \times 10^{-4}$ | $C_{13}$ | $-4.9007 \times 10^{-4}$ |
| $C_{15}$ | $-6.1790 \times 10^{-4}$ | $C_{17}$ | $-1.3628 \times 10^{-4}$ | $C_{19}$ | $-6.6807 \times 10^{-6}$ |
| $C_{21}$ | $-9.1886 \times 10^{-5}$ | $C_{22}$ | $-8.0055 \times 10^{-6}$ | $C_{24}$ | $-7.2830 \times 10^{-6}$ |
| $C_{26}$ | $1.0665 \times 10^{-5}$ | $C_{28}$ | $-1.2506 \times 10^{-6}$ | | |

FFS[2]

| $C_4$ | $8.0634 \times 10^{-3}$ | $C_6$ | $4.2472 \times 10^{-2}$ | $C_8$ | $-3.7988 \times 10^{-3}$ |
| $C_{10}$ | $-6.9592 \times 10^{-3}$ | $C_{11}$ | $-3.8963 \times 10^{-4}$ | $C_{13}$ | $-3.3523 \times 10^{-5}$ |
| $C_{15}$ | $-1.2394 \times 10^{-4}$ | $C_{17}$ | $8.2006 \times 10^{-6}$ | $C_{19}$ | $2.6962 \times 10^{-5}$ |
| $C_{21}$ | $-3.6475 \times 10^{-5}$ | $C_{22}$ | $2.1198 \times 10^{-5}$ | $C_{24}$ | $-2.3662 \times 10^{-5}$ |
| $C_{26}$ | $9.1054 \times 10^{-6}$ | $C_{28}$ | $5.2718 \times 10^{-5}$ | | |

FFS[3]

| $C_4$ | $-1.8610 \times 10^{-2}$ | $C_6$ | $3.6558 \times 10^{-2}$ | $C_8$ | $5.9500 \times 10^{-3}$ |
| $C_{10}$ | $-1.6255 \times 10^{-4}$ | $C_{11}$ | $-2.6417 \times 10^{-4}$ | $C_{13}$ | $-1.1929 \times 10^{-3}$ |
| $C_{15}$ | $1.7306 \times 10^{-5}$ | $C_{17}$ | $2.0293 \times 10^{-4}$ | $C_{19}$ | $1.9287 \times 10^{-4}$ |
| $C_{21}$ | $5.5190 \times 10^{-6}$ | $C_{22}$ | $-4.4072 \times 10^{-6}$ | $C_{24}$ | $-3.6117 \times 10^{-5}$ |
| $C_{26}$ | $-1.7387 \times 10^{-5}$ | $C_{28}$ | $-9.9860 \times 10^{-7}$ | | |

FFS[4]

| $C_4$ | $1.6475 \times 10^{-2}$ | $C_6$ | $1.2591 \times 10^{-1}$ | $C_8$ | $1.1965 \times 10^{-2}$ |
| $C_{10}$ | $1.4529 \times 10^{-2}$ | $C_{11}$ | $-1.0843 \times 10^{-3}$ | $C_{13}$ | $-2.1214 \times 10^{-3}$ |
| $C_{15}$ | $-3.2103 \times 10^{-3}$ | $C_{17}$ | $1.1666 \times 10^{-4}$ | $C_{19}$ | $-7.1671 \times 10^{-4}$ |
| $C_{21}$ | $-7.9641 \times 10^{-4}$ | $C_{22}$ | $-3.1475 \times 10^{-5}$ | $C_{24}$ | $4.3413 \times 10^{-5}$ |
| $C_{26}$ | $-5.4493 \times 10^{-5}$ | $C_{28}$ | $-5.4977 \times 10^{-5}$ | | |

FFS[5]

| $C_4$ | $6.2235 \times 10^{-2}$ | $C_6$ | $-1.2737 \times 10^{-1}$ | $C_8$ | $-2.2386 \times 10^{-2}$ |
| $C_{10}$ | $-2.9728 \times 10^{-2}$ | $C_{11}$ | $-1.4407 \times 10^{-3}$ | $C_{13}$ | $-6.2840 \times 10^{-3}$ |
| $C_{15}$ | $1.5064 \times 10^{-3}$ | $C_{17}$ | $-7.8959 \times 10^{-4}$ | $C_{19}$ | $-1.2080 \times 10^{-3}$ |
| $C_{21}$ | $1.2138 \times 10^{-3}$ | $C_{22}$ | $-3.5433 \times 10^{-5}$ | $C_{24}$ | $-1.7885 \times 10^{-4}$ |
| $C_{26}$ | $-8.9528 \times 10^{-5}$ | $C_{28}$ | $1.3578 \times 10^{-4}$ | | |

FFS[6]

| $C_4$ | $-2.8201 \times 10^{-2}$ | $C_6$ | $-1.0644 \times 10^{-2}$ | $C_8$ | $-1.6319 \times 10^{-3}$ |
| $C_{10}$ | $-4.0777 \times 10^{-3}$ | $C_{11}$ | $1.9865 \times 10^{-4}$ | $C_{13}$ | $-1.7651 \times 10^{-4}$ |
| $C_{15}$ | $-4.6771 \times 10^{-5}$ | $C_{17}$ | $-9.9306 \times 10^{-5}$ | $C_{19}$ | $-4.4615 \times 10^{-5}$ |
| $C_{21}$ | $4.8739 \times 10^{-5}$ | $C_{22}$ | $-1.1266 \times 10^{-5}$ | $C_{24}$ | $-3.1473 \times 10^{-5}$ |
| $C_{26}$ | $9.9422 \times 10^{-6}$ | $C_{28}$ | $-3.5723 \times 10^{-6}$ | | |

FFS[7]

| $C_4$ | $-1.7230 \times 10^{-2}$ | $C_6$ | $-1.2568 \times 10^{-3}$ | $C_8$ | $8.3942 \times 10^{-3}$ |
| $C_{10}$ | $-2.2244 \times 10^{-3}$ | $C_{11}$ | $-2.4421 \times 10^{-4}$ | $C_{13}$ | $-1.7785 \times 10^{-3}$ |
| $C_{15}$ | $-1.0150 \times 10^{-4}$ | $C_{17}$ | $-4.7562 \times 10^{-4}$ | $C_{19}$ | $5.2911 \times 10^{-4}$ |
| $C_{21}$ | $1.4342 \times 10^{-4}$ | $C_{22}$ | $-7.7146 \times 10^{-5}$ | $C_{24}$ | $4.8956 \times 10^{-6}$ |
| $C_{26}$ | $-8.8928 \times 10^{-5}$ | $C_{28}$ | $-1.4534 \times 10^{-5}$ | | |

FFS[8]

| $C_4$ | $-5.7194 \times 10^{-3}$ | $C_6$ | $-1.5926 \times 10^{-1}$ | $C_8$ | $4.000 \times 10^{-2}$ |
| $C_{10}$ | $-1.0419 \times 10^{-1}$ | $C_{11}$ | $3.0000 \times 10^{-3}$ | $C_{13}$ | $6.4694 \times 10^{-2}$ |
| $C_{15}$ | $7.0466 \times 10^{-2}$ | $C_{17}$ | $3.2443 \times 10^{-3}$ | $C_{19}$ | $-2.1180 \times 10^{-2}$ |
| $C_{21}$ | $-1.5618 \times 10^{-2}$ | $C_{22}$ | $1.0000 \times 10^{-3}$ | $C_{24}$ | $-5.5078 \times 10^{-4}$ |
| $C_{26}$ | $2.3414 \times 10^{-3}$ | $C_{28}$ | $1.2251 \times 10^{-3}$ | | |

Decentration [1]

| X | 0.00 | Y | 0.00 | Z | 0.00 |
| α | 0.00 | β | 0.00 | γ | 0.00 |

Decentration [2]

| X | 0.00 | Y | 0.00 | Z | 0.50 |
| α | 0.00 | β | 0.00 | γ | 0.00 |

Decentration [3]

| X | 0.00 | Y | -2.63 | Z | 3.70 |
| α | (variable) | β | 0.00 | γ | 0.00 |

Decentration [4]

| X | 0.00 | Y | 2.52 | Z | -3.10 |
| α | -1.53 | β | 0.00 | γ | 0.00 |

Decentration [5]

| X | 0.00 | Y | 3.60 | Z | 2.86 |
| α | 37.08 | β | 0.00 | γ | 0.00 |

Decentration [6]

| X | 0.00 | Y | -2.76 | Z | 2.99 |
| α | 96.04 | β | 0.00 | γ | 0.00 |

Decentration [7]

| X | 0.00 | Y | 5.29 | Z | -1.72 |
| α | 90.03 | β | 0.00 | γ | 0.00 |

-continued

| | Decentration [8] | | | | |
|---|---|---|---|---|---|
| X | 0.00 | Y | 3.74 | Z | 4.43 |
| α | 95.00 | β | 0.00 | γ | 0.00 |
| | Decentration [9] | | | | |
| X | 0.00 | Y | 9.35 | Z | 4.55 |
| α | (variable) | β | 0.00 | γ | 0.00 |
| | Decentration [10] | | | | |
| X | 0.00 | Y | −5.18 | Z | −0.73 |
| α | 101.89 | β | 0.00 | γ | 0.00 |
| | Decentration [11] | | | | |
| X | 0.00 | Y | −0.24 | Z | −0.02 |
| α | 76.29 | β | 0.00 | γ | 0.00 |
| | Decentration [12] | | | | |
| X | 0.00 | Y | −2.79 | Z | −3.30 |
| α | 29.86 | β | 0.00 | γ | 0.00 |
| | Decentration [13] | | | | |
| X | 0.00 | Y | −5.13 | Z | 2.53 |
| α | −18.08 | β | 0.00 | γ | 0.00 |
| | Decentration [14] | | | | |
| X | 0.00 | Y | 5.74 | Z | 8.07 |
| α | 0.00 | β | 0.00 | γ | 0.00 |
| | Decentration [15] | | | | |
| X | 0.00 | Y | 5.74 | Z | 8.38 |
| α | 0.00 | β | 0.00 | γ | 0.00 |
| | Decentration [16] | | | | |
| X | 0.00 | Y | (variable) | Z | 9.00 |
| α | 0.00 | β | 0.00 | γ | 0.00 |

(Amount of variable decentration)

| | Wide | Intermediate | Telephoto |
|---|---|---|---|
| Decentration [3]α | −8.24 | −17.35 | −25.59 |
| Decentration [9]α | 5.21 | −5.00 | −18.08 |
| Decentration [16]Y | 6.34 | 5.74 | 6.23 |

Wide: wide-angle end,
Intermediate: intermediate setting, and
Telephoto: telephoto end.

EXAMPLE 2

| | W | I | T |
|---|---|---|---|
| Entrance pupil diameter: | 1.28 | ~1.49 | ~2.05 |
| Half view angle of incidence [X]: | 26.6° | ~16.1° | ~9.5° |
| Half view angle of incidence [Y]: | 20.6° | ~12.2° | ~7.1° |
| Focal length [X]: | 3.5 | ~6.2 | ~10.2 |
| Focal length [Y]: | 3.6 | ~6.2 | ~10.7 |

W: wide-angle end
I: intermediate setting
T: telephoto end

| Sur. No. | ROC | SS | DC | RI | AC | RS |
|---|---|---|---|---|---|---|
| OP | ∞ | ∞ | | | | |
| 1 | ∞ | | DC(1) | 1.4950 | 65.0 | |
| 2 | ∞ | | DC(2) | | | |
| 3 | ∞ (VS/AR S1) | | DC(3) | | | |
| 4 | FFS[1] | | DC(4) | 1.6069 | 27.0 | |
| 5 | FFS[2] | | DC(5) | 1.6069 | 27.0 | REF |
| 6 | FFS[3] | | DC(6) | 1.6069 | 27.0 | REF |
| 7 | FFS[4] | | DC(7) | | | |
| 8 | ∞ (SP) | | DC(8) | | | |
| 9 | ∞ (VS/AR S2) | | DC(9) | | | |
| 10 | FFS[5] | | DC(10) | 1.5256 | 56.4 | |
| 11 | FFS[6] | | DC(11) | 1.5256 | 56.4 | REF |
| 12 | FFS[7] | | DC(12) | 1.5256 | 56.4 | REF |
| 13 | FFS[8] | | DC(13) | | | |
| 14 | ∞ | | DC(14) | 1.5163 | 64.1 | |
| 15 | ∞ | | DC(15) | | | |
| IP | ∞ | | DC(16) | | | |

Sur. No.: surface number,
ROC: radius of curvature,
SS: surface spacing,
DC: decentration,
RI: refractive index,
AC: Abbe constant,
RS: reflecting surface,
OP: object plane,
VS: virtual surface,
AR: axis of rotation,
SP: stop plane, and
IP: image plane.

FFS[1]

| $C_4$ | $1.3055 \times 10^{-2}$ | $C_6$ | $1.7158 \times 10^{-2}$ | $C_8$ | $-3.3085 \times 10^{-3}$ |
|---|---|---|---|---|---|
| $C_{10}$ | $-1.2693 \times 10^{-3}$ | $C_{11}$ | $-3.3452 \times 10^{-4}$ | $C_{13}$ | $-2.7224 \times 10^{-4}$ |
| $C_{15}$ | $3.2997 \times 10^{-5}$ | $C_{17}$ | $-3.1454 \times 10^{-5}$ | $C_{19}$ | $-1.1086 \times 10^{-5}$ |
| $C_{21}$ | $7.3638 \times 10^{-6}$ | $C_{22}$ | $-6.8410 \times 10^{-7}$ | $C_{24}$ | $-4.7836 \times 10^{-7}$ |
| $C_{26}$ | $5.9583 \times 10^{-7}$ | $C_{28}$ | $6.0346 \times 10^{-7}$ | | |

FFS[2]

| $C_4$ | $9.0685 \times 10^{-3}$ | $C_6$ | $4.7493 \times 10^{-2}$ | $C_8$ | $-2.5602 \times 10^{-3}$ |
|---|---|---|---|---|---|
| $C_{10}$ | $-4.4964 \times 10^{-3}$ | $C_{11}$ | $-2.9943 \times 10^{-4}$ | $C_{13}$ | $-6.0927 \times 10^{-5}$ |
| $C_{15}$ | $3.0623 \times 10^{-4}$ | $C_{17}$ | $2.4440 \times 10^{-5}$ | $C_{19}$ | $-6.0912 \times 10^{-8}$ |
| $C_{21}$ | $-2.9859 \times 10^{-5}$ | $C_{22}$ | $7.0423 \times 10^{-6}$ | $C_{24}$ | $-2.6415 \times 10^{-6}$ |
| $C_{26}$ | $-3.2025 \times 10^{-6}$ | $C_{28}$ | $3.3034 \times 10^{-6}$ | | |

FFS[3]

| $C_4$ | $-1.2835 \times 10^{-2}$ | $C_6$ | $2.6766 \times 10^{-2}$ | $C_8$ | $1.8145 \times 10^{-3}$ |
|---|---|---|---|---|---|
| $C_{10}$ | $-1.6486 \times 10^{-4}$ | $C_{11}$ | $-1.7716 \times 10^{-5}$ | $C_{13}$ | $-2.3532 \times 10^{-4}$ |
| $C_{15}$ | $5.3085 \times 10^{-6}$ | $C_{17}$ | $6.3578 \times 10^{-6}$ | $C_{19}$ | $2.1391 \times 10^{-5}$ |
| $C_{21}$ | $1.1118 \times 10^{-6}$ | $C_{22}$ | $9.5390 \times 10^{-6}$ | $C_{24}$ | $-1.4798 \times 10^{-6}$ |
| $C_{26}$ | $-1.1533 \times 10^{-6}$ | $C_{28}$ | $-4.7863 \times 10^{-8}$ | | |

FFS[4]

| $C_4$ | $-1.9619 \times 10^{-2}$ | $C_6$ | $5.9100 \times 10^{-2}$ | $C_8$ | $4.5013 \times 10^{-3}$ |
|---|---|---|---|---|---|
| $C_{10}$ | $3.1570 \times 10^{-3}$ | $C_{11}$ | $7.7245 \times 10^{-4}$ | $C_{13}$ | $-4.5883 \times 10^{-4}$ |
| $C_{15}$ | $-4.0660 \times 10^{-4}$ | $C_{17}$ | $-4.6753 \times 10^{-5}$ | $C_{19}$ | $1.4733 \times 10^{-5}$ |
| $C_{21}$ | $5.9345 \times 10^{-5}$ | $C_{22}$ | $2.4486 \times 10^{-7}$ | $C_{24}$ | $-7.0868 \times 10^{-6}$ |
| $C_{26}$ | $1.6459 \times 10^{-5}$ | $C_{28}$ | $9.1560 \times 10^{-6}$ | | |

FFS[5]

| $C_4$ | $4.2989 \times 10^{-2}$ | $C_6$ | $-3.3188 \times 10^{-2}$ | $C_8$ | $-5.4964 \times 10^{-3}$ |
|---|---|---|---|---|---|
| $C_{10}$ | $-9.1914 \times 10^{-3}$ | $C_{11}$ | $1.0796 \times 10^{-3}$ | $C_{13}$ | $-3.6182 \times 10^{-4}$ |
| $C_{15}$ | $3.5713 \times 10^{-4}$ | $C_{17}$ | $-1.2943 \times 10^{-4}$ | $C_{19}$ | $-3.2968 \times 10^{-4}$ |
| $C_{21}$ | $-2.0586 \times 10^{-5}$ | $C_{22}$ | $-3.8154 \times 10^{-5}$ | $C_{24}$ | $-3.8740 \times 10^{-5}$ |
| $C_{26}$ | $-4.8478 \times 10^{-5}$ | $C_{28}$ | $-2.1636 \times 10^{-5}$ | | |

FFS[6]

| $C_4$ | $-2.0836 \times 10^{-2}$ | $C_6$ | $2.7763 \times 10^{-3}$ | $C_8$ | $-1.1247 \times 10^{-3}$ |
|---|---|---|---|---|---|
| $C_{10}$ | $-1.7864 \times 10^{-3}$ | $C_{11}$ | $1.5863 \times 10^{-4}$ | $C_{13}$ | $1.5867 \times 10^{-5}$ |
| $C_{15}$ | $-1.2701 \times 10^{-4}$ | $C_{17}$ | $-3.8900 \times 10^{-5}$ | $C_{19}$ | $-6.8193 \times 10^{-6}$ |
| $C_{21}$ | $6.1266 \times 10^{-5}$ | $C_{22}$ | $-6.6793 \times 10^{-6}$ | $C_{24}$ | $-2.2776 \times 10^{-5}$ |
| $C_{26}$ | $-1.1595 \times 10^{-5}$ | $C_{28}$ | $-7.1054 \times 10^{-6}$ | | |

FFS[7]

| $C_4$ | $-1.3581 \times 10^{-2}$ | $C_6$ | $1.9321 \times 10^{-2}$ | $C_8$ | $5.5282 \times 10^{-3}$ |
|---|---|---|---|---|---|
| $C_{10}$ | $-3.1081 \times 10^{-4}$ | $C_{11}$ | $3.6371 \times 10^{-5}$ | $C_{13}$ | $-5.6046 \times 10^{-4}$ |
| $C_{15}$ | $-7.8799 \times 10^{-5}$ | $C_{17}$ | $-8.2839 \times 10^{-5}$ | $C_{19}$ | $2.3033 \times 10^{-5}$ |
| $C_{21}$ | $4.4212 \times 10^{-5}$ | $C_{22}$ | $-5.5188 \times 10^{-5}$ | $C_{24}$ | $-3.8246 \times 10^{-5}$ |
| $C_{26}$ | $-3.3481 \times 10^{-5}$ | $C_{28}$ | $-1.7515 \times 10^{-5}$ | | |

FFS[8]

| $C_4$ | $-1.000 \times 10^{-2}$ | $C_6$ | $-2.7063 \times 10^{-1}$ | $C_8$ | $-3.4215 \times 10^{-2}$ |
|---|---|---|---|---|---|
| $C_{10}$ | $-4.7806 \times 10^{-2}$ | $C_{11}$ | $-1.0852 \times 10^{-3}$ | $C_{13}$ | $6.6446 \times 10^{-2}$ |
| $C_{15}$ | $7.1896 \times 10^{-2}$ | $C_{17}$ | $4.4063 \times 10^{-3}$ | $C_{19}$ | $-1.9200 \times 10^{-2}$ |
| $C_{21}$ | $-1.8416 \times 10^{-2}$ | $C_{22}$ | $1.0000 \times 10^{-3}$ | $C_{24}$ | $-7.4672 \times 10^{-4}$ |
| $C_{26}$ | $2.1747 \times 10^{-3}$ | $C_{28}$ | $1.5095 \times 10^{-3}$ | | |

Decentration [1]

| X | 0.00 | Y | 0.00 | Z | 0.00 |
|---|---|---|---|---|---|
| α | 0.00 | β | 0.00 | γ | 0.00 |

Decentration [2]

| X | 0.00 | Y | 0.00 | Z | 0.50 |
|---|---|---|---|---|---|
| α | 0.00 | β | 0.00 | γ | 0.00 |

-continued

| | | Decentration [3] | | | |
|---|---|---|---|---|---|
| X | 0.00 | Y | −3.59 | Z | 7.95 |
| α | (variable) | β | 0.00 | γ | 0.00 |
| | | Decentration [4] | | | |
| X | 0.00 | Y | 1.77 | Z | −6.07 |
| α | −3.67 | β | 0.00 | γ | 0.00 |
| | | Decentration [5] | | | |
| X | 0.00 | Y | 4.48 | Z | 3.79 |
| α | 37.88 | β | 0.00 | γ | 0.00 |
| | | Decentration [6] | | | |
| X | 0.00 | Y | −5.33 | Z | 2.56 |
| α | 91.28 | β | 0.00 | γ | 0.00 |
| | | Decentration [7] | | | |
| X | 0.00 | Y | 6.75 | Z | −2.44 |
| α | 88.85 | β | 0.00 | γ | 0.00 |
| | | Decentration [8] | | | |
| X | 0.00 | Y | 5.37 | Z | 10.01 |
| α | 95.00 | β | 0.00 | γ | 0.00 |
| | | Decentration [9] | | | |
| X | 0.00 | Y | 10.85 | Z | 13.20 |
| α | (variable) | β | 0.00 | γ | 0.00 |
| | | Decentration [10] | | | |
| X | 0.00 | Y | −5.30 | Z | −1.66 |
| α | 111.37 | β | 0.00 | γ | 0.00 |
| | | Decentration [11] | | | |
| X | 0.00 | Y | −0.30 | Z | −2.49 |
| α | 85.22 | β | 0.00 | γ | 0.00 |
| | | Decentration [12] | | | |
| X | 0.00 | Y | −3.88 | Z | −5.57 |
| α | 39.37 | β | 0.00 | γ | 0.00 |
| | | Decentration [13] | | | |
| X | 0.00 | Y | −4.11 | Z | 1.53 |
| α | −4.78 | β | 0.00 | γ | 0.00 |
| | | Decentration [14] | | | |
| X | 0.00 | Y | 8.39 | Z | 14.54 |
| α | 0.00 | β | 0.00 | γ | 0.00 |
| | | Decentration [15] | | | |
| X | 0.00 | Y | 8.39 | Z | 14.84 |
| α | 0.00 | β | 0.00 | γ | 0.00 |
| | | Decentration [16] | | | |
| X | 0.00 | Y | 8.39 | Z | 15.47 |
| α | 0.00 | β | 0.00 | γ | 0.00 |

| (Amount of variable decentration) | | | |
|---|---|---|---|
| | Wide | Intermediate | Telephoto |
| Decentration [3]α | −17.24 | −26.85 | −40.46 |
| Decentration [9]α | −9.26 | −28.58 | −42.09 |

Wide: wide-angle end,
Intermediate: intermediate setting, and
Telephoto: telephoto end.

Given below are the values of conditions (1), (2) and (3) in Examples 1 and 2.

| | Condition (1) | | Condition (2) | | |
|---|---|---|---|---|---|
| | Prism 10 | Prism 20 | X-direction | Y-direction | Condition (3) |
| Ex. 1 | 17.4° | 23.3° | 3.0 | 3.0 | 29.4 |
| Ex. 2 | 23.2° | 32.8° | 2.9 | 3.0 | 29.4 |

While, in the above examples, one optical element (decentered prism) is located before, and after the stop, it is understood that a plurality of optical elements (decenterd prisms) could be located before and/or after the stop. Elements other than prisms, for instance, mirrors could be located as the optical elements. When the optical element is a decentered prism, it is not limited to a decentered prism capable of two internal reflections such as those shown in FIGS. 3 and 9. For instance, various decentered prisms capable of one or more internal reflections could be used.

Some exemplary decentered prisms usable as the optical element are now explained with reference to normal ray tracing. Assume here that each decentered prism P acts as a prism to form an image of a distant object on an image plane 136 via a pupil 131. However, each decentered prism P could also be used as a decentered prism P to form an object image on the side of the pupil 131 by way of light rays incident from the side of the image plane 136.

Figure 13:
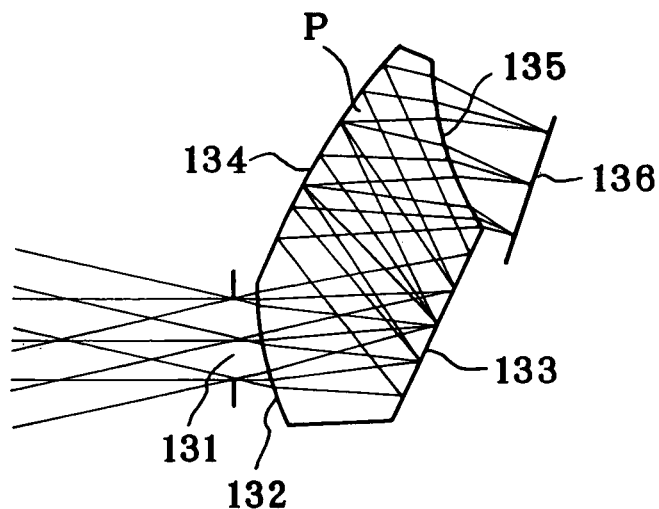
FIG. 13 is illustrative of one modified example of the decentered prism usable with the zoom optical system of the invention.

Referring first to FIG. 13, a decentered prism P comprises a first surface 132, a second surface 133, a third surface 134 and a fourth surface 135. Incident light is incident through an entrance pupil 131 on the decentered prism P upon refracted through the first surface 132. Entering the decentered prism P, the light is internally reflected at the second surface 133 and then at the third surface 134 in such a way as to form a Z-shaped optical path. Finally, the light enters the fourth surface 135 through which it is refracted to form an image on an image plane 136.

Figure 14:
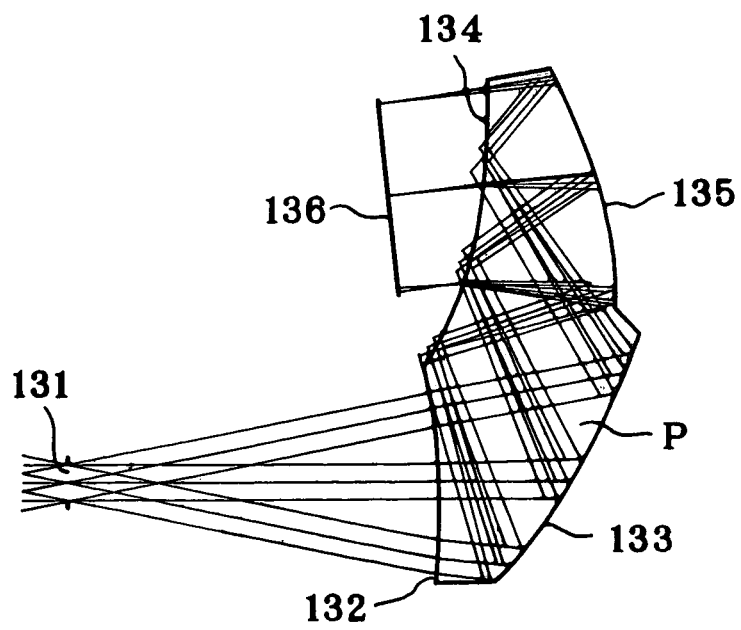
FIG. 14 is illustrative of another modified example of the decentered prism.

Referring to FIG. 14, a decentered prism P comprises a first surface 132, a second surface 133, a third surface 134 and a fourth surface 135. Incident light is incident through an entrance pupil 131 on the decentered prism P upon refracted through the first surface 132. Entering the prism P, the light is internally reflected at the second surface 133 and then incident on the third surface 134 at which it is totally reflected. The reflected light is then incident on the fourth surface 135 at which it is internally reflected. Finally, the reflected light is again incident on the third surface 134 through which, this time, it is refracted to form an image on an image plane 136.

Figure 15:
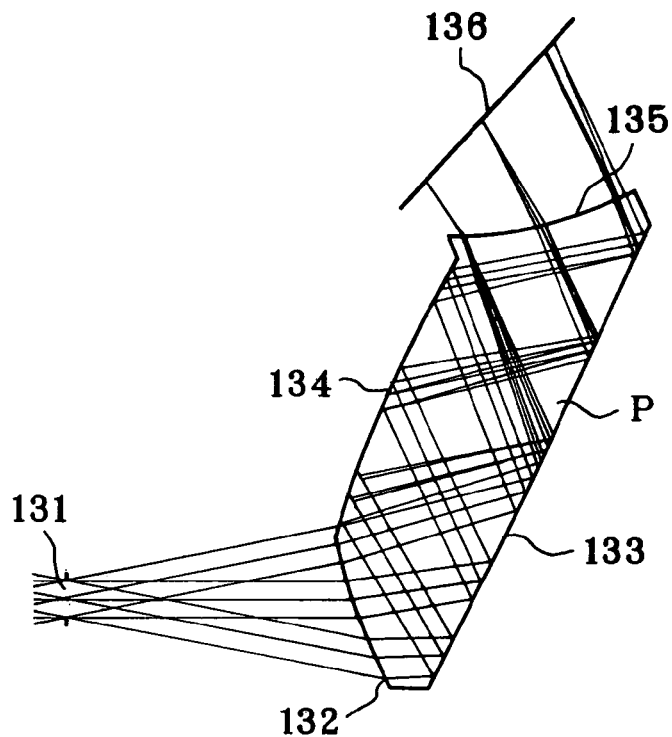
FIG. 15 is illustrative of yet another modified example of the decentered prism.

Referring to FIG. 15, a decentered prism P comprises a first surface 132, a second surface 133, a third surface 134 and a fourth surface 135. Incident light is incident through an entrance pupil 131 on the decentered prism P upon refracted through the first surface 132. Entering the prism P, the light is internally reflected at the second surface 133 and then incident on the third surface 134 at which it is internally reflected. The reflected light reenters the second surface 133 at which it is internally reflected. Finally, the reflected light enters the fourth surface 135 through which it is refracted to form an image on an image plane 136.

Figure 16:
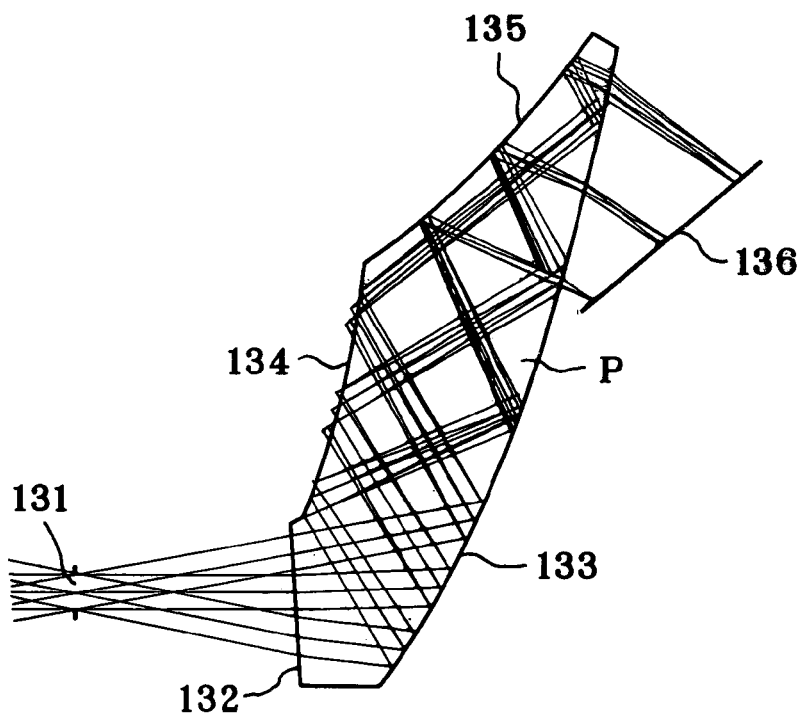
FIG. 16 is illustrative of a further modified example of the decentered prism.

Referring to FIG. 16, a decentered prism P comprises a first surface 132, a second surface 133, a third surface 134 and a fourth surface 135. Incident light is incident through an entrance pupil 131 on the decentered prism P upon refracted through the first surface 132. Entering the decentered prism P, the light is internally reflected at the second surface 133 and then incident on the third surface 134 at which it is internally reflected. Subsequently, the light reenters the second surface 133 at which it is internally reflected, and the reflected light enters the fourth surface 135 at which it is internally reflected. Finally, the reflected light reenters the second surface 133 through which, this time, it is refracted to form an image on an image plane 136.

Figure 17:
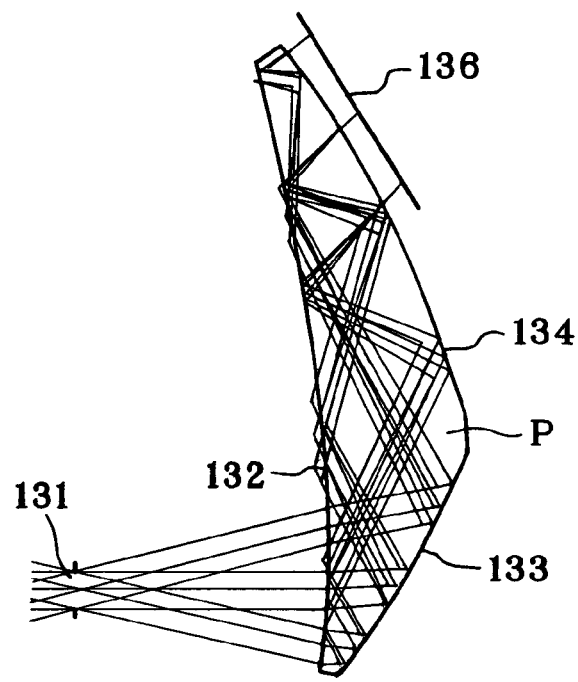
FIG. 17 is illustrative of a further modified example of the decentered prism.

Referring to FIG. 17, a decentered prism P comprises a first surface 132, a second surface 133 and a third surface 134. Incident light is incident through an entrance pupil 131 on the decentered prism P upon refracted through the first surface 132. Entering the decentered prism P, the light is internally reflected at the second surface 133, reentering the first surface 132 at which, this time, it is totally reflected. Subsequently, the reflected light is internally reflected at the third surface 134, and again reenters the first surface 132 at which it is totally reflected. Finally, the reflected light reenters the third surface 134 through which, this time, it is refracted to form an image on an image plane 136.

Figure 18:
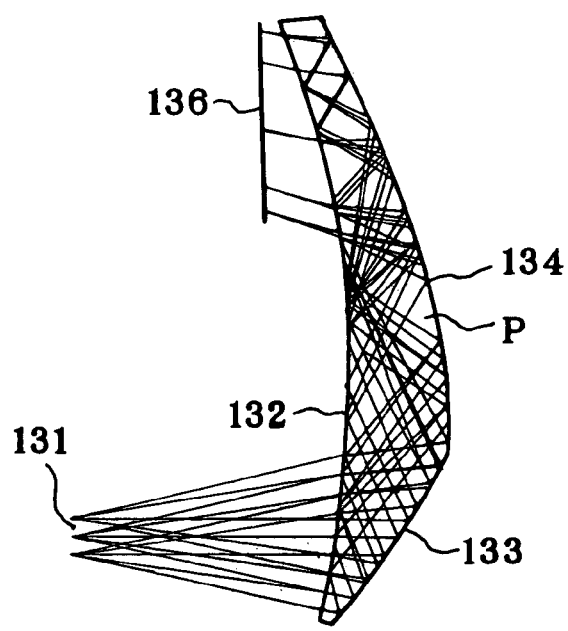
FIG. 18 is illustrative of a further modified example of the decentered prism.

Referring to FIG. 18, a decentered prism P comprises a first surface 132, a second surface 133 and a third surface 134. Incident light is incident through an entrance pupil 131 on the decentered prism P upon refracted through the first surface 132. Entering the decentered prism P, the light is internally reflected at the second surface 133, reentering the first surface 132 at which, this time, it is totally reflected. Subsequently, the reflected light is internally reflected at the third surface 134, again reentering the first surface 132 at which it is totally reflected. Finally, the reflected light reenters the third surface 134 at which it is internally reflected, yet again reentering the first surface 132 through which it is now refracted to form an image on an image plane 136.

Figure 19:
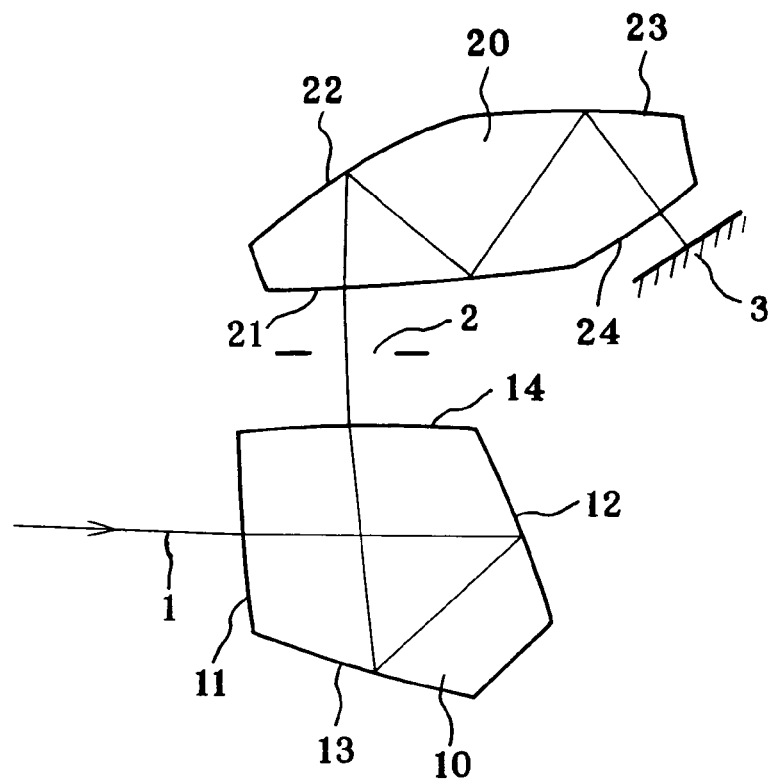
FIG. 19 is illustrative of one example of the zoom optical system comprising a combination of prisms different from those of Examples 1 and 2 according to the invention.

Further, it is acceptable to use a prism that comprises a first surface 21, a second surface 22, a third surface 23 and a fourth surface 24, and is capable of three internal reflections, for instance, a decentered prism 20 as shown in FIG. 19 to be referred to later. Alternatively, it is acceptable to use a prism that comprises a first surface 21, a second surface 22 and a third surface 23, and is capable of two internal reflections with the second surface 22 acting as a combined total reflection and exit surface, for instance, a decentered prism 20 shown in FIG. 21 to be referred to later. Yet alternatively, it is acceptable to use a prism that comprises a first surface 21, a second surface 22 and a third surface 23, and is capable of two internal reflections with the first surface 21 acting as a combined entrance and total reflection surface, for instance, a decentered prism 20 shown in FIG. 21 to be referred to later. Each of three such decentered prisms 20 could be used as the front optical element (decentered prism) or the rear optical element (decentered prism).

Some exemplary optical systems of the invention comprising a combination of optical elements (decentered prisms) different from those in Examples 1 and 2 are shown in FIGS. 19 to 22. However, specific numerical data are not shown, and the decentered prism is simply called a prism.

Referring to FIG. 19, a prism 10 is the same as in FIGS. 3 and 9, and a prism 20 has a first surface 21, a second surface 22, a third surface 23 and a fourth surface 24 as optical function surfaces. The first surface 21 is a combined entrance and second reflecting surface; the second surface 22 is a first reflecting surface; the third surface 23 is a third reflecting surface; and the fourth surface 24 is an exit surface. Passing through the prism 10 and a stop 2, light transmits the entrance surface 21, arriving at the first reflecting surface 22 at which it is reflected and then totally reflected at the first surface 21. Subsequently, the reflected light is internally reflected at the third reflecting surface 23, transmitting the exit surface 24 to form an image on an image plane 3. Within the prism 20, light rays are internally reflected in such a way as to form an M-shaped optical path.

Figure 20:
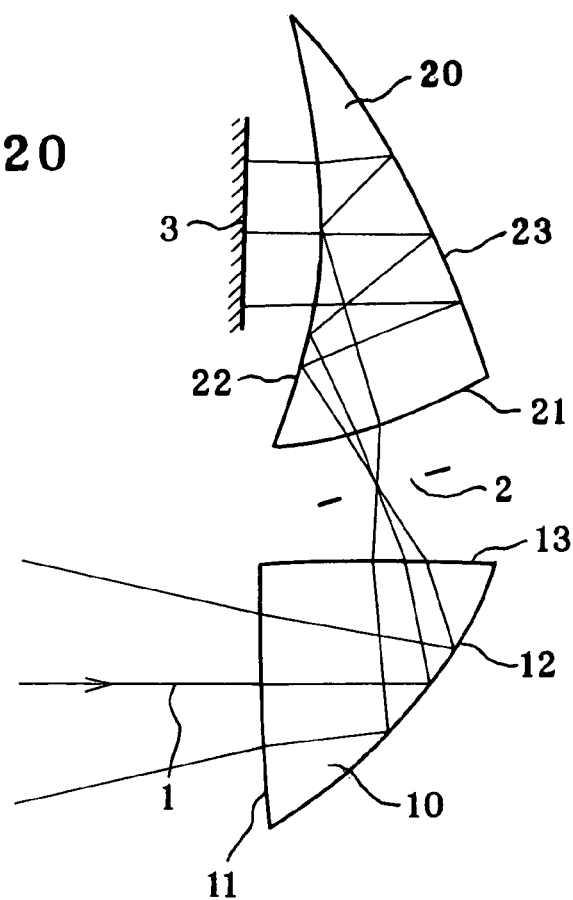
FIG. 20 is illustrative of another example of the zoom optical system comprising a combination of prisms different from those of Examples 1 and 2 according to the invention.

Referring to FIG. 20, a prism 10 has a first surface 11, a second surface 12 and a third surface 13 as optical function surfaces. The first surface 11 is an entrance surface; the second surface 12 is a reflecting and exit surface; and the third surface 13 is an exit surface. Light rays from an object transmits the entrance surface 11, and is reflected at the reflecting surface 12 and refracted through the third surface 13, leaving the prism 10 and entering a stop 2. A prism 20 has a first surface 21, a second surface 22 and a third surface 23 as optical function surfaces. The first surface 21 is an entrance surface; the second surface 22 is a combined first reflecting and exit surface; and the third surface 23 is a second reflecting surface. Passing through the prism 10 and stop 2, light rays transmit the entrance surface 21, arriving at the first reflecting surface 22 at which it is totally reflected. The reflected light is internally reflected at the second reflecting surface 23, and this time it transmits the second surface 22 to form an image on an image plane 3.

Figure 21:
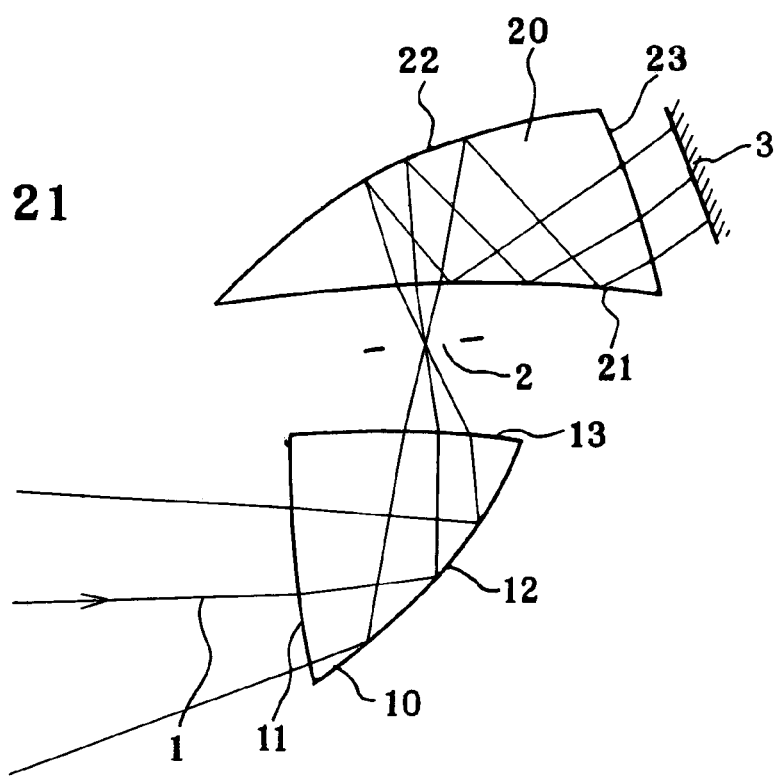
FIG. 21 is illustrative of yet another example of the zoom optical system comprising a combination of prisms different from those of Examples 1 and 2 according to the invention.

Referring to FIG. 21, a prism 10 is the same as in FIG. 20, and a prism 20 has a first surface 21, a second surface 22 and a third surface 23 as optical function surfaces. The first surface 21 is a combined entrance and second reflecting surface; the second surface 22 is a first reflecting surface; and the third surface 23 is an exit surface. Passing through the front prism 10 and a stop 2, light rays transmit the entrance surface 21 for reflection at the first reflecting surface 22. This time, the reflected light is totally reflected at the first reflecting surface 21, transmitting the exit surface 23 to form an image on an image plane 3.

Figure 22:
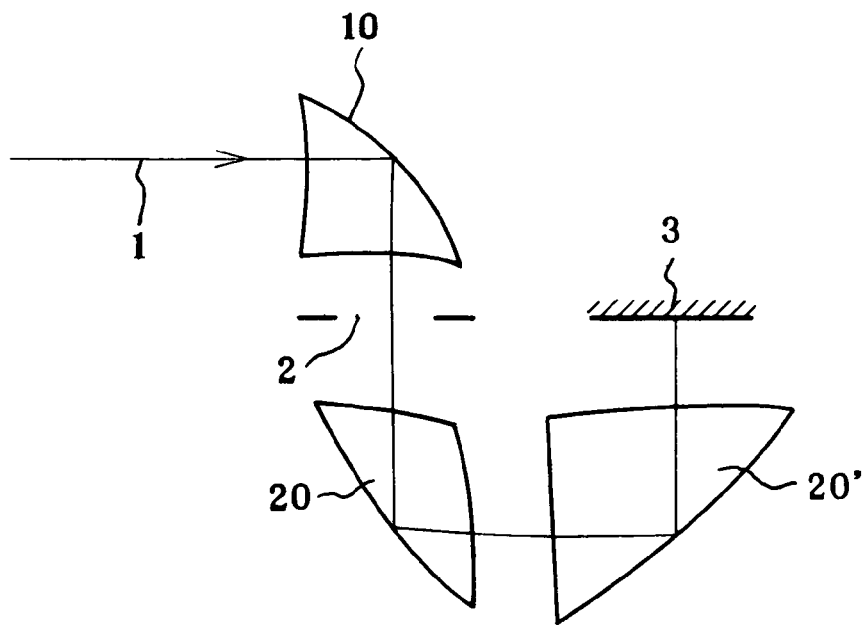
FIG. 22 is illustrative of a further example of the zoom optical system comprising a combination of prisms different from those of Examples 1 and 2 according to the invention.

FIG. 22 is illustrative of one exemplary construction of the zoom optical system according to the invention. As shown in FIG. 22, one prism 10 is located in front of a stop 2, and two prisms 20, 20' are located in the rear of the stop 2. Any one of the prisms 10, 20, 20' is capable of one internal reflection.

Throughout the arrangements of FIGS. 19 to 22, at least the prism is preferably rotated about the center axis Si vertical to the Y-Z plane for zooming purposes. More preferably, all the prisms should be rotated in cooperation with one another.

The resinous material is used for the optical elements in Examples 1 and 2. Instead, however, an organic-inorganic composite material could be used. Organic-inorganic composite materials usable herein are now explained.

In an organic-inorganic composite material, an organic component and an inorganic component are mixed together into a composite material at a molecular level or a nano-scale. Some available forms include (1) a structure wherein a polymeric matrix comprising an organic skeleton and a matrix comprising an inorganic skeleton are entangled together and penetrated into each other, (2) a structure wherein inorganic fine particles (so-called nano-particles) much smaller than the wavelength of light on a nano-scale are uniformly dispersed throughout a polymeric matrix comprising an organic skeleton, and (3) a combined structure of both. Between the organic component and the inorganic component there are some interactions such as intermolecular forces, e.g., hydrogen bonds, dispersion forces and Coulomb force, attractive forces resulting from covalent bonds, ionic bonds and interaction of π electron clouds, etc. In the organic-inorganic composite material, the organic component and the inorganic component are mixed together at a molecular level or at a scale level smaller than the wavelength of light. For this reason, that composite material provides a transparent material because of having little or no influence on light scattering. As can also be derived from Maxwell equation, the composite material possesses the optical characteristics of each of the organic and inorganic components. Therefore, the organic-inorganic composite material can have various optical properties (such as refractive index and chromatic dispersion) depending on the type and quantitative ratio of the organic and inorganic components present. Thus, it is possible to obtain various optical properties by blending together the organic and inorganic components at any desired ratio.

Some exemplary compositions of an organic-inorganic composite material comprising an acrylate resin (of the ultraviolet curable type) and nano-particles of zirconia ($ZrO_2$) are shown in Table 1; some exemplary compositions of an organic-inorganic composite material comprising an acrylate resin and nano-particles of zirconia ($ZrO_2$)/alumina ($Al_2O_3$) in Table 2; some exemplary composition of an organic-inorganic composite material comprising an acrylate resin and nano-particles of niobium oxide ($Nb_2O_5$) in Table 3; and some exemplary compositions of an acrylate resin and nano-particles of zirconium alkoxide/alumina ($Al_2O_3$) in Table 4.

TABLE 1

| Zr Content | $n_d$ | $v_d$ | $n_C$ | $n_F$ | $n_g$ |
|---|---|---|---|---|---|
| 0 (100% acrylic) | 1.49236 | 57.85664 | 1.48981 | 1.49832 | 1.50309 |
| 0.1 | 1.579526 | 54.85037 | 1.57579 | 1.586355 | 1.59311 |
| 0.2 | 1.662128 | 53.223 | 1.657315 | 1.669756 | 1.678308 |
| 0.3 | 1.740814 | 52.27971 | 1.735014 | 1.749184 | 1.759385 |
| 0.4 | 1.816094 | 51.71726 | 1.809379 | 1.825159 | 1.836887 |
| 0.5 | 1.888376 | 51.3837 | 1.880807 | 1.898096 | 1.911249 |

Zr Content: zirconia content

TABLE 2

| $Al_2O_3$* | $ZrO_2$* | $n_d$ | $v_d$ | $n_C$ | $n_F$ | $n_g$ | Remarks |
|---|---|---|---|---|---|---|---|
| 0.1 | 0.4 | 1.831515 | 53.56672 | 1.824581 | 1.840374 | 1.8151956 | 100% acrylate |
| 0.2 | 0.3 | 1.772832 | 56.58516 | 1.767125 | 1.780783 | 1.790701 | |
| 0.3 | 0.2 | 1.712138 | 60.97687 | 1.707449 | 1.719127 | 1.727275 | |
| 0.4 | 0.1 | 1.649213 | 67.85669 | 1.645609 | 1.655177 | 1.661429 | |
| 0.2 | 0.2 | 1.695632 | 58.32581 | 1.690903 | 1.702829 | 1.774891 | |

$Al_2O_3$*: quantitative ratio of $Al_2O_3$
$ZrO_2$*: quantitative ratio of $ZrO_2$

TABLE 3

| $Nb_2O_5$* | $Al_2O_3$* | $n_d$ | $v_d$ | $n_C$ | $n_F$ | $n_g$ |
|---|---|---|---|---|---|---|
| 0.1 | 0 | 1.589861 | 29.55772 | 1.584508 | 1.604464 | 1.617565 |
| 0.2 | 0 | 1.681719 | 22.6091 | 1.673857 | 1.70401 | 1.724457 |
| 0.3 | 0 | 1.768813 | 19.52321 | 1.758673 | 1.798053 | 1.8251 |
| 0.4 | 0 | 1.851815 | 17.80818 | 1.839583 | 1.887415 | 1.920475 |
| 0.5 | 0 | 1.931253 | 16.73291 | 1.91708 | 1.972734 | 2.011334 |

$Nb_2O_5$*: content of $Nb_2O_5$
$Al_2O_3$*: content of $Al_2O_3$

TABLE 4

| $Al_2O_3$* | ZA* | $n_d$ | $v_d$ | $n_C$ | $n_F$ |
|---|---|---|---|---|---|
| 0 | 0.2 | 1.533113 | 58.39837 | 1.530205 | 1.539334 |
| 0.1 | 0.27 | 1.54737 | 62.10192 | 1.544525 | 1.553339 |
| 0.2 | 0.24 | 1.561498 | 66.01481 | 1.558713 | 1.567219 |
| 0.3 | 0.21 | 1.575498 | 70.15415 | 1.572774 | 1.580977 |
| 0.4 | 0.18 | 1.589376 | 74.53905 | 1.586709 | 1.594616 |

$Al_2O_3$*: content of $Al_2O_3$ (film)
ZA*: zirconia alkoxide

Electronic equipment comprising such an inventive optical system as described above is now explained. Used for such electronic equipment is a taking unit wherein an object image formed through the above zoom optical system is received by an image pickup device such as CCD or silver-halide film for taking. This image pickup unit could also be used as an optical unit using a small-format image pickup device, for instance, as an image pickup optical system in an endoscope. Alternatively, the image pickup unit could be used as a viewing unit designed to view an object image through an eyepiece lens, especially as an objective optical system in the finder portion of a camera.

The electronic equipment, for instance, includes digital cameras, video cameras, digital video units, information processors such as personal computers and mobile computers, telephone sets in general and easy-to-carry cellular phones in particular, personal digital assistants, and electronic endoscopes, as set forth below.

Figure 23:
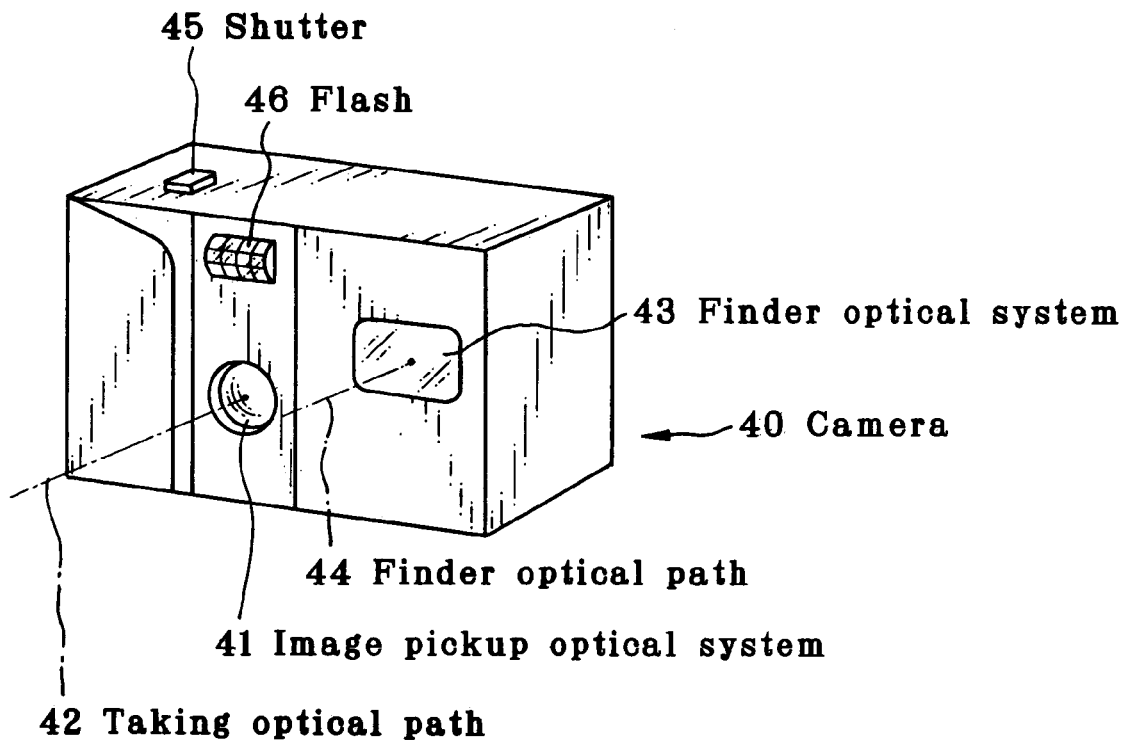
FIG. 23 is a front perspective view of the appearance of an electronic camera on which the zoom optical system of the invention is mounted.
Figure 24:
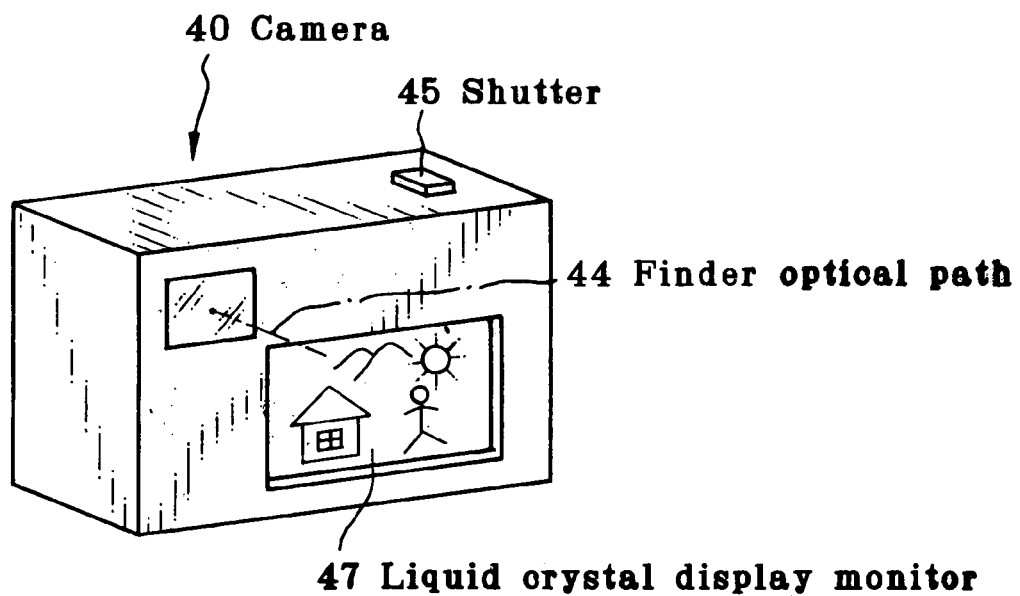
FIG. 24 is a rear perspective view of the electronic camera of FIG. 23.
Figure 25:
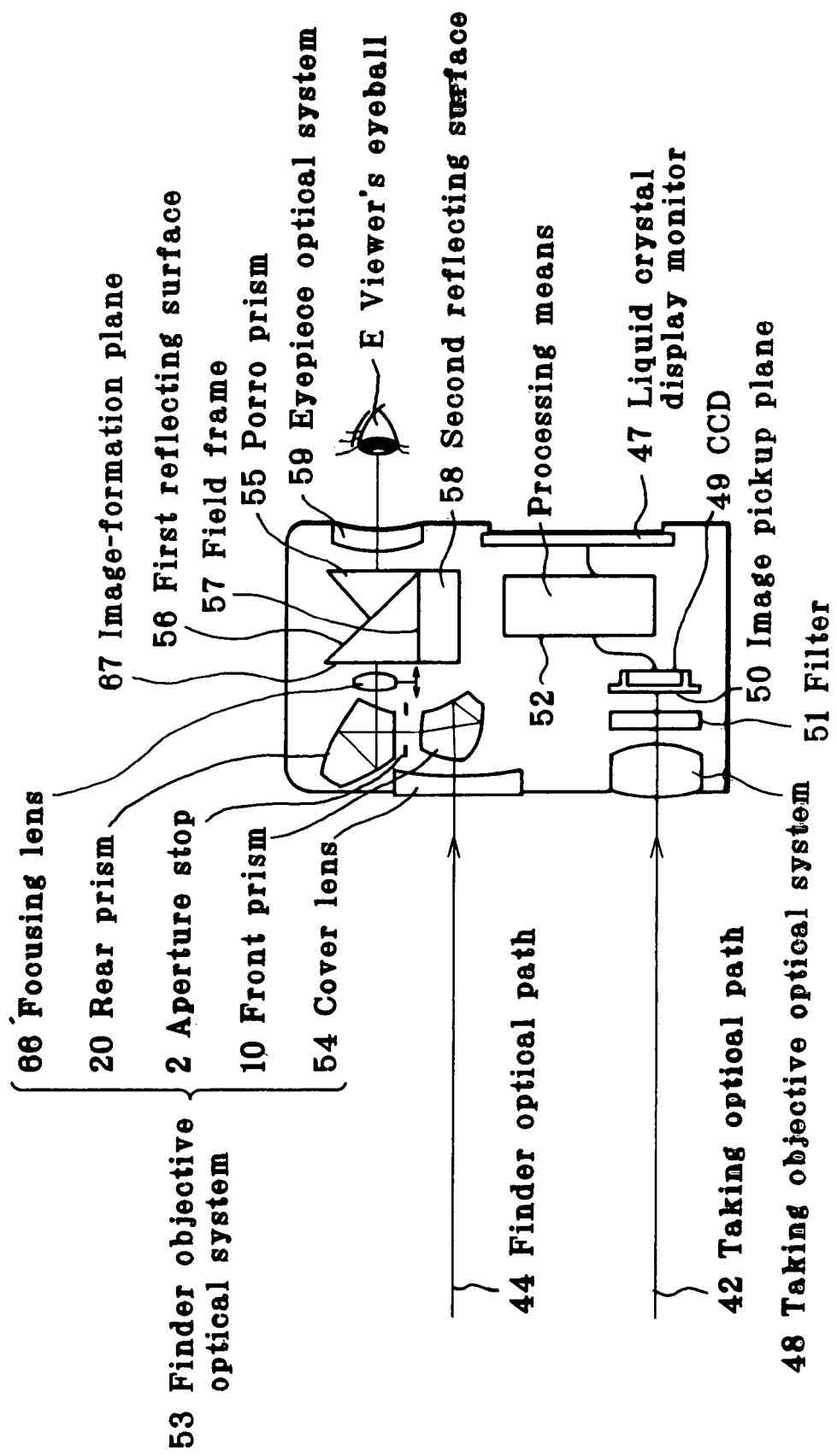
FIG. 25 is a sectional view of the arrangement of the electronic camera of FIG. 23.

FIGS. 23, 24 and 25 are conceptual illustrations of an electronic camera having an objective optical system in a finder portion, in which the optical system of the invention is incorporated. FIG. 23 is a front perspective view of the outward appearance of an electronic camera 40, and FIG. 24 is a rear perspective view of the same. FIG. 25 is a sectional view of the construction of the electronic camera 40.

In this embodiment, the electronic camera 40 comprises a taking optical system 41 having a taking optical path 42, a finder optical system 43 having a finder optical path 44, a shutter 45, a flash 46, a liquid crystal monitor 47 and so on. As the user presses down the shutter 45 located on an upper portion of the camera 40, it causes taking to occur through a taking objective optical system 48.

An object image formed by the taking objective optical system 48 is formed on the image pickup plane of a CCD 49 via filters 51 such as a low-pass filter and an infrared cut filter. The object image received at CCD 49 is shown as an electronic image on the liquid crystal monitor 47 via processing means 52, which monitor is mounted on the back of the camera. This processing means 52 may have a memory or the like therein to record taken electronic images. It is here noted that the memory could be provided separately from the processing means 52 or, alternatively, it could be constructed in such a way that images are electronically recorded and written thereon by means of floppy (registered trademark) discs or the like. This camera could also be constructed in the form of a silver-halide camera using a silver-halide film in place of CCD 49.

Moreover, a finder objective optical system 53 is located on the finder optical path 44. The finder objective optical system 53 comprises a cover lens 54, a front prism 10, an aperture stop 2, a rear prism 20 and a focusing lens 66. Here, the optical system according to the invention is used for an optical system from the cover lens 54 or the first prism 10 to the second prism 20.

The cover lens 54 used as a cover member is a lens that has negative power and works to enlarge the angle of view. In the rear of the rear prism 20 there is a focusing lens 66 that has its position adjustable in the fore-and-aft direction of the optical axis and is used to adjust the focus of the finder objective optical system 53. An object image formed by that finder objective optical system 53 on an image-formation plane 67 is in turn formed on a field frame 57, which is attached to a Porro prism 55 that is an image-erecting member. Here, the field frame 57 is interposed between the first reflecting surface 56 and the second reflecting surface 58 of the Porro prism 55 to separate them from each other. In the rear of the Porro prism 55 there is located an eyepiece optical system 59 for guiding an erected image into the eyeball E of a viewer.

In the thus assembled camera 40, the finder objective optical system 53 that cooperates with the taking objective optical system 48 for zooming can be set up with fewer optical elements, and high performance is achieved at low costs. Moreover, the optical path itself through the objective optical system 53 can be bent. This is favorable in view of design because of an increased degree of flexibility in where in the camera it is located.

Turning again to FIG. 23, the construction of the taking objective optical system 48 is not referred to. However, a refraction type co-axial optical system could be used as the taking objective optical system 48. As a matter of course, it is also acceptable to use the zoom optical system of the invention, that is, the optical system comprising the front prism 10 and the rear prism 20.

Figure 26:
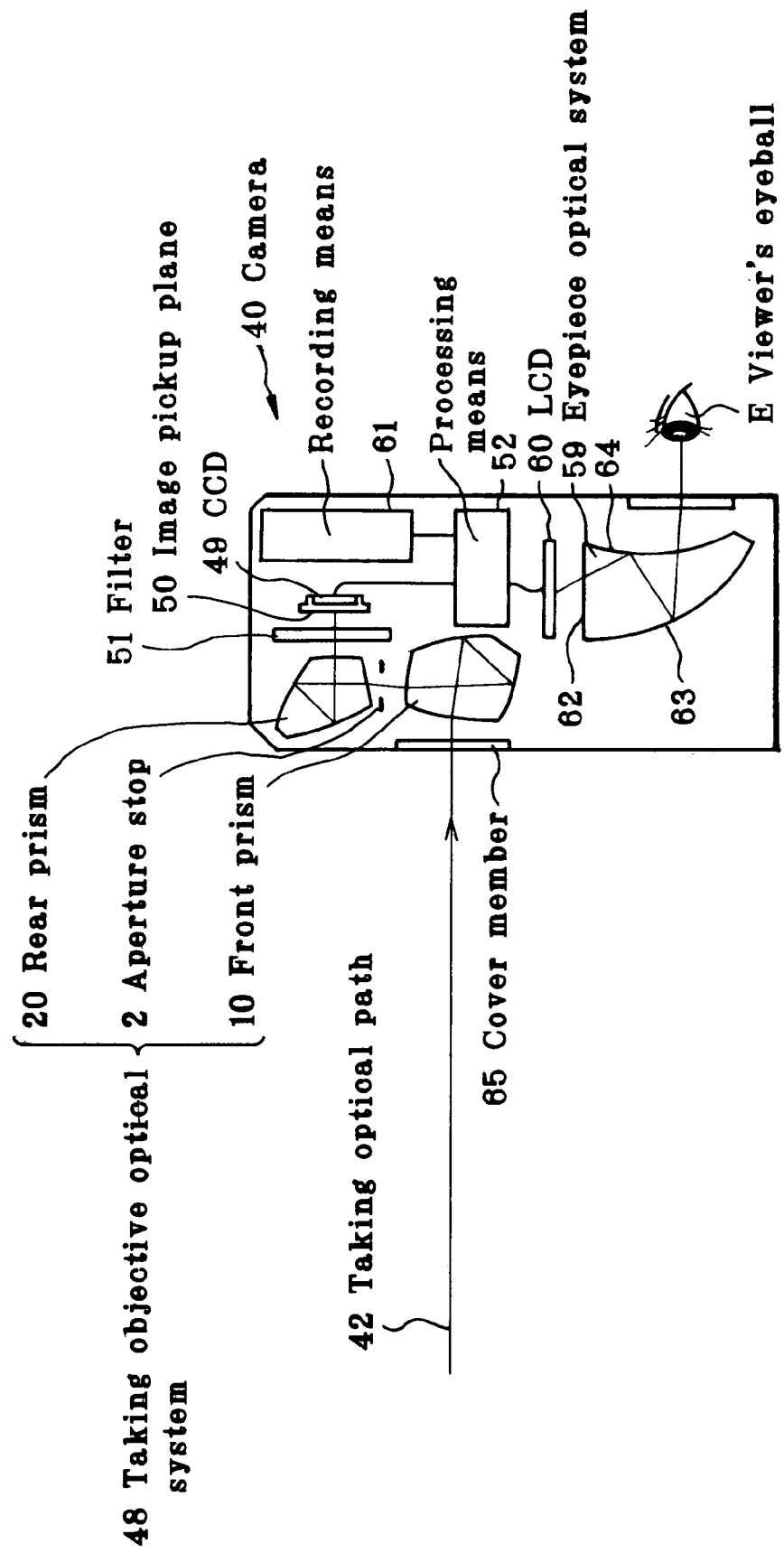
FIG. 26 is illustrative in conception of another electronic cameral on which the zoom optical system of the invention is mounted.

FIG. 26 is illustrative in conception of another embodiment of the electronic camera 40, in which the optical system of the invention is incorporated in the objective optical system 48 that is a taking portion of the camera 40. In this arrangement, the inventive optical system comprising a front prism 10, an aperture stop 2 and a rear prism 20 is used for the taking objective optical system 48 located on a taking optical path 42.

An object image formed by the taking objective optical system 48 is formed on the image pickup plane 50 of a CCD 49 via filters 51 such as a low-pass filter and an infrared cut filter. The object image received at CCD 49 is shown as an electronic image on a liquid crystal display device (LCD) 60 via processing means 52 that also controls recording means 61. It is here noted that the recording means 61 is provided to record the object image taken by CCD 49 in the form of electronic information. The image appearing on LCD 60 is guided to the eyeball E of a viewer via an eyepiece optical system 59.

This eyepiece optical system 59 comprises a decentered prism that is herein composed of three surfaces, i.e., an entrance surface 62, a reflecting surface 63 and a combined reflection and refraction surface 64. At least one or preferably both of the two surfaces 63 and 64 having reflecting action are composed of a free-form surface symmetric with respect to plane, which has only one symmetric plane that gives power to light beams and corrects decentration aberrations. This only one symmetric plane is formed on much the sample plane as only one symmetric plane of the plane symmetric free-form surface that the prisms 10 and 20 of the taking objective optical system 48 have. The taking objective optical system 48 could further comprise other lenses (positive lens and negative lens) on the object or image side of the prisms 10, 20 or between them.

In the thus assembled camera 40, the taking objective optical system 48 can be set up with fewer optical elements, yet high performance is achievable at low costs and the whole optical system can be arranged on the same plane. For this reason, this planar arrangement can be reduced in the thickness in the vertical direction.

While, in this embodiment, a plane-parallel plate is used as the cover member 65 of the taking objective optical system 48, it is understood that a powered lens could be used for the same purpose, as already described.

It is also understood that instead of using the cover member, the surface located nearest to the object side of the optical system of the invention could be used as a cover member.

Figure 27:
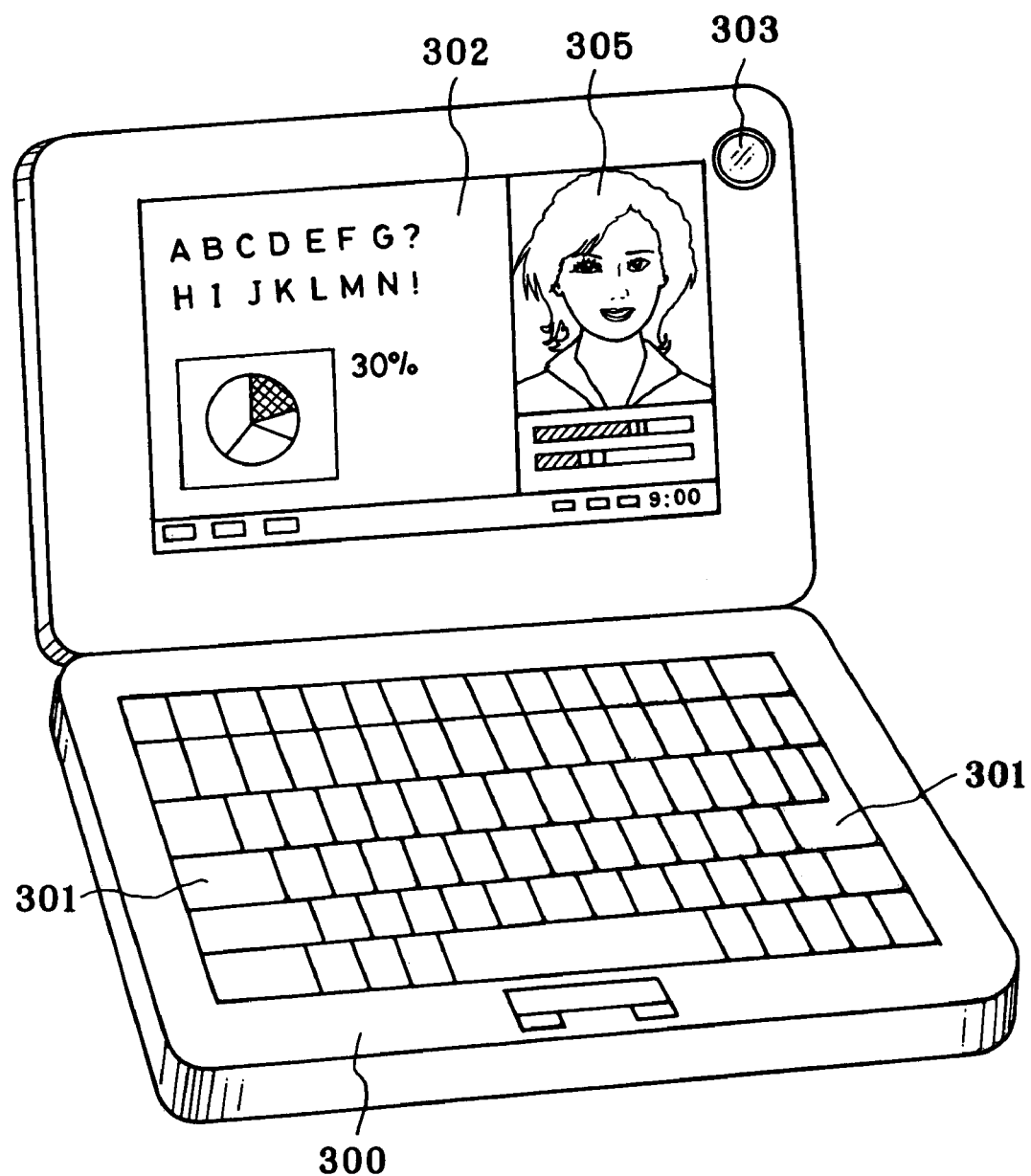
FIG. 27 is a front perspective view of a personal computer with a cover opened up, which incorporates the zoom optical system of the invention as an objective optical system.
Figure 28:
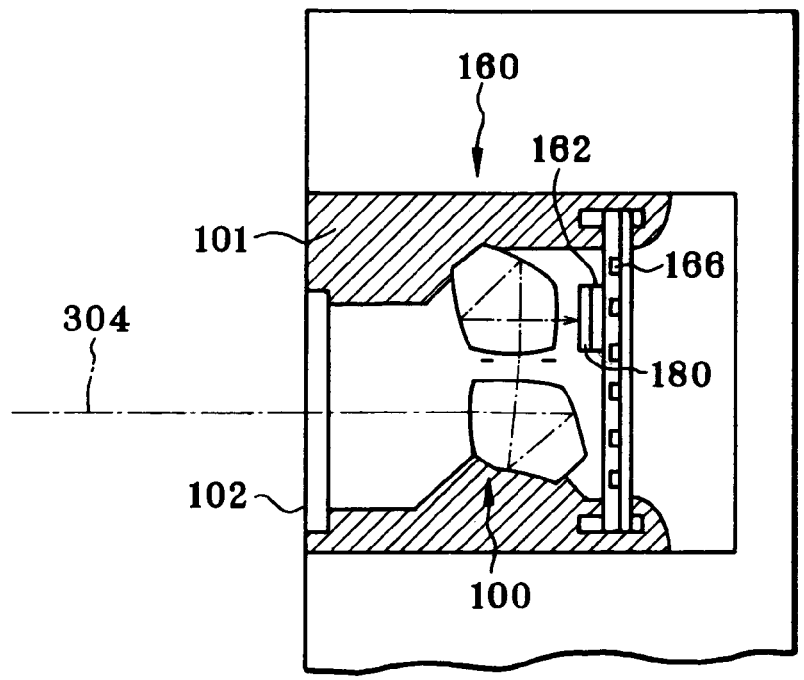
FIG. 28 is a sectional view of a taking optical system in the personal computer.

FIGS. 27, 28 and 19 are illustrative of a personal computer that is one example of the information processor in which the optical system of the invention is built.

Figure 29:
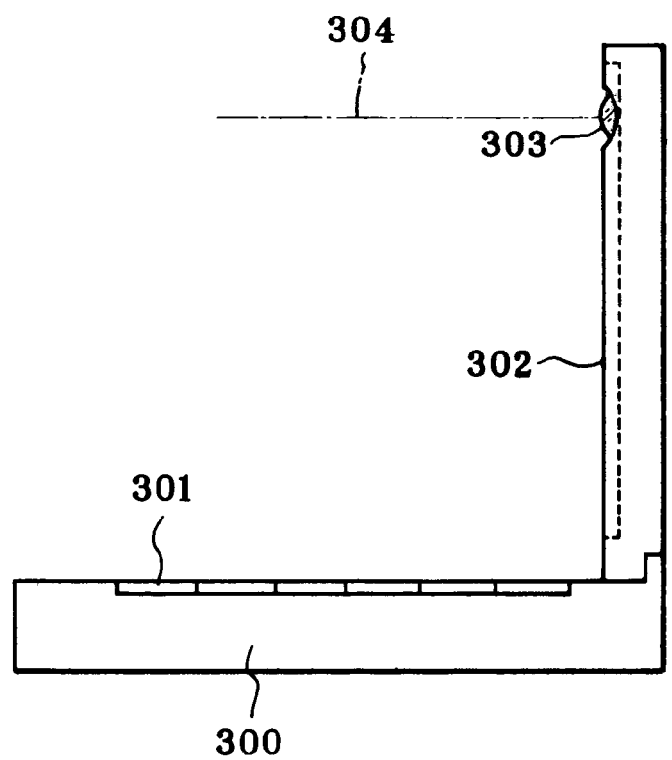
FIG. 29 is a side view of the state of FIG. 27.

FIG. 27 is a front perspective view of a personal computer 300 in use with a cover put up, FIG. 28 is a side view of a taking optical system 303 in the personal computer 300, and FIG. 27 is a side view of the state of FIG. 29. As shown in FIGS. 27, 28 and 29, the personal computer 300 comprises a keyboard 301, information processing means and recording means, a monitor 302 and a taking optical system 303.

Here the keyboard 301 is provided for the operator to enter information from the outside in the computer. The information processing means and recording means are not shown. The monitor 302 that presents information to an operator could be any one of a transmission type liquid crystal display device illuminated from its back surface by a backlight (not shown), a reflection type liquid crystal display device designed to display images by reflection of light coming from the front, a CRT display or the like. The taking optical system 303 is provided for taking an image of the operator and surrounding images. While the taking optical system 303 is shown as being built in the right-upper portion of the monitor 302, it is understood that it is not limited thereto; it could be located somewhere around the monitor 302 or keyboard 301.

This taking optical system 303 comprises, on a taking optical path 304, an objective optical system 100 comprising the zoom optical system of the invention and an image pickup device chip 162 for receiving an image. These are built in the personal computer 300.

Here, an IR cut filter 180 is additionally applied onto the image pickup device chip 162. That is, the image pickup device chip 162 and IR cut filter 180 are set up as an image pickup unit 160 that can be fitted into the rear end of a lens barrel 101 of the objective optical system 100 in one-touch operation, so that alignment of the objective optical system with the image pickup device chip 162, and spacing adjustment between them, are dispensed with, leading to easy assembling. At the front end of the lens barrel 101, there is located a cover glass 102 for protection of the objective optical system 100.

An object image received at the image pickup device chip 162 is entered via a terminal 166 in the processing means of the personal computer 300, and shown as an electronic image on the monitor 302. As an example, an image 305 taken of the operator is shown in FIG. 28. This image 305 could be transmitted to and shown on a personal computer on the other end via suitable processing means and the Internet or telephone line.

Figure 30A:
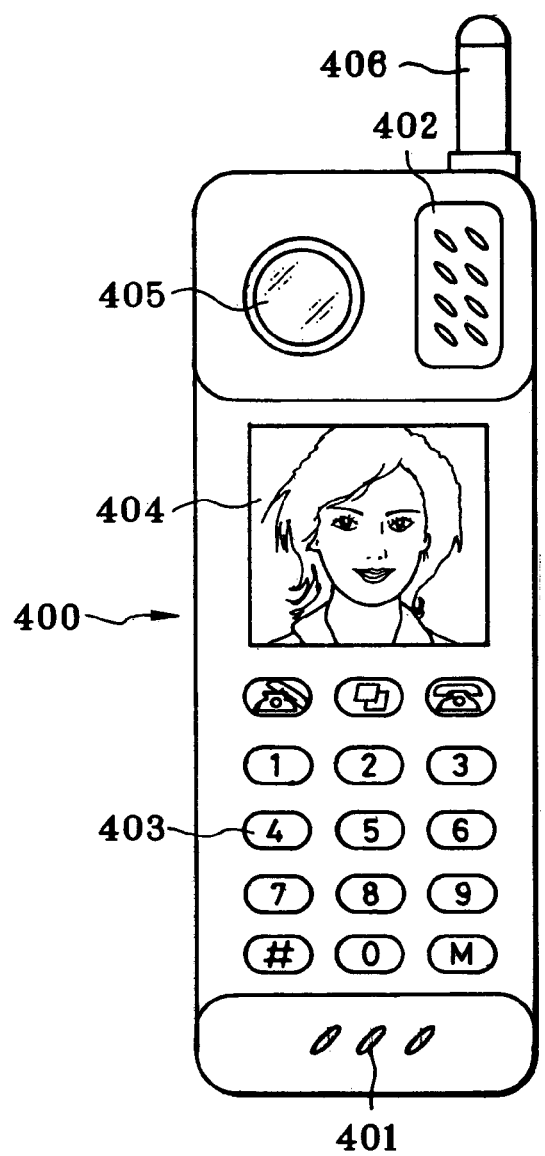
FIGS. 30(a) and 30(b) are a front view and a side view, respectively, of a cellular phone that incorporates the zoom optical system of the invention as an objective optical system.
Figure 30B:
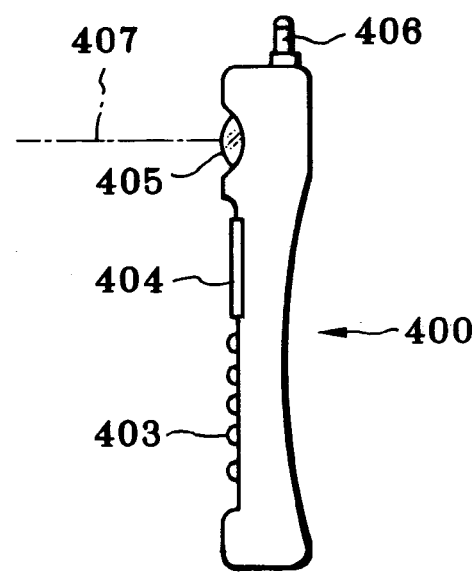
Figure 30C:
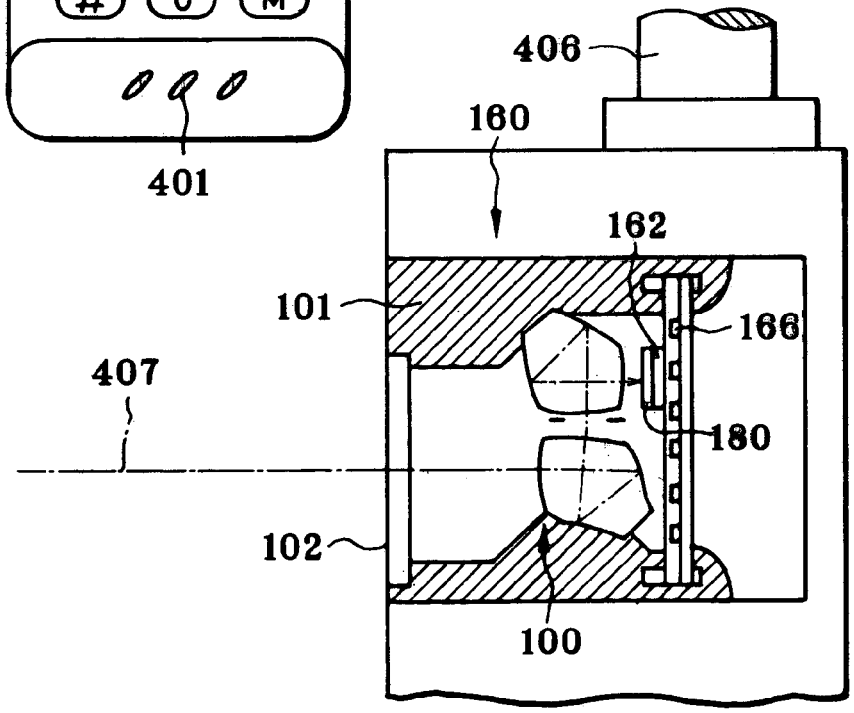
FIG. 30(c) is a sectional view of a taking optical system therein.

FIGS. 30(*a*), 30(*b*) and 30(*c*) are illustrative of a telephone set that is another example of the information processor in which the optical system of the invention is built, especially a convenient-to-carry cellular phone.

FIG. 30(*a*) and FIG. 30(*b*) are a front view and a side view of a cellular phone 400, respectively, and FIG. 30(*c*) is a sectional view of a taking optical system 405. As shown in FIGS. 30(*a*), 30(*b*) and 30(*c*), the cellular phone 400 comprises a microphone 401, a speaker 402, an input dial 403, a monitor 404, a taking optical system 405, an antenna 406, and processing means (not shown).

Here the microphone 401 is to enter the voice of an operator as information in the cellular phone, and the speaker 402 is to produce the voice of the person on the other end. The input dial 403 is for the operator to enter information in the cellular phone. The monitor 404 is to show the images taken of the operator per se or the person on the other end and indicate information such as a telephone number. A liquid crystal display is used as the monitor 404. The antenna 406 is to transmit and receive communications waves. The processor means is to process image information, communications information, input signals, etc. It is here noted that the components or their positions are not limited to those shown.

The taking optical system 405 comprises an objective optical system 100 comprising the zoom optical system of the invention and an image pickup device chip 162 for receiving an object image. Here the optical system of the invention is used for the objective optical system 100 and located on a taking optical path 407, and these are built in the cellular phone 400.

Here, an IR cut filter 180 is additionally applied onto the image pickup device chip 162. That is, the image pickup device chip 162 and IR cut filter 180 are set up as an image pickup unit 160 that can be fitted into the rear end of a lens barrel 13 of an objective lens 12 in one-touch operation, so that alignment of the objective lens 12 with the image pickup device chip 162, and spacing adjustment between them, are dispensed with, leading to easy assembling. At the front end of the lens barrel 101, there is located a cover glass 102 for protection of the objective optical system 100.

An object image received at the image pickup device chip 162 is entered via a terminal 166 in processing means, so that the object image can be displayed as an electronic image on the monitor 404 and/or a monitor on the other end. The processing means also includes a signal processing function for converting information about the object image received at the image pickup device chip 162 into transmittable signals, thereby sending the image to the person on the other end.

Figure 31A:
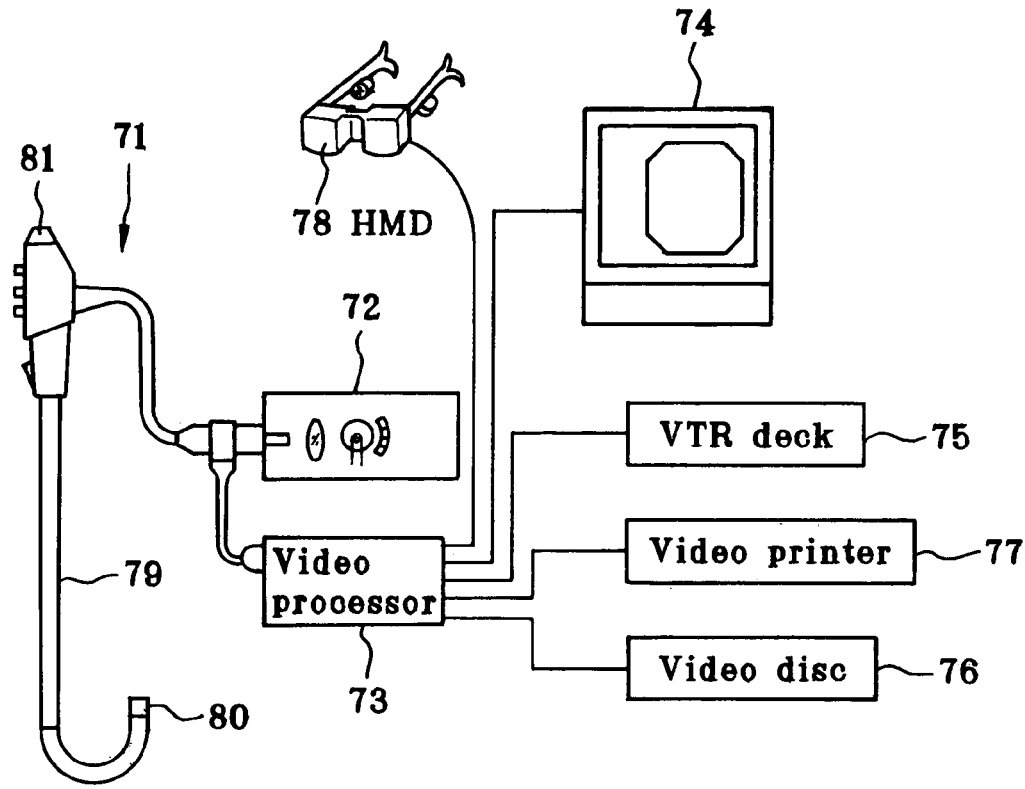
FIG. 31(a) is illustrative of the arrangement of an electronic endoscope system on which the zoom optical system of the invention is mounted.
Figure 31B:
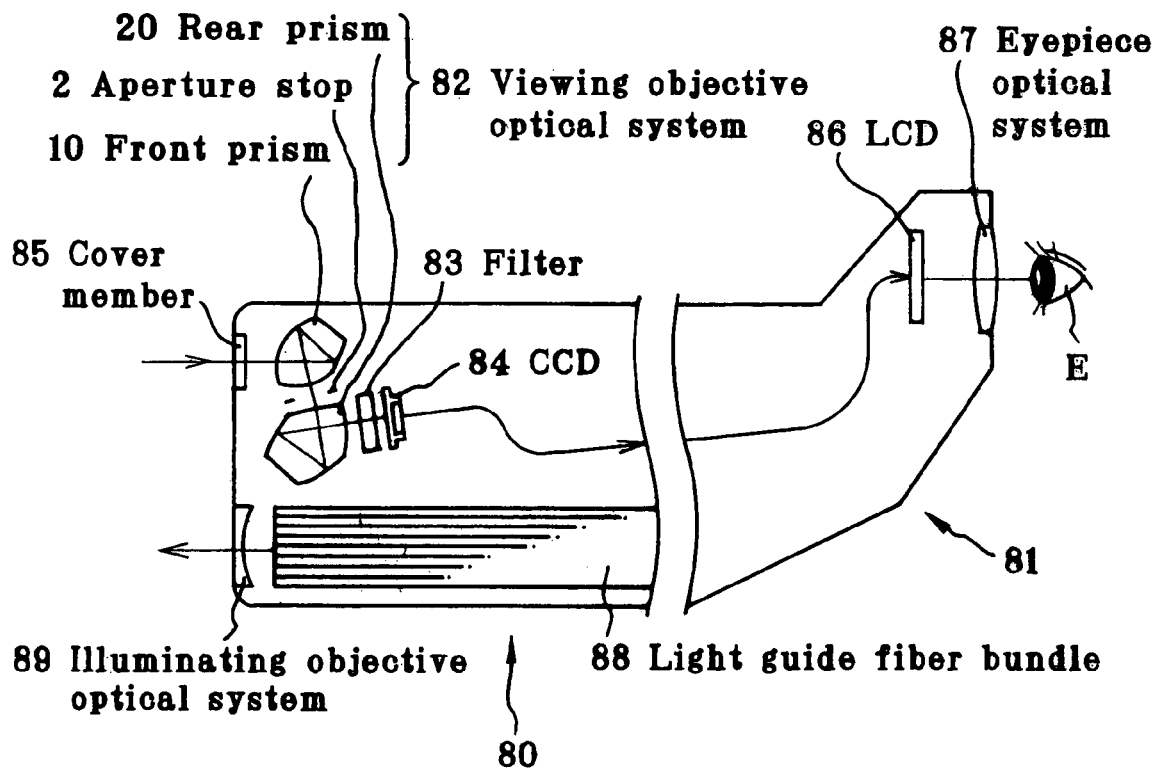
FIG. 31(b) is illustrative in conception of an optical system therein.

Referring then to FIGS. 31(*a*) and 31(*b*), they are illustrative in conception of an objective optical system 82 in a viewing system of an electronic endoscope, in which the zoom optical system of the invention is built.

As depicted in FIG. 56(*a*), this electronic endoscope comprises an electronic endoscope 71, a light source unit 72 for supplying illumination light thereto, a video processor 73, a monitor 74, a VTR deck 75, a video disc 76, a video printer 77 and a head-mounted image display (HMD) 78. The video processor 73 is to process signals corresponding to the electronic endoscope 71; the monitor 74 is to display thereon image signals produced out of the video processor 73; the VTR deck 75 and video disc 76 are connected to the video processor 73 to record image signals, etc.; and the video printer 77 is to print out image signals as images.

In the electronic endoscope 71, an end portion 80 of an insert 79 and its eyepiece portion 81 are set up as shown in FIG. 31(*b*). A light beam emanating from the light source unit 72 is guided through a light guide fiber bundle 88 to illuminate a site under observation via an illumination objective optical system 89. Light from that site is guided through a cover member 85 to a viewing objective optical system 82 to thereby form an image as an object image. This object image is formed on the image pickup plane of a CCD 84 via filters 83 such as a low-pass filter and an infrared cut filter. Further, the object image is converted into image signals by CCD 84, which are directly shown on the monitor 74 by means of the video processor 73 shown in FIG. 31(*a*).

The image signals are recorded in the VTR deck 75 and video disc 76, or otherwise they are printed out of the video printer 77. The image signals are also displayed on the image display device of HMD 78 on the wearer. At the same time, the image signals converted by CCD 84 are shown as an electronic image on the liquid crystal display (LCD) 86 of the eyepiece portion 81. Then, the displayed image is guided to the eyeball E of the viewer via an eyepiece optical system 87 comprising the optical system of the invention.

This endoscope can be set up with fewer optical members yet with high performance and at low costs. Furthermore, the objective optical system 80 is arranged in the major axis direction of the endoscope, so that the above advantages are obtainable with no obstacle to diameter reductions.

Figure 32:
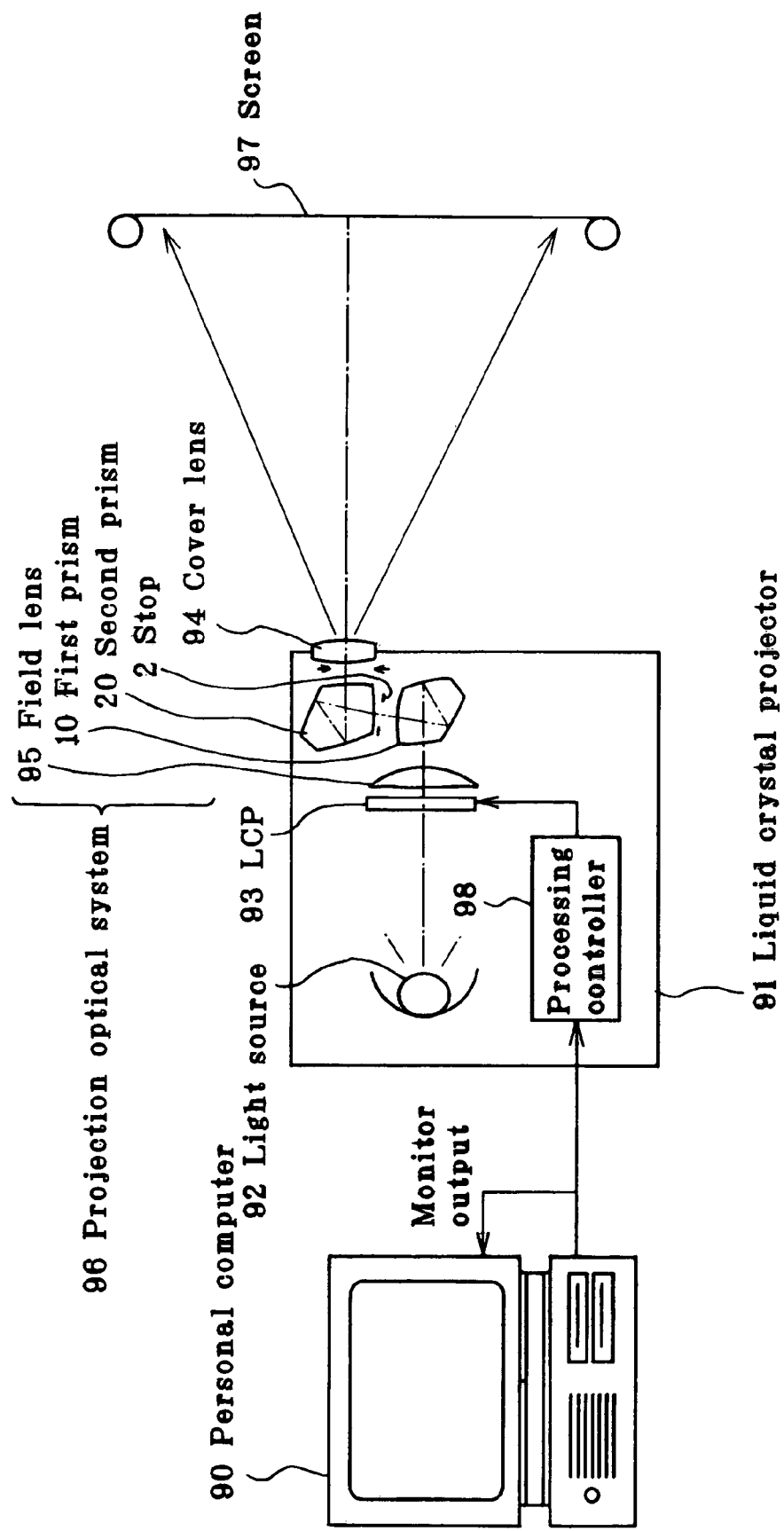
FIG. 32 is illustrative in conception of a presentation system on which the zoom optical system of the invention is mounted.

The zoom optical system of the invention could also be used as a projection optical system. FIG. 32 is illustrative in conception of a presentation system set up using a personal computer 90 and a liquid crystal projector 91 in combination. In FIG. 32, the zoom optical system of the invention is used for a projection optical system 96 of the liquid crystal projector 91. More specifically, the projection optical system 96 is set up with the zoom optical system of the invention comprising a first prism 10, an aperture stop 2 and a second prism 20.

In FIG. 32, image/input data created on the personal computer 90 are branched out of a monitor output to a processing controller 98 of the liquid crystal projector 91. At that processing controller 98, the input data are processed and sent out to the liquid crystal panel (LCP) 93. On the liquid crystal panel 93, an image corresponding to the input image data is shown. After the quantity of transmission of light from a light source 92 is determined depending on the gradation of the image appearing on the liquid crystal panel 93, that light is projected onto the screen 97 via the projection optical system 96 comprising a field lens 95 located just before the liquid crystal panel 93; the first prism 10, aperture stop 2 and second prism 20 that form the optical system of the invention; and a cover lens 94 that is a positive lens.

This projector can be set up with fewer optical members yet with high performance and compactness and at low cost.

I claim:

1. A zoom optical system, comprising:

a stop, and an optical element located on an object side of the zoom optical system with respect to said stop, wherein:

said optical element has at least one optical function surface, wherein said at least one optical function surface comprises a continuous surface and is constructed such that a line of intersection of a given reference plane with said optical function surface is configured such that there is a continuous change in at least a radius of curvature from one end toward another end, and said optical element is rotated about a given axis of rotation to implement zooming, wherein:

given an axial chief ray defined by a light ray that is incident from a distant object on said optical function surface located nearest to the object side of the zoom optical system, arriving at a center of an image plane through a center of said stop, said given reference plane is defined by a direction vector of said axial chief ray in a direction toward said distant object and a vector that passes through a center of said stop and is vertical to a stop plane, and said given axis of rotation is an axis that passes through a point that is not contiguous to said optical function surface within said given reference plane and is vertical to said given reference plane.

2. A zoom optical system, comprising:

a stop, and an optical element located on an object side of the zoom optical system with respect to said stop, wherein said optical element has at least one optical function surface, wherein said at least one optical function surface comprises a continuous surface and is constructed such that a line of intersection of a given reference plane with said optical function surface is configured such that there is a continuous change in at least a radius of curvature from one end toward another end, and said optical element is rotated about a given axis of rotation to implement zooming, wherein:

given an axial chief ray defined by a light ray that is incident from a distant object on said optical function surface located nearest to the object side of the zoom optical system, arriving at a center of an image plane through a center of said stop, said given reference plane is defined by a direction vector of said axial chief ray in a direction toward said distant object and a vector that passes through a center of said stop and is vertical to a stop plane, and said given axis of rotation is an axis that passes through a point that is not contiguous to said optical function surface within said given reference plane and is vertical to said given reference plane.

3. A zoom optical system, comprising:

a stop, a first optical element located on an object side of the zoom optical system with respect to said stop, and a second optical element located on an image side of the zoom optical system with respect to said stop, wherein:

said first optical element comprises at least one optical function surface, and said second optical element comprises at least one optical function surface, wherein:

said at least one optical function surface of said first optical element comprises a continuous surface and is constructed such that a line of intersection of a given first reference plane with said optical function surface of said first optical element is configured such that there is a continuous change in at least a radius of curvature from one end toward another end, and said at least one optical function surface of said second optical element comprises a continuous surface and is constructed such that a line of intersection of a given second reference plane with said optical function surface of said second optical element is configured such that there is a continuous change in at least a radius of curvature from one end toward another end, said first optical element is rotated about a given first axis of rotation, and said second optical element is rotated about a given second axis of rotation, wherein:

given an axial chief ray defined by a light ray that is incident from a distant object on said optical function surface located nearest to the object side of the zoom optical system, arriving at a center of an image plane through a center of said stop, said given first reference plane for said first optical element is defined by a direction vector of said axial chief ray in a direction toward said distant object and a vector that passes through a center of said stop and is vertical to a stop plane, and said given first axis of rotation is an axis that passes through a point that is not contiguous to said optical function surface within said given first reference plane and is vertical to said given first reference plane, and said given second reference plane for said second optical element is defined by a direction vector of said axial chief ray in a direction toward said distant object and a vector that passes through a center of said stop and is vertical to a stop plane, and said given second axis of rotation is an axis that passes through a point that is not contiguous to said optical function surface within said given second reference plane and is vertical to said given second reference plane.

4. A zoom optical system, comprising:

a stop, a first optical element located on an object side of the zoom optical system with respect to said stop, and a second optical element located on an image side of the zoom optical system with respect to said stop, wherein:

said first optical element comprises at least one optical function surface, and said second optical element comprises at least one optical function surface, wherein:

said at least one optical function surface of said first optical element comprises a continuous surface and is constructed such that a line of intersection of a given first reference plane with said optical function surface of said first optical element is configured such that there is a continuous change in at least a radius of curvature from one end toward another end, and said at least one optical function surface of said second optical element comprises a continuous surface and is constructed such that a line of intersection of a given second reference plane with said optical function surface of said second optical element is configured such that there is a continuous change in at least a radius of curvature from one end toward another end, said first optical element is rotated about a given first axis of rotation while, at the same time, said second optical element is rotated about a given second axis of rotation in the same direction as that of rotation of said first optical element, wherein:

given an axial chief ray defined by a light ray that is incident from a distant object on said optical function surface located nearest to the object side of the zoom optical system, arriving at a center of an image plane through a center of said stop, said given first reference plane for said first optical element is defined by a direction vector of said axial chief ray in a direction toward said distant object and a vector that passes through a center of said stop and is vertical to a stop plane, and said given first axis of rotation is an axis that passes through a point that is not contiguous to said optical function surface within said given first reference plane and is vertical to said given first reference plane, and said given second reference plane for said second optical element is defined by a direction vector of said axial chief ray in a direction toward said distant object and a vector that passes through a center of said stop and is vertical to a stop plane, and said given second axis of rotation is an axis that passes through a point that is not contiguous to said optical function surface within said given second reference plane and is vertical to said given second reference plane.

5. The zoom optical system according to claim 1, wherein said optical function surface configured such that there is a continuous change in a radius of curvature in a direction vertical to said given reference plane.

6. The zoom optical system according to claim 1, which further comprises another optical element on the image side of the zoom optical system with respect to said stop, wherein: said another optical element comprises at least one optical function surface, and said at least one optical function surface of said another optical element comprises a continuous surface and is constructed such that a line of intersection of said given reference plane with said optical function surface of said another optical element is configured such that there is a continuous change in a radius of curvature from one end toward another end.

7. The zoom optical system according to claim 6, wherein: the optical function surface of said another optical element is configured such that there is a continuous change in a radius of curvature in a direction orthogonal to said given reference plane.

8. The zoom optical system according to claim 6, wherein: said another optical element is rotated about given another axis of rotation in cooperation with said optical element, wherein:
said another given axis of rotation is an axis that passes through a point that is not contiguous to the optical function surface of said another optical element within said reference plane and is vertical to said given another reference plane.

9. The zoom optical system according to claim 1, wherein:
an optical function surface positioned right before said stop and an optical function surface positioned right after said stop are rotated in mutually different directions with respect to said stop.

10. The zoom optical system according to claim 1, wherein:
said optical element has three or more surfaces.

11. The zoom optical system according to claim 1, wherein:
said optical element has at least one rotationally asymmetric surface.

12. The zoom optical system according to claim 1, wherein:
an angle of rotation of said optical element upon zoom satisfies condition (1)

$$0°<\theta<120° \quad (1)$$

where θ is an angle of rotation of the optical element.

13. The zoom optical system according to claim 1, which has a zoom ratio that satisfies condition (2):

$$1.01<\beta<20 \quad (2)$$

where β is the zoom ratio.

14. The zoom optical system according to claim 1, which satisfies condition (3):

$$0<\upsilon_{max}-\upsilon_{min}<100 \quad (3)$$

where $\upsilon_{max}$ is a maximum Abbe constant of an optical element included in said zoom optical system, and $\upsilon_{min}$ is a minimum Abbe constant of an optical element included in said zoom optical system.

15. The zoom optical system according to claim 1, which has only one image-formation plane.

16. Electronic equipment, comprising:
the zoom optical system recited in claim 1, and an image pickup device located on an image side thereof.

17. The electronic equipment according to claim 16, which further comprises means for electrical correction of an image shape formed through said zoom optical system.

18. The Electronic equipment according to claim 17, wherein a parameter that differs for each focal length is used for said correction.

19. The electronic equipment according to claim 17, wherein a parameter that differs for each wavelength area is sued for said correction.

20. The zoom optical system according to claim 1, wherein at least one of the optical function surfaces of said optical element is a reflecting surface.

21. The zoom optical system according to claim 6, wherein at least one of the optical function surfaces of said another optical element is a reflecting surface.

22. The zoom optical system according to claim 6, wherein at least one of the optical function surfaces of said another optical element is a rotationally asymmetric surface.

* * * * *